(12) United States Patent
Kobashi

(10) Patent No.: US 8,089,653 B2
(45) Date of Patent: Jan. 3, 2012

(54) DOCUMENT PROCESSING APPARATUS, METHOD AND PROGRAM FOR VARIABLE PRINTING WITH DOCUMENT FILE DIVIDING

(75) Inventor: Kazufumi Kobashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1033 days.

(21) Appl. No.: 11/342,690

(22) Filed: Jan. 31, 2006

(65) Prior Publication Data

US 2006/0170948 A1     Aug. 3, 2006

(30) Foreign Application Priority Data

Feb. 3, 2005 (JP) ................................. 2005-028018

(51) Int. Cl.
*G06K 15/00* (2006.01)
(52) U.S. Cl. ........ 358/1.18; 358/1.9; 358/1.12; 358/1.15
(58) Field of Classification Search .................. None
See application file for complete search history.

(56) References Cited

U.S. PATENT DOCUMENTS

| | | | | |
|---|---|---|---|---|
| 5,740,338 | A * | 4/1998 | Gauthier et al. | 358/1.17 |
| 5,845,303 | A * | 12/1998 | Templeman | 715/255 |
| 5,923,013 | A | 7/1999 | Suzuki et al. | |
| 5,937,153 | A * | 8/1999 | Gauthier | 358/1.17 |
| 6,599,325 | B2 * | 7/2003 | Gauthier et al. | 715/210 |
| 6,687,016 | B2 * | 2/2004 | Gauthier | 358/1.11 |
| 6,869,238 | B2 * | 3/2005 | Ishiguro | 400/76 |
| 6,952,801 | B2 * | 10/2005 | Warmus et al. | 715/251 |
| 7,203,898 | B2 | 4/2007 | Miyazato et al. | 715/500 |
| 7,203,900 | B2 * | 4/2007 | Nara et al. | 715/255 |
| 7,281,016 | B2 * | 10/2007 | Yada | 1/1 |
| 7,375,842 | B2 * | 5/2008 | Kloosterman et al. | 358/1.18 |
| 7,383,328 | B2 * | 6/2008 | Iyoki | 709/222 |
| 7,417,767 | B2 * | 8/2008 | Kato | 358/1.9 |

(Continued)

FOREIGN PATENT DOCUMENTS

JP          10-027076          1/1998

(Continued)

OTHER PUBLICATIONS

A. Mooij, et al., "VarDaP Project: User Requirements Document", XP-002378374, pp. 1-13 (Jan. 19, 2000).

(Continued)

*Primary Examiner* — King Poon
*Assistant Examiner* — Dung Tran
(74) *Attorney, Agent, or Firm* — Fitzpatrick, Cella, Harper & Scinto

(57) ABSTRACT

There is provided a document processing apparatus capable of, when acquiring a document based on a template file created by a variable printing system after converting the document into its own format, constructing a document in a format in which a concept of a record is introduced and preferably enabling operations for the unit of the concept of the source record, a document processing method and a program. In a computer 100 which issues to a printer 107 a print job for printing document data in which specified variable data is put into specified areas, template data into which the variable data can be merged is imported based on records; a segment is tentatively set for the template data, for each imported record; and the template data in which predetermined variable data is merged at predetermined areas is acquired on the basis of a record for which a segment is tentatively created.

9 Claims, 39 Drawing Sheets

U.S. PATENT DOCUMENTS

| | | | |
|---|---|---|---|
| 7,430,713 B2* | 9/2008 | Kobashi et al. | 715/244 |
| 7,456,990 B2* | 11/2008 | Gauthier | 358/1.15 |
| 7,460,258 B2* | 12/2008 | Ducato et al. | 358/1.15 |
| 7,548,334 B2* | 6/2009 | Lo et al. | 358/1.15 |
| 7,554,689 B2* | 6/2009 | Tonisson | 358/1.18 |
| 7,724,384 B2* | 5/2010 | Hwang et al. | 358/1.13 |
| 2002/0122205 A1* | 9/2002 | Gauthier | 358/1.15 |
| 2003/0053133 A1* | 3/2003 | Nakagiri et al. | 358/1.18 |
| 2003/0066027 A1* | 4/2003 | Nakagiri | 715/500 |
| 2003/0091384 A1 | 5/2003 | Jo | 403/350 |
| 2003/0156479 A1* | 8/2003 | Fujiyoshi | 365/200 |
| 2003/0159114 A1* | 8/2003 | Nishikawa et al. | 715/530 |
| 2004/0111675 A1* | 6/2004 | Mori et al. | 715/513 |
| 2006/0029125 A1 | 2/2006 | Kobashi et al. | 375/222 |
| 2007/0195368 A1* | 8/2007 | Waara | 358/1.18 |

FOREIGN PATENT DOCUMENTS

| | | |
|---|---|---|
| JP | 11-232155 | 8/1999 |
| JP | 2000-122837 | 4/2000 |
| JP | 2002-157240 | 5/2002 |
| JP | 2003-091384 | 3/2003 |
| JP | 2003-296070 | 10/2003 |
| JP | 2004-206168 | 7/2004 |
| KR | 2002-0081315 | 10/2002 |
| WO | WO 01/59696 | 8/2001 |

OTHER PUBLICATIONS

L. Menke, "An XSLT Style Sheet and an XML Dictionary Approach to Internationalization", XP-002273730, pp. 1-5 (Apr. 1, 2001).

J. Clark, "XSL Transformations (XSLT) Version 1.0", XP-001152387, pp. 1-74 (Nov. 16, 1999).

"Adobe Solutions for Document Generation, Enterprise Solutions for Generating High-Quality, Customized Documents", White Paper, XP-002395240, pp. 1-9 (2003).

G.E. Bock, xPression from Document Sciences, Delivering Integrated Solutions for Content Processing Services, Patricia Seybold Group, XP-002395241, pp. 1-11 (Sep. 2003).

* cited by examiner

FIG. 3B

| DOCUMENT DATA (1) | DOCUMENT DATA (2) | DOCUMENT DATA (3) | DOCUMENT DATA (4) | ~304 |

FIG. 4A

| NO. | ATTRIBUTE INFORMATION | | REMARKS |
|---|---|---|---|
| 1 | PRINTING METHOD | SINGLE-SIDED / DOUBLE-SIDED / BOOKBINDING PRINTING | |
| 2 | PAPER SIZE | DOCUMENT SIZE / FIXED SIZE | • WHEN "A4+A3", "B4+B3" OR "LETTER+LEISURE (11×17)" IS SPECIFIED, Z FOLD IS SPECIFIED<br>• WHEN BOOKBINDING PRINTING OR N-up PRINTING IS SPECIFIED, THE DOCUMENT SIZE OF THE FIRST CHAPTER / PAGE IS AUTOMATICALLY SELECTED |
| 3 | PAPER DIRECTION | HORIZONTAL / VERTICAL | • SELECTABLE ONLY IN THE CASE OF FIXED SIZE |
| 4 | BINDING MARGIN, BINDING DIRECTION | | • SPECIFICATION OF SHIFT / ENLARGEMENT AND REDUCTION IS POSSIBLE |
| 5 | N-up PRINTING | THE NUMBER OF PAGES / ARRANGEMENT ORDER / BORDER LINE / ARRANGEMENT POSITION, ETC | • 9 PATTERNS OF ARRANGEMENT POSITION ARE PROVIDED<br>• SAME SIZE PRINTING CAN BE SPECIFIED |
| 6 | ENLARGEMENT / REDUCTION | ON / OFF | • WHEN FIXED SIZE IS SELECTED AS PAPER SIZE OR N-up PRINTING IS SELECTED, ON IS AUTOMATICALLY SPECIFIED SPECIFICATION OF OFF IS POSSIBLE |
| 7 | WATERMARK | | • INDIVIDUAL SPECIFICATION FOR EACH LOGICAL PAGE OR EACH PHYSICAL PAGE IS POSSIBLE<br>• ALL CHAPTERS / PAGES ARE TARGETED |

FIG. 4B

| 8 | HEADER / FOOTER | | • INDIVIDUAL SPECIFICATION FOR EACH LOGICAL PAGE OR EACH PHYSICAL PAGE IS POSSIBLE<br>• ALL CHAPTERS / PAGES ARE TARGETED |
|---|---|---|---|
| 9 | PAPER DISCHARGE METHOD | STAPLING / PUNCH HOLES | • STAPLING / PUNCHING IS POSSIBLE ONLY FOR SINGLE-SIDED / DOUBLE-SIDED PRINTING<br>• STAPLING IS PERFORMED AT ONE OR TWO POSITIONS |
| 10 | BOOK BINDING DETAILS | OPENING DIRECTION / SADDLE STITCH / SPECIFICATION OF ENLARGEMENT OR REDUCTION / BINDING MARGIN / SPECIFICATION OF SEPARATE BINDING, ETC | • ONLY FOR BOOKBINDING PRINTING |
| 11 | FRONT COVER / BACK COVER | | • PRINTING SPECIFICATION FOR 1/2 OF FRONT COVER AND 1/2 OF BACK COVER<br>• SPECIFICATION OF PAPER FEEDING PORT (INCLUDING INSERTER) |
| 12 | INDEX PAPER | | • PRINTING OF CHARACTER STRING ON INDEX PORTION AND ANNOTATION ON INDEX PAPER CAN BE SET<br>• SPECIFICATION IS IMPOSSIBLE FOR BOOKBINDING PRINTING |
| 13 | SPLIT PAPER | | • SPECIFICATION OF PAPER FEEDING PORT (INCLUDING INSERTER)<br>• DOCUMENT DATA CAN BE PRINTED ON INSERTED PAPER<br>• SPECIFICATION IS IMPOSSIBLE FOR BOOKBINDING PRINTING |
| 14 | CHAPTER SEGMENT | "NOTHING" / "PAGE CHANGE" / "PAPER CHANGE" | • "PAPER CHANGE" IS FIXED WHEN INDEX PAPER OR SLIT PAPER IS SPECIFIED<br>• "PAPER CHANGE" IS SPECIFIED FOR SINGLE-SIDED PRINTING |

FIG. 5

| NO. | ATTRIBUTE INFORMATION | | REMARKS |
|---|---|---|---|
| 1 | PAPER SIZE | DOCUMENT SIZE / FIXED SIZE | • "PAPER CHANGE" IS AUTOMATICALLY SPECIFIED WHEN FIXED SIZE IS SELECTED<br>• WHEN MULTIPLE PIECES OF PAPER ARE SELECTED FOR BOOK, PAPER SIZE CAN BE CHANGED ONLY FOR SPECIFIED PAPER<br>PAPER SIZE CAN BE CHANGED EVEN WHEN IT IS SPECIFIED TO BE IN ACCORDANCE WITH BOOK SIZE |
| 2 | PAPER DIRECTION | VERTICAL / HORIZONTAL | • SELECTABLE ONLY IN THE CASE OF FIXED SIZE |
| 3 | SPECIFICATION OF N-up PRINTING | THE NUMBER OF PAGES / ARRANGEMENT ORDER / BORDER LINE / ARRANGEMENT POSITION, ETC | • 9 PATTERNS OF ARRANGEMENT POSITION ARE PROVIDED<br>• SAME SIZE PRINTING CAN BE SPECIFIED |
| 4 | ENLARGEMENT / REDUCTION | ON / OFF | • WHEN FIXED SIZE IS SELECTED AS PAPER SIZE OR N-up PRINTING IS SELECTED, ON IS AUTOMATICALLY SPECIFIED<br>SPECIFICATION OF OFF IS POSSIBLE |
| 5 | WATERMARK | DISPLAY / NON-DISPLAY | • SPECIFICATION OF WHETHER OR NOT TO DISPLAY ALL WATERMARKS SPECIFIED FOR BOOK |
| 6 | HEADER / FOOTER | DISPLAY / NON-DISPLAY | • SPECIFICATION OF WHETHER OR NOT TO DISPLAY ALL HEADERS AND FOOTERS SPECIFIED FOR BOOK |
| 7 | PAPER DISCHARGE METHOD | STAPLING | • WHEN STAPLING IS SPECIFIED FOR BOOK, OFF CAN BE SPECIFIED. ON IS SPECIFIED AS DEFAULT |

FIG. 6

| NO. | ATTRIBUTE INFORMATION | | REMARKS |
|---|---|---|---|
| 1 | PAGE TURN SPECIFICATION | | • SPECIFICATION OF 0 / 90 / 180 / 270 DEGREES IS POSSIBLE |
| 2 | WATERMARK | DISPLAY / NON-DISPLAY | • SPECIFICATION OF WHETHER OR NOT TO DISPLAY ALL WATERMARKS SPECIFIED FOR BOOK |
| 3 | HEADER / FOOTER | DISPLAY / NON-DISPLAY | • SPECIFICATION OF WHETHER OR NOT TO DISPLAY ALL HEADERS AND FOOTERS SPECIFIED FOR BOOK |
| 4 | ZOOM | 50%—200% | • SPECIFICATION OF RELATIVE MAGNIFICATION WITH SIZE FIT IN VIRTUAL LOGICAL PAGE AREA ASSUMED TO BE 100% |
| 5 | ARRANGEMENT POSITION | | • FIXED 9 PATTERNS AND SPECIFICATION OF ANY POSITION |
| 6 | ANNOTATION | | |
| 7 | VARIABLE ITEM | | |
| 8 | PAGE DIVISION | | |

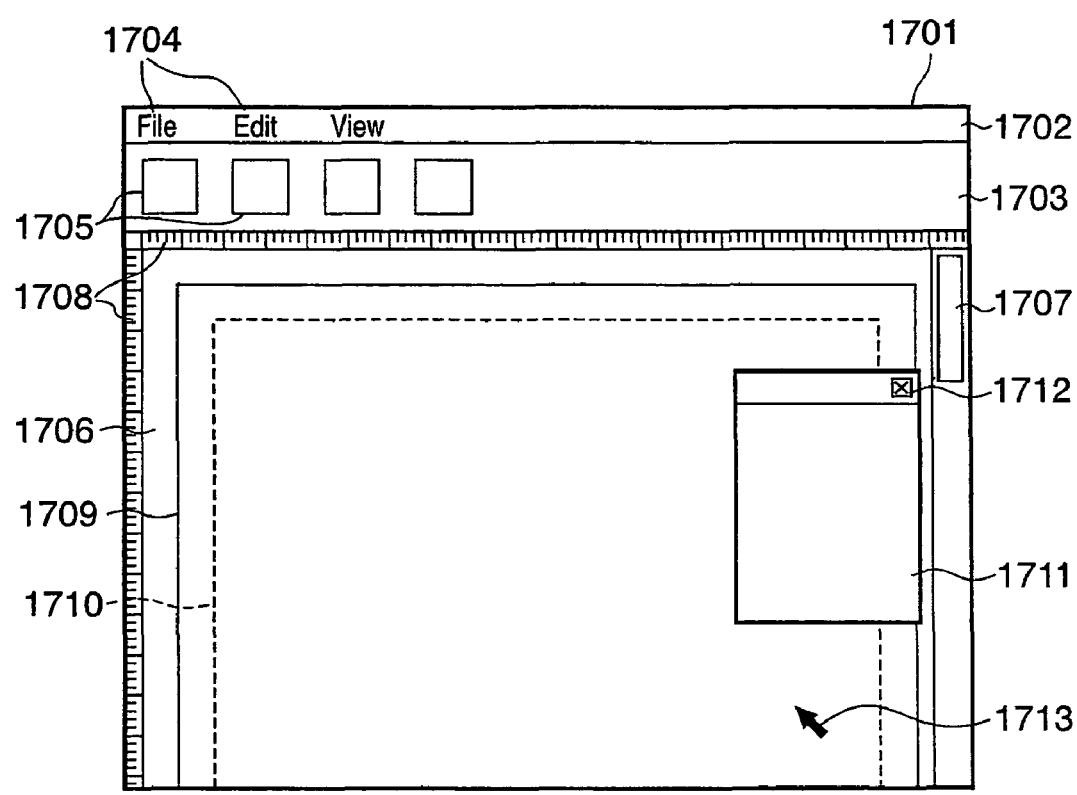
F I G. 17

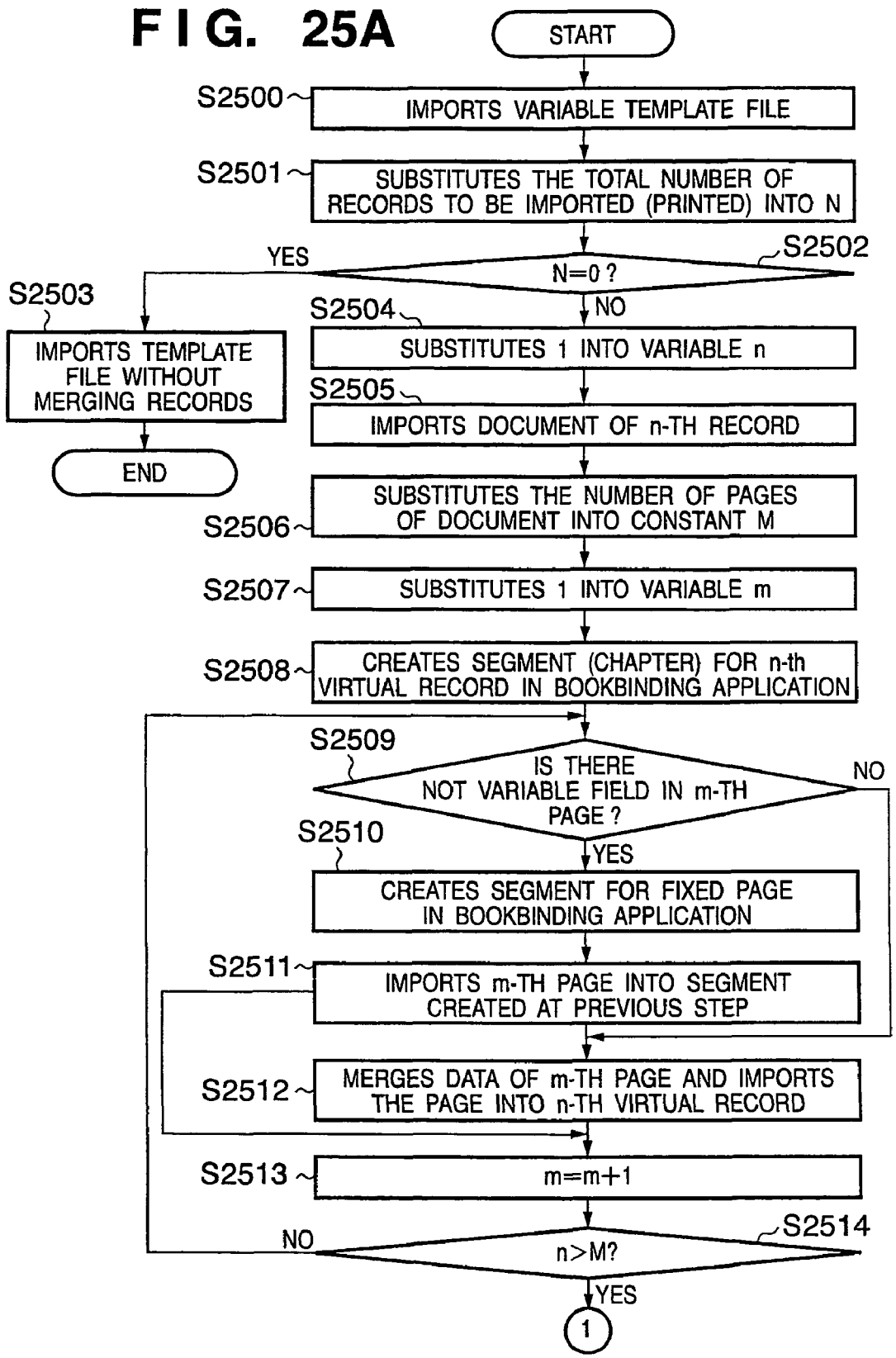

DOCUMENT PROCESSING APPARATUS, METHOD AND PROGRAM FOR VARIABLE PRINTING WITH DOCUMENT FILE DIVIDING

FIELD OF THE INVENTION

The present invention relates to a document processing apparatus which edits electronic data generated from an information processing apparatus such as a personal computer (PC), a scanner, a printer or the like, a document processing method and a program.

BACKGROUND OF THE INVENTION

Recently, a lot of applications have been provided to create documents for various purposes on a computer. A user uses different applications according to purposes, such as an application suitable for creation of a document, an application suitable for creation of a graphic and an application suitable for editing of image data. However, there may be a case where a document desired by a user may include a page with a lot of text, a page with a lot of graphics to be used for presentation, or a page on which image data such as a picture is processed and it is more efficient to create such a page with a different application.

Accordingly, in order to create an intended document which includes various kinds of data, the user must cause respective various applications to print data with the use of the print function provided for the applications and combine printed matters in a desired order to obtain the desired document. This presents problems that the operational burden is imposed on the user and that wasteful printing is performed.

Accordingly, in a mechanism disclosed in Patent Document 1 (Japanese Patent Laid-Open No. 2003-91384), there is provided a technique for converting multiple documents generated by different applications into a common intermediate format on a computer to treat them as one document. By using this mechanism, it is possible to obtain an intended document which includes multiple kinds of data only by performing operations on a computer as an electronic document.

In a system of Patent Document 1, it is also commonly performed to convert document data created by application software on a PC to electronic data not dependent on the application which has created the document data and output it from a printing apparatus after adding processing instructions such as double-sided printing, stapling and punching instructions. Furthermore, in a conventional document processing system, it is also performed to combine pages of image data generated by reading with a scanner and pages of inputted electronic data, store the combination as an electronic document, add processing instructions, such as double-sided printing, stapling and punching instruction, and output the electronic document from a printing apparatus.

Meanwhile, in the printing industry, variable printing is performed in which data is replaced according to customers for printing. The variable printing is a printing method generally used for address printing and the like, in which printing is performed by replacing address data from a database (database records) according to customers. In such variable printing, an output matter (printed matter) is obtained by combining (overlaying) a layout template and data from the database.

An application for performing such variable printing is also disclosed in Patent Document 2 (Japanese Patent Laid-Open No. 2000-122837). According to a mechanism in Patent Document 2, a form template can be created by a form creation application, and by associating each field of this form template with data in a database, it is possible to read data from a corresponding data field of multiple records in the database and generate print data corresponding to necessary records.

However, though the form application of the Patent Document 2 is provided with a variable printing function, it only outputs rendering data for each page to a printer driver when printing is performed, similarly to an ordinary application. Therefore, the concept of a record of the variable printing has been lost when print data is generated. For example, if printing of three records is performed when a form template (also referred to as a variable template) is configured by three pages, then three pages are printed for each record, and therefore, print data corresponding to nine pages are generated as a whole. By printing the print data with a printing apparatus, printed matters corresponding to the three records can be obtained as a result. However, there is not an attribute indicating with which page a record ends, in the print data.

Therefore, in the case of a system which receives a document created by any application as a print output from the application and converts it to a file in its own format like a print setting application (also referred to as a bookbinding application) of Patent Document 1 (for example, PDF Writer by Adobe Corporation is similar to this system), the received output data is managed as one document in this system because the concept of a record does not exist in the output data. For example, in the above case, the document is acquired as one document with nine pages. Therefore, if printing is performed with a printing apparatus from this system, the document is printed as one document with nine pages. When attempting to perform print processing of the document of the second record created by the form creation application, from the print setting application, the user must visually recognize a portion of pages corresponding to the second record and manually instruct printing of the recognized page range.

Furthermore, as described above, in the case of managing a document configured by multiple chapters when a document unit acquired from an application at one time is assumed to be one chapter, operations will be more complicated, and it is conceivable that printing may be impossible by the mechanism of Patent Document 1 which permits printing for each chapter but does not permit printing only of particular pages of a chapter. For example, there is a problem that, if a document created by the form creation application has been acquired into the second chapter, and documents corresponding to the first and third chapters have been acquired by another application, it is not possible to instruct printing of the first chapter, pages corresponding to the second record of the second chapter, and the third chapter to be performed in that order.

Even if it is attempted to apply the variable printing to the conventional document processing system described above and process a template file used in the variable printing, it is not possible to perform editing processing in which the concept of variable printing is introduced because the concept of a database record does not exist in the conventional document processing system.

Furthermore, when printing is performed after making print settings in the conventional document processing system, it is not possible to obtain printed matters for each record because the concept of a database record does not exist in the document processing system.

SUMMARY OF THE INVENTION

The present invention has as its objects to provide a document processing apparatus capable of, when acquiring a document based on a template file created by a variable printing system after converting the document into its own format, constructing a document in a format in which a concept of a record is introduced and preferably enabling operations for the unit of the concept of the source record, a document processing method and a program.

The present invention is a document processing apparatus which generates electronic document data in which specified variable data is put into specified areas; the apparatus comprising:

determination means for, when import of a document file is instructed so that the document file is converted to electronic document data, determining whether or not the document file instructed to be imported is variable output data in which respective records of specified variable data are to be input into specified areas;

tentative setting means for, when it is determined by the determination means that the document file instructed to be imported is variable output data, tentatively creating segments for the respective records to divide the variable output data to be imported into the respective records; and acquisition means for acquiring the variable output data by dividing the variable output data as the records for which the segments are tentatively created by the tentative setting means to generate electronic document data for which the segments are set.

Other feature and advantages of the present invention will be apparent from the following description taken in conjunction with the accompanying drawings, in which like references characters designate the same or similar parts throughout the figures thereof.

BRIEF DESCRIPTION OF THE DRAWINGS

The accompanying drawings, which are incorporates in and constitute apart of the specification, illustrate embodiments of the invention and, together with the description, serve to explain the principle of the invention.

FIGS. 3A and 3B show an example of the structure of a book file 103 in the embodiment of the present invention;

FIGS. 4A and 4B show a list of book attributes;

FIG. 5 shows a list of chapter attributes;

FIG. 6 shows a list of page attributes;

FIG. 17 shows a typical application main window which includes a menu bar, a tool bar, a work area and a floating pallet, in the variable printing system;

FIGS. 25A and 25B are a flowchart for illustrating details of another example of the variable template file import processing (step S1902) in the document processing system according to the embodiment of the present invention;

DETAILED DESCRIPTION OF THE PREFERRED EMBODIMENTS

A document processing system according to an embodiment of the present invention will be described below in detail with reference to drawings.

<<Configuration of a Document Processing System>>

First, the system configuration of the document processing system according to this embodiment will be described.

<System Configuration>

Figure 1:
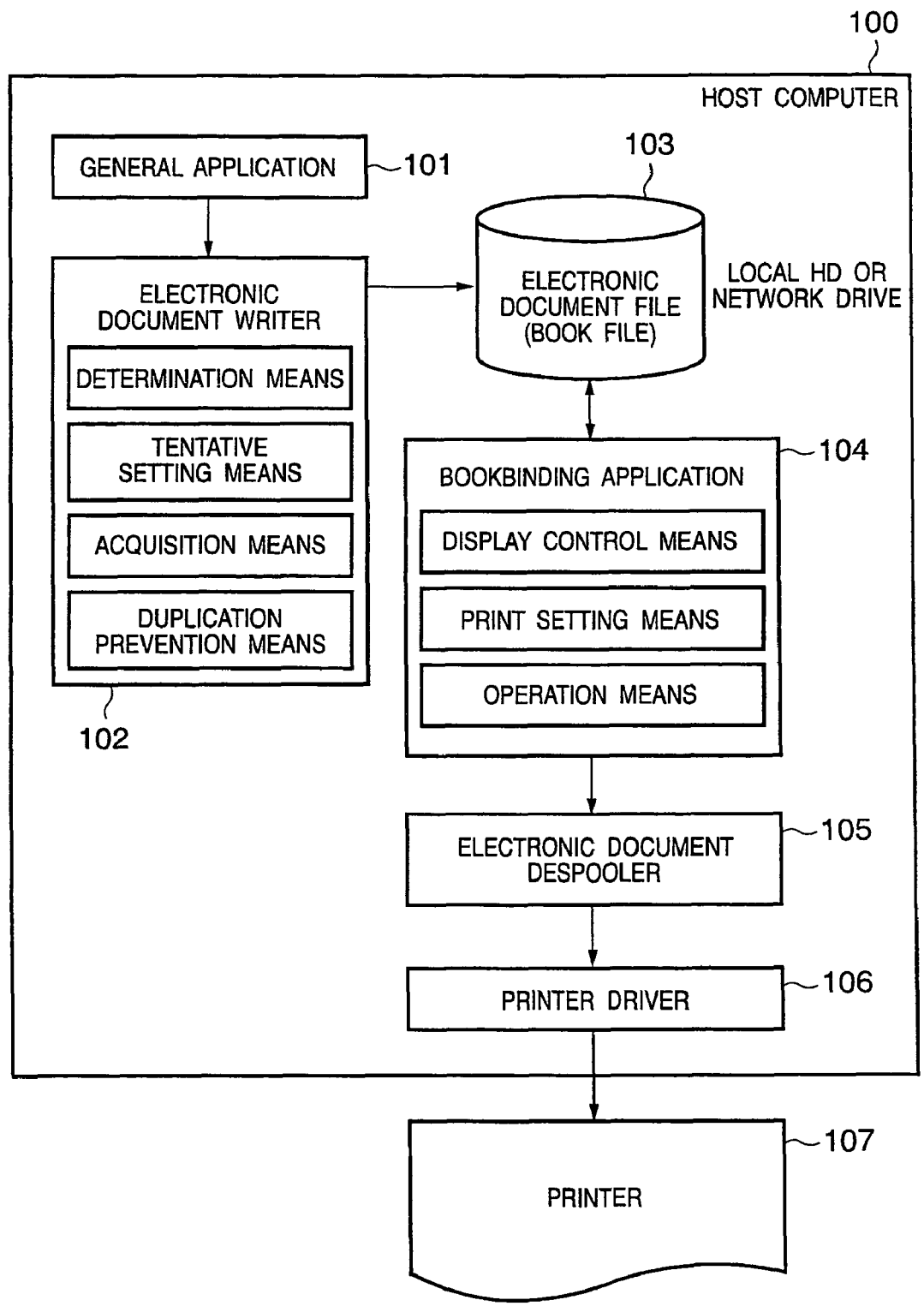
FIG. 1 is a software block diagram of a stand-alone type document processing system according to an embodiment of the present invention.

FIG. 1 is a software block diagram of a stand-alone type document processing system according to an embodiment of the present invention. As shown in FIG. 1, the document processing system according to this embodiment is realized by a computer (host computer) 100, which is a preferred embodiment as an information processing apparatus, and a printer connected thereto. Here, the host computer 100 is provided with general applications 101, an electronic document writer 102 for converting a data file created by any of the general applications 101 to an electronic document file 103, and a bookbinding application 104 which provides a function of editing the electronic document file 103. Thereby, the host computer 100 can create and edit a document in which created data files are integrated, and the operability is improved, so that document editing can be efficiently performed. A print setting application according to the embodiment of the present invention includes the electronic document writer 102 and the bookbinding application 104 and is characterized in its mechanism of creating an electronic document with a concept of a record when acquiring a variable template document.

The general applications 101 shown in FIG. 1 are application programs which provide a function of word processing, spread sheet processing, photo retouching, drawing, painting, presentation or text editing, and an application which creates a form template (also referred to as a variable template), acquires necessary data from data fields of each record of a database, associated with the form template, and combines them (referred to as overlay or merging), and they have a printing function for an operating system (OS). These applications use a predetermined interface (for example, GDI) provided by the OS when printing created application data such as document data and image data. That is, the general applications 101 send a predetermined output command in an OS-dependent format (for example, a GDI function) to an output module of the OS which provides the above-described interface to print created data. The form creation application is also provided with a function of outputting print output (GDI) in which a form template and necessary data field data are merged, similarly to the other applications.

Having received the output command, the output module converts the output command into a format which can be processed by an output device such as a printer and outputs the converted command (for example, a DDI function). Since the format which can be processed by an output device depends on the kind, the manufacturer or the model of the device, a device driver is provided for each device. The OS converts the command using the device driver, generates print data, and encloses it in JL (Job Language) to generate a print job. For example, when Windows by Microsoft Corporation is used as the OS, a module called GDI (graphic device interface) corresponds to the output module described above.

In FIG. 1, the electronic document writer 102 is an improvement of the device driver described above, and it is a software module provided to realize the present document processing system. However, the electronic document writer 102 does not target a particular output device, and converts the output command to a command in a format which can be processed by the bookbinding application 104 or a printer driver 106 to be described later. The format (hereinafter referred to as "an electronic document format") after the conversion by the electronic document writer 102 may be any format only if document pages can be expressed in a detailed form. Among practical standard formats, the PDF format or the SVG format by Adobe Systems Corporation, for example, can be adopted as the electronic document format.

When the electronic document writer 102 is utilized by any of the general applications 101, the electronic document writer 102 is specified as a device driver to be used for output before execution of printing. However, an electronic document file just created by the electronic document writer 102 is not in a complete format as an electronic document file. Therefore, the bookbinding application specifies the electronic document writer 102 as a device driver, and conversion from application data to an electronic document file is performed under the control of the bookbinding application. The bookbinding application 104 completes the new, incomplete electronic document file generated by the electronic document writer 102 as an electronic document file having a format to be described later.

Hereinafter, when it is necessary to clearly identify this point, a file created by the electronic document writer 102 is called "an electronic document file", and an electronic document file which has been given a structure by the bookbinding application 104 is called "a book file". When it is not necessary to especially distinguish them from each other, any of a document file generated by an application, the electronic document file and the book file is called a document file (or document data).

In this way, in this embodiment, by specifying the electronic document writer 102 as a device driver and causing any of the general application 101 to print data, the application data is converted to an electronic document format with a page defined by the general application 101 (hereinafter referred to "a logical page" or "a document page") as a unit, and stored in a storage medium such as a hard disk as the electronic document file 103. The hard disk may be a local hard disk drive provided for a computer which realizes the document processing system according to this embodiment or may be a network drive provided on a network if it is connected to the network.

In FIG. 1, the bookbinding application 104 provides a user with a function of reading an electronic document file (or a book file) 103 and editing it. However, the bookbinding application 104 does not provide a function of editing the content of each page but provides a function of editing the structure of a chapter or a book configured with a page as a minimum unit, which will be described later.

When a book file 103 edited by the bookbinding application 104 is printed, an electronic document despooler 105 is activated by the bookbinding application 104. The electronic document despooler 105 is a program module to be installed in the computer 100 together with the bookbinding application 104. It is a module to be used to output rendering data to the printer driver 106 when a document (book file) to be used by the bookbinding application 104 is printed.

The electronic document despooler 105 reads a specified book file (electronic document file) 103 from a hard disk, and it generates the above-described output command appropriate for the output module of the OS and outputs it to the output module not shown to print each page in the format described in the book file 103. In this case, the printer driver 106 for a printer 107 to be used as an output device is specified as a device driver. Here, the output module converts the received output command to a device command and outputs it to the specified printer driver 106 for the printer 107. Then, the printer driver 106 converts it to a command, such as a command in a page description language, which can be interpreted and executed by the printer 107. Then, the converted command is sent from the printer driver 106 to the printer 107 via a system spooler not shown, and an image based on the command is printed by the printer 107.

Figure 2:
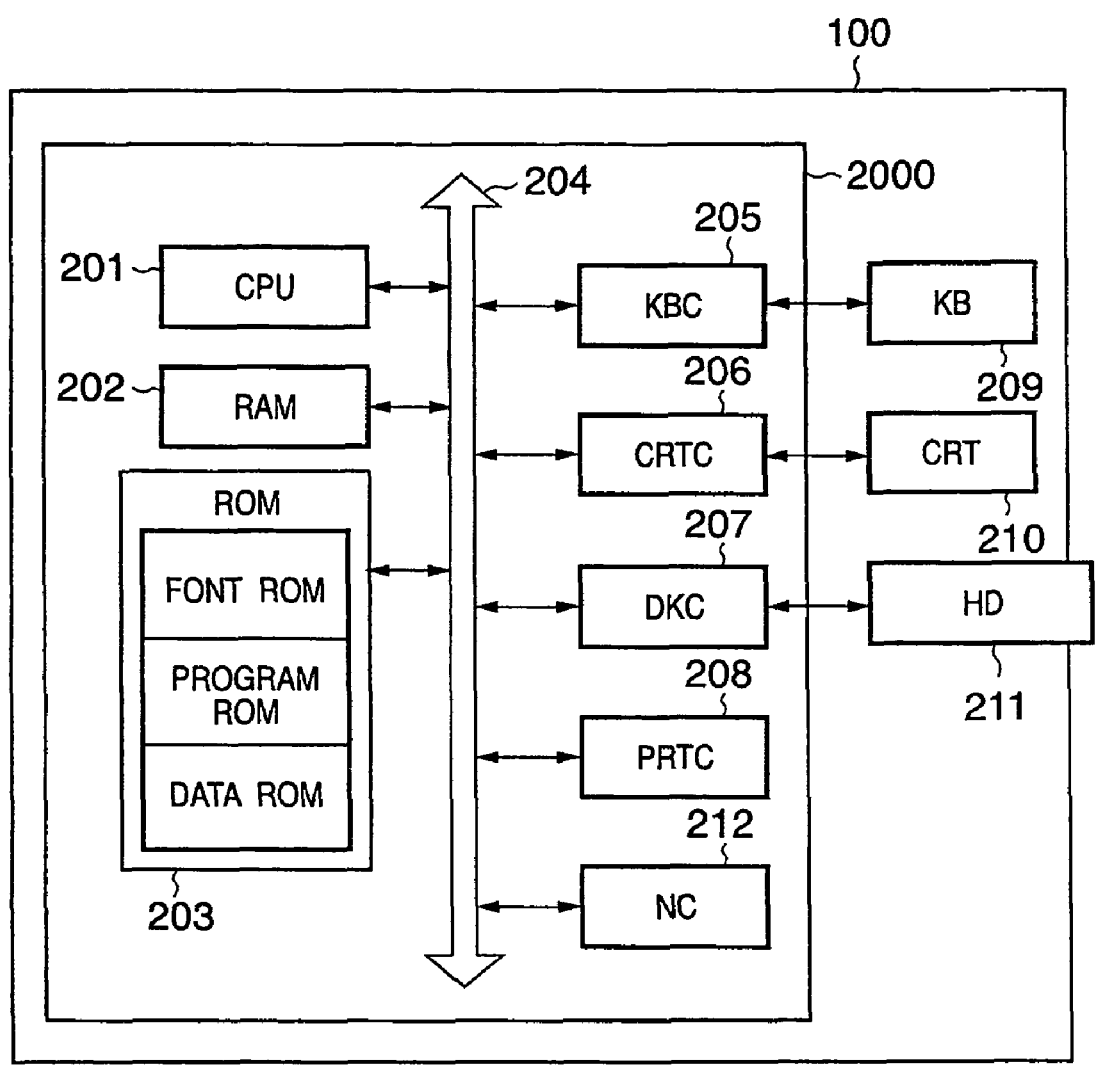
FIG. 2 is a hardware block diagram of a computer 100 in the document processing system according to the embodiment of the present invention.

FIG. 2 is a hardware block diagram of the computer 100 in the document processing system according to the embodiment of the present invention. In FIG. 2, a CPU 201 is an device for executing programs stored in a ROM for programs of a ROM 203 or programs such as an OS loaded from a hard disk 211 to a RAM 202, the general applications 101 and, the bookbinding application 104 to realize the software configuration shown in FIG. 1 or procedures of flowcharts to be described later.

In FIG. 2, a RAM 202 functions as a main memory or a work area of the CPU 201. A keyboard controller (KBC) 205 controls a key input from a keyboard 209 or a pointing device not shown. A CRT controller (CRTC) 206 controls display of a CRT display 210. A disk controller (DKC) 207 controls access to a hard disk (HD) 211, in which a boot program, various applications, font data, a user file, an edit file to be described later and the like are stored, a floppy® disk (FD) and the like. A PRTC 208 controls exchange of signals with the printer 107 connected to the computer 100. An NC 212 is connected to a network and performs processing for controlling communication with other equipment connected to the network.

<Format of Electronic Document Data>

Before referring to details of the bookbinding application 104, the data format of the book file (electronic file) 103 in this embodiment will be described. The book file 103 has a hierarchical structure with three layers which emulates a book, a paper medium. The top layer is referred to as a "book", which emulates one book and for which attributes of the whole book are defined. An intermediate layer below the top layer corresponds to a chapter of a book and is called a "chapter". Attributes can be defined for each chapter. The bottom layer is called a "page", which corresponds to each page defined by an application program. Attributes can be also defined for each page. One book may include multiple chapters, and one chapter may include multiple pages.

Figure 3A:
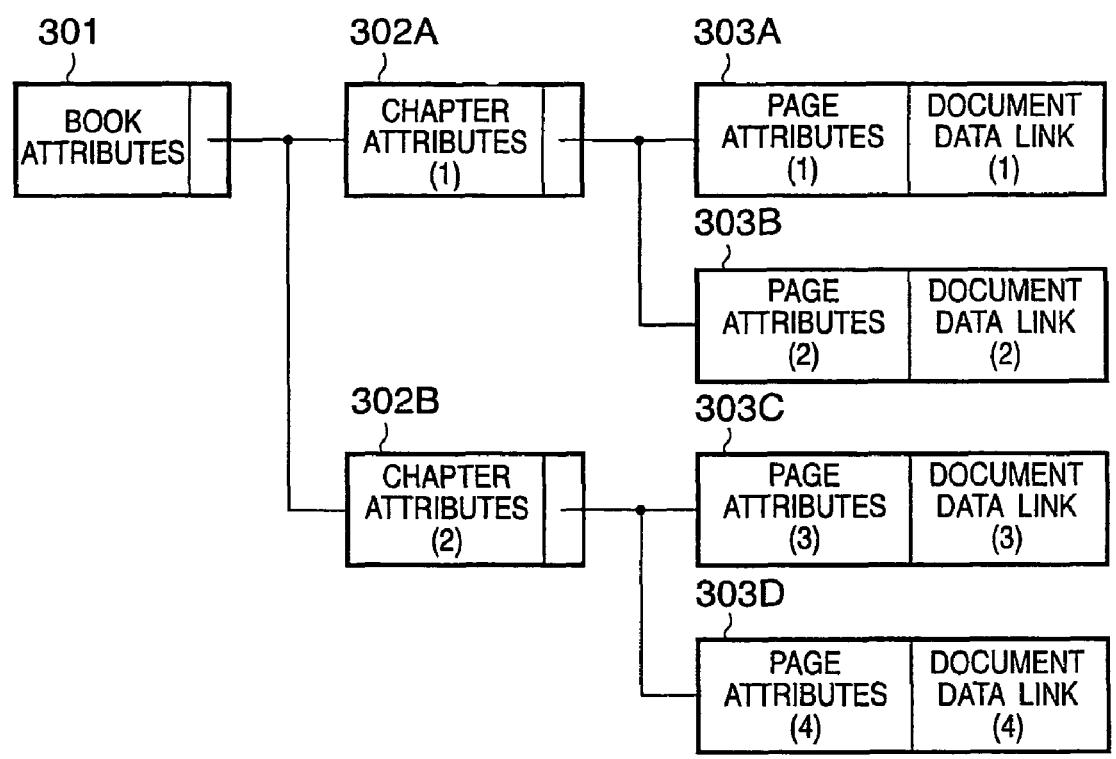

FIGS. 3A and 3B show an example of the structure of the book file 103 in the embodiment of the present invention. Here, FIG. 3A schematically shows an example of the format of the book file 103. As shown in FIG. 3A, in this embodiment, each of a book, a chapter and a page in a book file is shown by a node corresponding to each of them. It is assumed that one book file includes one book. A book and a chapter are concepts for defining a structure as a book. Therefore, a book and a chapter hold defined attribute values and links to a lower layer as the substance. A page has data for each page outputted by an application program as the substance. Therefore, a page includes not only its attribute values but also the substance of a document page (document page data) and link information to each document page data.

A print page to be outputted to a paper medium or the like may include multiple document pages. This structure is not shown by links but shown as attributes of each layer of book, chapter and page.

In FIG. 3A, book attributes are defined for a book 301, and two chapters 302A and 302B are linked to the book 301. These links indicate that the chapters 302A and 302B are included in the book 301. Furthermore, pages 303A and 303B are linked to the chapter 302A, and thereby it is shown that these pages are included in the chapter 302A. Furthermore, attributes are defined for each of the pages 303A and 303B, and links to document data (1) and document data (2) which are the substance of the pages are included, respectively. As shown in FIG. 3B, these links indicate links to the document data (1) and the document data (2) in document data 304, and it is seen that the substance of the pages 303A and 303B is the document data (1) and (2), respectively.

FIGS. 4A and 4B show a list of book attributes. As for items which can be defined redundantly with a lower layer, among book attributes, chapter attributes and page attributes, attribute values of the lower layer are to be preferentially adopted. Therefore, as for items included only in the book attributes, values defined as book attributes are effective through the entire book. However, as for the items overlapping with those of a lower layer, the values are meant to be specified values effective only when values are not defined in the lower layer. Each items shown in FIGS. 4A and 4B does not specifically correspond to one item but may include some related items.

FIG. 5 shows a list of the chapter attributes. FIG. 6 shows a list of the page attributes. The relation between the chapter attributes and the page attributes is similar to the relation between the book attributes and attributes of a lower layer described above.

As apparent from the lists shown in FIGS. 4, 5 and 6, items specific to the book attributes are the following six items: printing method, bookbinding details, front cover/back cover, index paper, slip paper, and chapter segment. These are items defined through an entire book.

First, as the printing method attribute, any of the following three values can be specified: single-sided printing, double-sided printing and bookbinding printing. Here, the bookbinding printing is a method for performing printing in a format enabling bookbinding by folding a bundle of a separately specified number of pieces of paper in folio and binding the bundle. As the bookbinding details attribute, the direction of two-page spread, the number of pieces of paper to be bundled and the like can be specified when the bookbinding printing is specified. Furthermore, the front cover/back cover attribute includes specification of addition of pieces of paper to be a front cover and a back cover when electronic document files to be integrated as a book is printed, and specification of content to be printed on the added pieces of paper.

The index paper attribute includes specification of insertion of index paper having a tab separately prepared in a printing apparatus as a chapter segment, and specification of content to be printed on the index (tab) portion. This index paper attribute is effective when the printing apparatus to be used is provided with an inserter having an insertion function of inserting a piece of paper prepared separately from printing paper into a desired position or when multiple paper feeding cassettes can be used. The same goes for the slip paper attribute to be described next. The slip paper attribute includes specification of insertion of paper provided from an inserter or a paper feeding cassette as a chapter segment, and specification of a paper feeding source if slip paper is to be inserted.

The chapter segment attribute includes specification of whether a new piece of paper should be used, a new print page should be used or nothing should be especially done at a separation position between chapters. In the case of the single-sided printing, use of a new piece of paper and use of a new print page have the same meaning. In the case of the double-sided printing, consecutive chapters are not printed on one piece of paper if "use of a new piece of paper" is specified. However, consecutive chapters may be printed on the front and back sides of one piece of paper if "use of a new print page" is specified.

As for the chapter attributes, there are not items specific thereto, and all the items overlap with book attributes, as shown in FIGS. 4 and 5. Therefore, if definition of an item is different in the chapter attributes and in the book attributes, then a value defined in the chapter attributes is given priority. Here, items common only to the book attributes and the chapter attributes are the following five items: paper size, paper direction, specification of N-up printing, enlargement/reduction, and paper discharge method.

The N-up printing specification attribute is an item for specifying the number of document pages to be included in one print page. As arrangements which can be specified by the N-up printing specification attribute, there are included 1×1, 1×2, 2×2, 3×3, 4×4 and the like. Next, the paper discharge method attribute is an item for specifying whether or not to perform stapling for discharged paper, and the effectiveness of this attribute depends on whether or not the printing apparatus to be used has a stapling function.

As items specific to the page attribute, there are included page turn attribute, zoom, arrangement specification, annotation, variable item, page division and the like. The page turn attribute is an item for specifying the turn angle with which a document page is arranged on a print page. The zoom attribute is an item for specifying the variable magnification of a document page. The variable magnification is specified on the assumption that the size of a virtual logical page area is 100%. The virtual logical page area is an area occupied by one document page when the document page is arranged according to specification of N-up or the like. For example, if 1×1 is specified for the N-up printing specification attribute, then the virtual logical page area is an area corresponding to one print page. If 1×2 is specified for the N-up printing specification attribute, the virtual logical page area is an area obtained by reducing each edge of one print page to 70%.

For each page of an electronic document file, an area called a variable area (field area) can be set into which variable data is merged. If the variable area is set, the position and size of the variable area and a link to a data field in a database are described under a variable item (Item 7 in FIG. 6) among the page attributes. When variable printing is performed, a variable area is generated at the position and with the size as described under the variable item, and variable data is read from field areas in the database associated by the link as respective records, and merged and outputted for each page. A printed matter is outputted for each record.

Furthermore, attributes common to book, chapter and page include a watermark attribute and a header/footer attribute. A watermark is an image, a character string or the like which is separately specified and which is to be redundantly printed on data created by an application. A header and a footer are watermarks to be printed on the upper margin and the lower margin of each page, respectively. As for the header and the footer, however, items which can be specified by variables are prepared, such as a page number, and time and date.

The content which can be specified for the watermark attribute and the header/footer attribute is common to chapter and page, but the content to be specified for book is different. In a book, it is possible not only to set the content of a watermark or a header/footer but also to specify how the watermark or the header/footer should be printed through the entire book. Meanwhile, in a chapter or a page, it is possible to specify whether or not to print the watermark or the header/footer set for the book.

<Procedure for Generating a Book File>

Next, description will be made on a procedure for creation of a book file with a configuration as described above by means of the bookbinding application 104 and the electronic document writer 102. The book file creation procedure is realized as a part of a book file editing operation by the bookbinding application 104.

Figure 7:
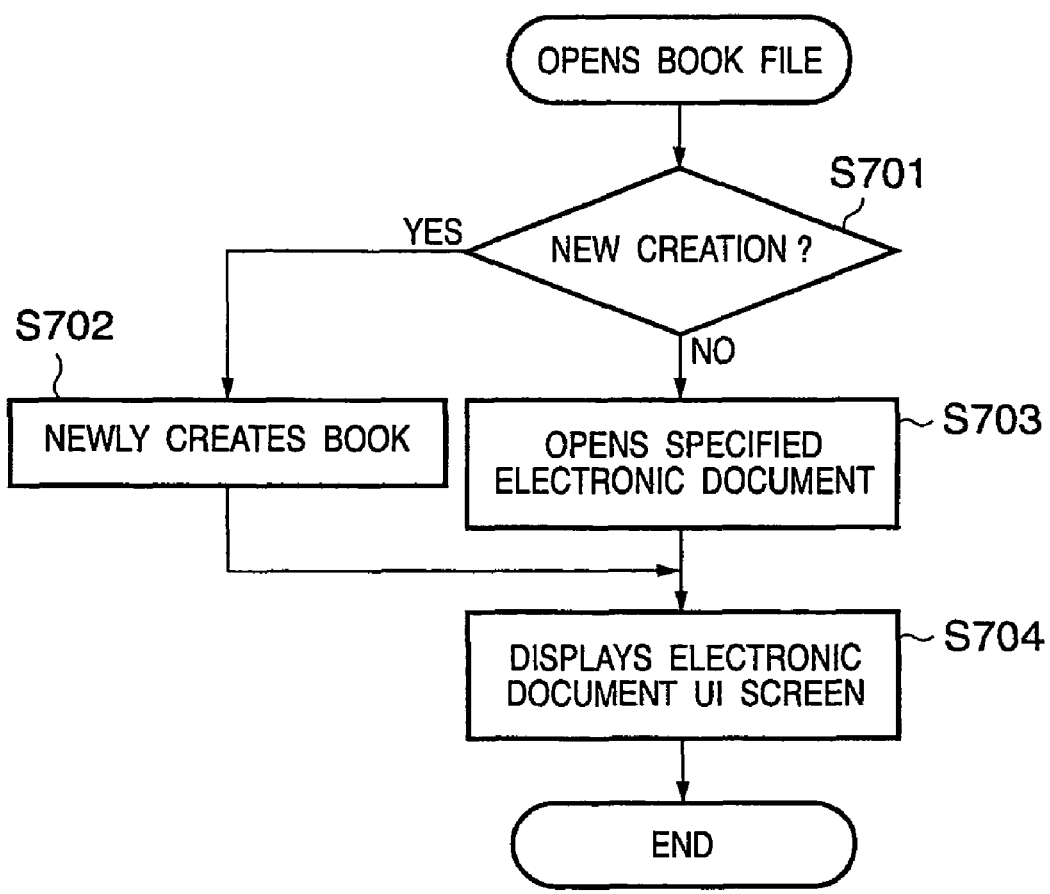
FIG. 7 is a flowchart for illustrating a procedure for opening a book file by means of a bookbinding application 104 according to the embodiment of the present invention.

FIG. 7 is a flowchart for illustrating a procedure for opening a book file by means of the bookbinding application 104 according to the embodiment of the present invention. First, it is determined by the bookbinding application 104 whether a book file to be opened is a book file to be newly created or an existing book file (step S701). As a result, if it is a book file to be newly created (Yes), then a book file without a chapter is newly created (step S702). If the newly created book file is shown with the example of FIG. 3, it has only a book node 301, and this is a node of a book without a link to a node corresponding to a chapter or a lower node. As the book attributes for this book, attribute values prepared in advance for new creation are applied and set.

Figure 11:
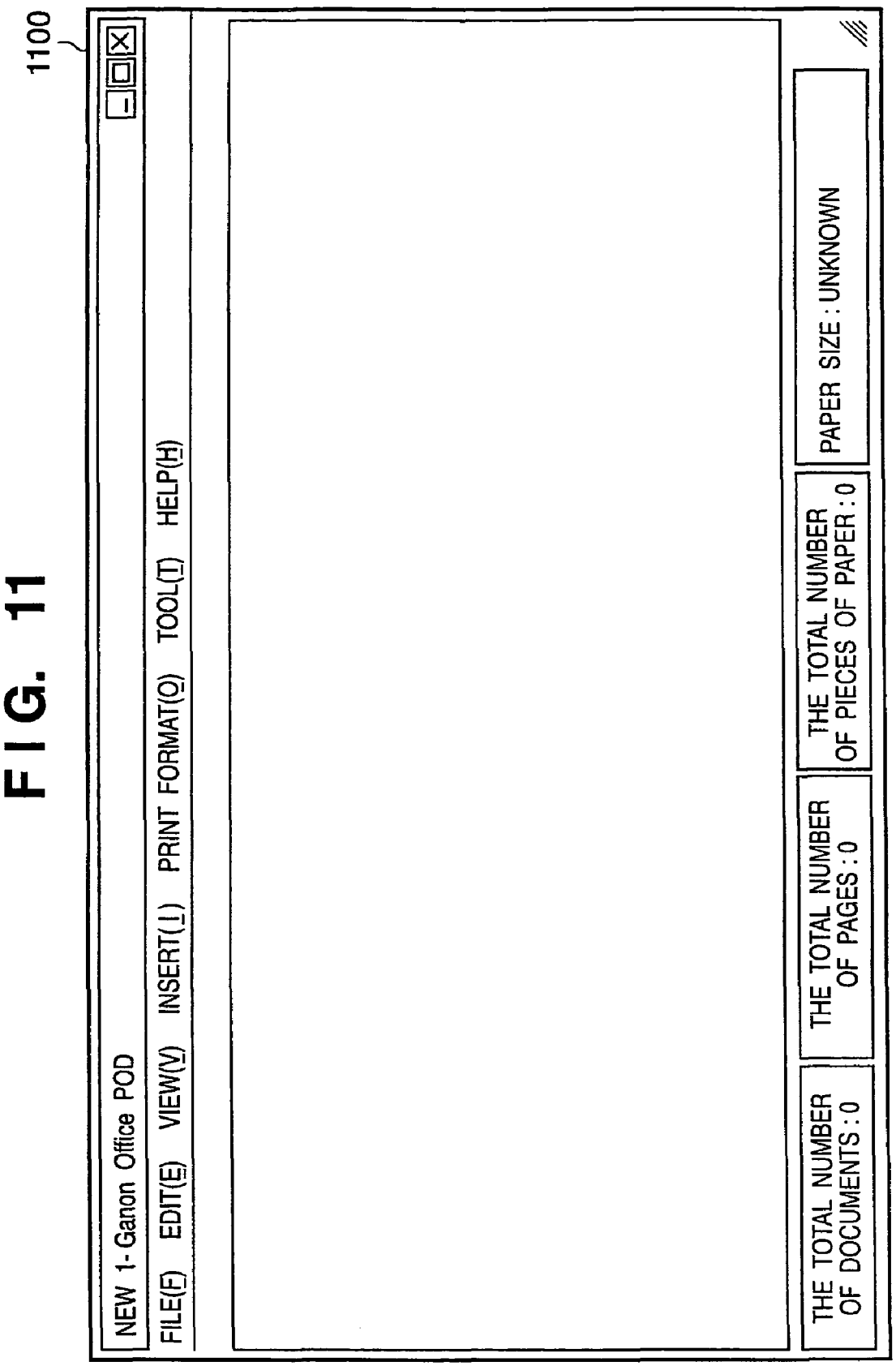
FIG. 11 shows an example of a UI screen of the bookbinding application 104 which is to be displayed when a book file is newly created.

Then, a user interface (UI) screen for editing the new book file is displayed (step S704). FIG. 11 shows an example of the UI screen of the bookbinding application 104 which is to be displayed when a book file is newly created. In this case, since the book file does not have substantial content, nothing is displayed on the UI screen 1100 as shown in FIG. 11.

Figure 10:
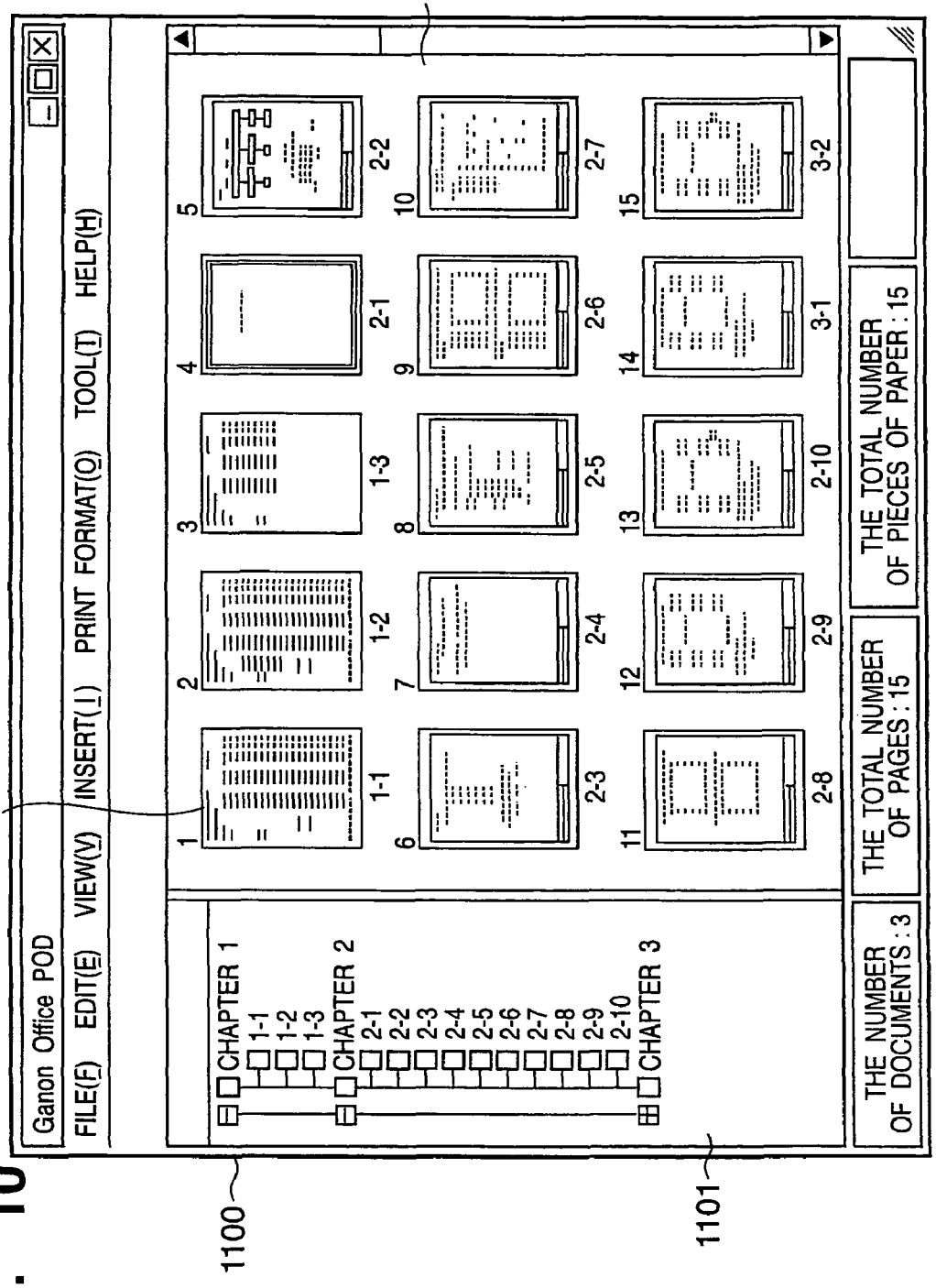
FIG. 10 shows an example of a UI screen of the bookbinding application 104 on which a book file specified from among existing book files is displayed.

On the other hand, if it is determined at step S701 that there is an existing book file (No), then a specified book file (electronic document file) is opened (step S703). Then, the process proceeds to step S704, where a user interface (UI) screen is displayed in accordance with the structure, attributes and content of the book file. FIG. 10 shows an example of the UI screen of the bookbinding application 104 on which a book file specified from among existing book files is displayed. As shown in FIG. 10, the UI screen 1100 in this case includes a tree portion 1101 showing the structure of the book and a preview portion 1102 showing a printed condition.

As shown in FIG. 10, in the tree portion 1101, there are displayed chapters included in the book and pages included in each chapter with a tree structure as shown in FIG. 3A. The pages displayed in the tree portion 1101 are document pages. In the preview portion 1102, the content of print pages are reduced and displayed. The structure of the book is reflected on the order of display of the print pages.

Here, it is possible to add as a new document application data converted into an electronic document file by the electronic document writer 102 to the book file opened in the procedure as described above. This function is called an "electronic document file import function". By importing an electronic document file to the book file newly created in the procedure shown in FIG. 7, the book file is given substance. This function is activated by a drag and drop operation of application data to the screen in FIG. 10.

Figure 8:
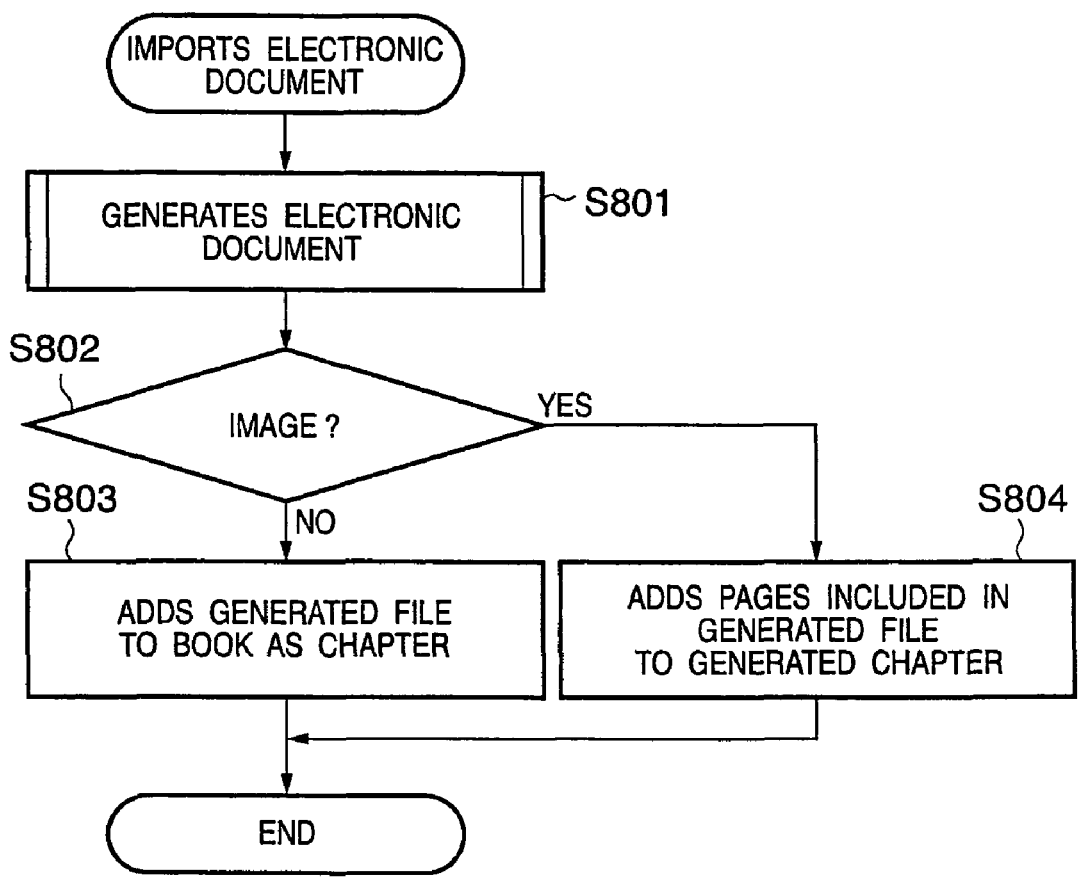
FIG. 8 is a flowchart for illustrating a procedure for importing an electronic document file into a book file.

FIG. 8 is a flowchart for illustrating a procedure for importing an electronic document file into a book file. First, an application program which generated specified application data is activated; the electronic document writer 102 is specified as a device driver; and application data is outputted so that it is converted to electronic document data (step S801).

Then, after the conversion to the electronic document data ends, it is determined whether or not the converted data is image data (step S802).

Under the Windows OS, for example, the determination at step S802 is based on the file extension of the application data. For example, if the extension is "bmp", then the data can be determined as Windows bit map data. In the case of "jpg", the data can be determined as compressed image data. In the case of "tiff", the data is determined as image data in a tiff format. Furthermore, in the case of such an image data, since it is possible to generate an electronic document file directly from image data without activating an application program, the processing at step S801 may be omitted.

As a result, if it is determined by the determination at step S802 that the data is not image data (No), then the electronic document file generated at step S801 is added as a new chapter to the book of the book file currently opened (step S803). As for chapter attributes, in the case of chapter attributes common to book attributes, values of the book attributes are copied, and in the case of chapter attributes not common to book attributes, specified values prepared in advance are set.

If it is determined by the determination at step S802 that the data is image data (Yes), then a new chapter is not added in principle, and each document page included in the electronic document file generated at step S801 is added to a specified chapter (step S804). However, if the book file is a newly created file, then a new chapter is created, and each page of the electronic document file is added as a page which belongs to the chapter.

In this case, as for page attributes, in the case of page attributes common to attribute of a higher layer, values of the higher layer attributes are given, and in the case of page attributes which have been defined for the application data and taken over to the electronic document file, the attributes are given. For example, if N-up is specified for the application data, the attribute value is taken over. In this way, a new book file is created, or a new chapter is added.

Figure 9:
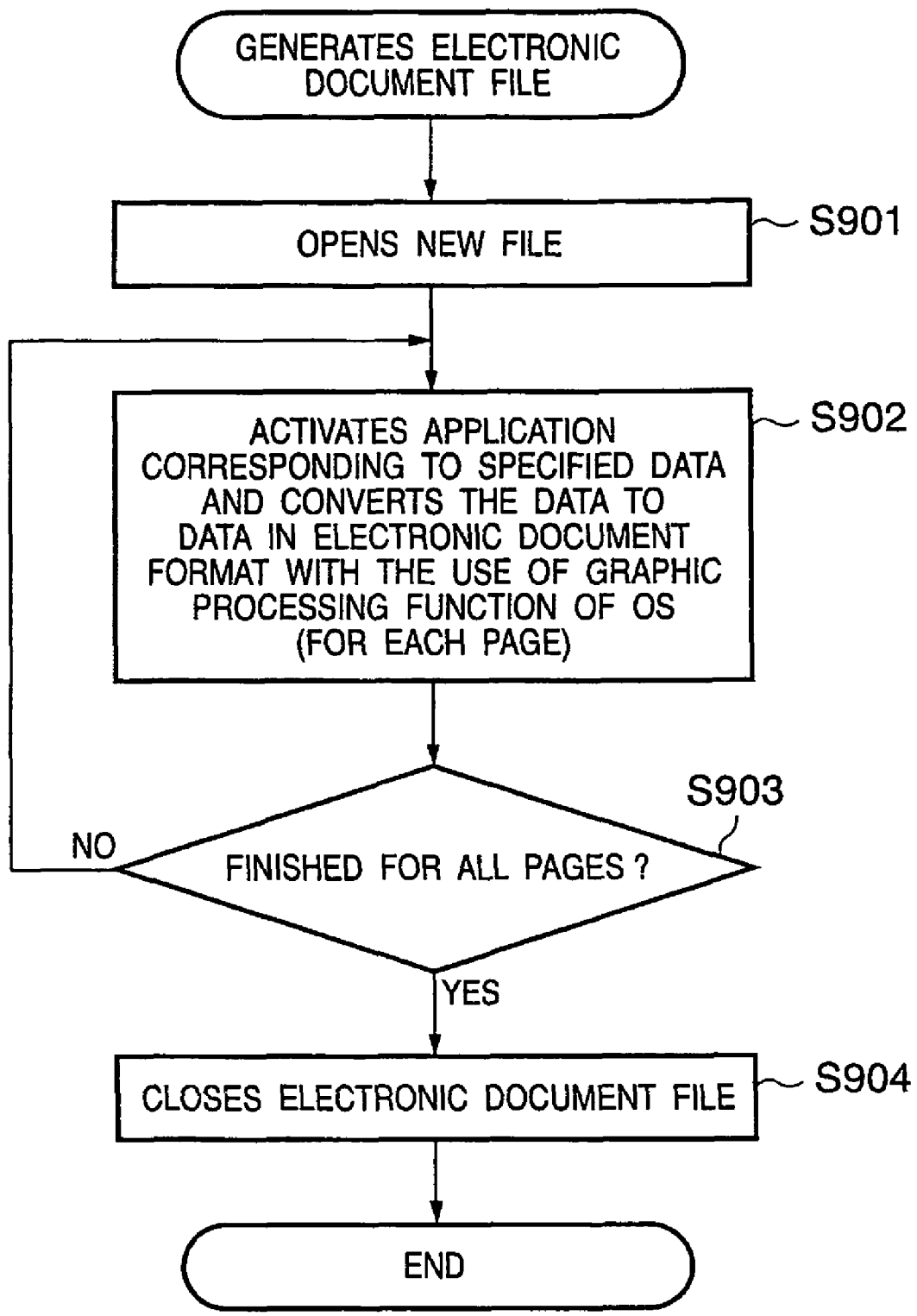
FIG. 9 is a flowchart for illustrating a detailed procedure of processing for generating an electronic document file by means of an electronic document writer 102 (step S801) shown in FIG. 8.

FIG. 9 is a flowchart for illustrating a detailed procedure of processing for generating an electronic document file by means of the electronic document writer 102 (step S801) shown in FIG. 8. First, a new electronic document file is created and opened (step S901). An application corresponding to the specified application data is activated and caused to send an output command to the output module of the OS, with the electronic document writer as a device driver. The output module converts the received output command to data in an electronic document format by means of the electronic document writer 102 and outputs it (step S902). In this case, the output destination is the electronic document file opened at step S901.

Then, it is determined whether or not the conversion processing of step S902 has ended for all the specified data (step S903). As a result, if it is determined that the conversion processing has not ended yet (No), then the process returns to step S902 to perform the conversion processing. On the other hand, if it is determined that the all the conversion processing has ended (Yes), then the generated electronic document file is closed (step S904). The electronic document file generated by the electronic document writer 102 is a file which includes the substance of the document data shown in FIG. 3B.

<Editing of a Book File>

As described above, a book file can be created from application data. The following editing operations can be performed for chapters and pages of the generated book file:

(1) newly add
(2) delete
(3) copy
(4) cut
(5) paste
(6) shift
(7) change chapter name
(8) reassign page number/name
(9) insert cover
(10) insert slip paper
(11) insert index paper
(12) page layout for each document page In addition to the editing operations described above, an operation of canceling an editing operation once performed or an operation of re-performing an operation once cancelled. These editing functions enable editing operations such as integration of multiple book files, re-arrangement of a chapter or page in a book file, deletion of a chapter or pages in a book file, change in layout of a document page, and insertion of slip paper or index paper.

By performing the editing operations described above, the result of the editing operations is reflected on the attributes shown in FIG. 4 or FIG. 5 or reflected on the structure of the book file. For example, if the operation of newly adding a blank page is performed, then a blank page is inserted into at a specified position. Then, this blank page is treated as a document page. If the layout of a document page is changed, then the content of the change is reflected on the attributes of printing method, N-up printing, front cover/back cover, index paper, slip paper or chapter separation.

<Output of a Book File>

The book file created and edited as described above is intended to be printed out finally. If a user selects a file menu from the UI screen 1100 of the bookbinding application 104 shown in FIG. 10 and further selects "print" therefrom, print output is performed by a specified output device.

In this case, the bookbinding application 104 first creates a job ticket from a book file currently opened and hands the job ticket to the electronic document despooler 105. The electronic document despooler 105 converts the job ticket to an output command of the OS (for example, the GDI function of Windows) and sends it to an output module (for example, a GDI). The output module generates a command suitable for a device by means of the printer driver 106 and sends it to the device.

Here, the job ticket is data with a structure in which a document page is the minimum unit. The structure of the job ticket defines the layout of a document page on paper. One job ticket is issued for one job. Therefore, there is a node, which is a document, at the top layer, and attributes for the entire document (for example, double-sided printing/single-sided printing and the like) are defined therefor. Paper nodes belong to the document node, and attributes such as specification of an identifier of paper to be used and a paper feeding port of a printer are included. To each of the paper nodes, nodes of sheets to be printed on the paper belong.

Here, one sheet corresponds to one piece of paper. To each sheet, a print page (physical page) belongs. For example, in the case of the single-sided printing, one physical page belongs to one sheet, and in the case of the double-sided printing, two physical pages belong to one sheet. To each physical page, a document page to be arranged thereon belongs. As attributes of a physical page, the layout of a document page is included.

The electronic document despooler 105 converts the job ticket as described above to an output command to an output module.

<Another system configuration)

The outline of the document processing system of this embodiment has been described above. Though the system has a stand-alone type system configuration as shown in FIG. 1, a server/client system extended from this stand-alone type system can also enable creation and editing of a book file in almost the same configuration and procedure. However, the book file and print processing is managed by a server.

Figure 12:
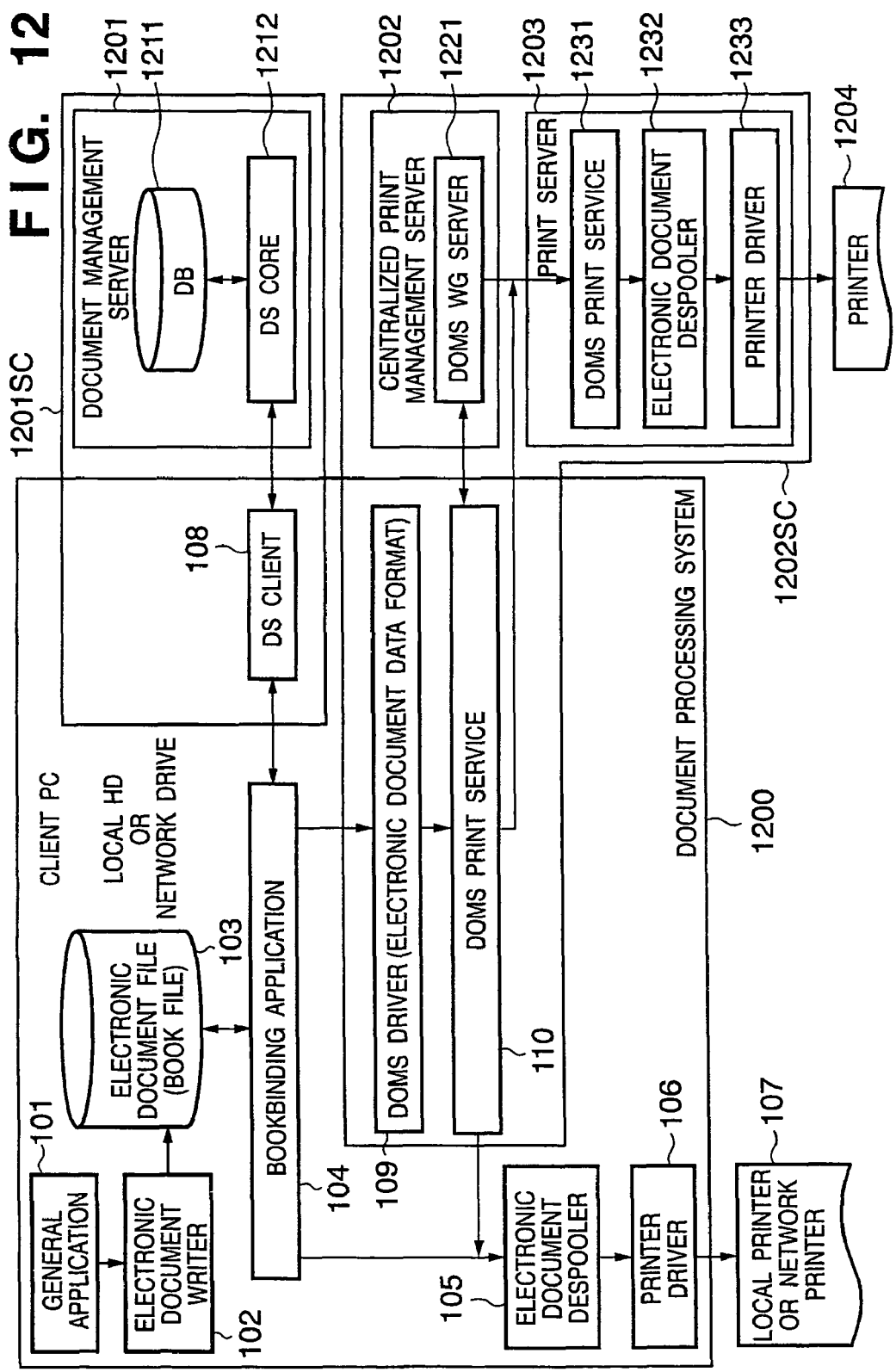
FIG. 12 is a software block diagram of a server/client type document processing system according to the embodiment of the present invention.

FIG. 12 is a software block diagram of a server/client type document processing system according to the embodiment of the present invention. The server/client type document processing system shown in FIG. 12 has configuration obtained by adding a DOMS (document output management service) driver 109, which is a client module, a DOMS print service module 110 and a DS (document service) client module 108 to the stand-alone type document processing system shown in FIG. 1.

As shown in FIG. 12, to a server/client type document processing system 1200, there are connected a document management server 1201, a centralized print management server 1202 and a print server 1203. These servers are usually connected to the server/client type document processing system 1200 via a network. However, in the case where the server also functions as a client at the same time, the servers are connected via an inter-process communication which simulates inter-network communication.

In the example shown in FIG. 12, both of the document management server 1201 and the centralized print management server 1202 are connected to the client. However, there may be a case where only one of them exists on the network. For example, if the connected server is the document management server 1201, then a server/client system 1201SC which includes the DS client module 108 of the document management server 1201 is added to the stand-alone type document processing system described above. If the connected server is the centralized print management server 1202, then a print management server/client system 1202SC which includes the client module of the centralized print management server 1202 is added to the stand-alone type document processing system described above.

The document management server 1201 shown in FIG. 12 is a server for storing a book file (electronic document file) 103 created and edited by the bookbinding application 104. When the book file 103 is managed by the document management server 1201, the book file 103 is stored in a database 1211 of the document management server 1201 instead of a local HD of the client PC or in addition to the local HD. Storage and reading of the book file 103 between the bookbinding application 104 and the document management server 1201 is performed via the DS client module 108 and a DS core 1212.

In FIG. 12, the centralized print management server 1202 is a server for managing printing of the book file 103 stored in the server/client type document processing system 1200 or the document management server 1201. A request for printing by the client is sent to a DOMSWG server module 1221 of the centralized print management server 1202 via the DOMS driver 109 and the DOMS print service module 110.

When printing is performed by a printer of the client, the centralized print management server 1202 hands electronic document data to the electronic document despooler 105 via the DOMS print service module 110 of the client. When printing is performed by the print server 1203, the centralized print management server 1202 sends the electronic document data to the DOMS print service module 1231 of the print server 1203. For example, the centralized print management server 1202 performs security checking for authorization of a user who has issued a request to print a stored book file 103 or stores a print processing log.

As described above, in this embodiment, the document processing system can be realized as a stand-alone type system or a client/server type system.

<Content of Preview Display>

As described above, when a book file 103 is opened by the bookbinding application 104, the user interface screen 1100 shown in FIG. 10 is displayed. In FIG. 10, a tree showing the structure of a book currently opened (hereinafter referred to as a "target book") is displayed in the tree portion 1101.

In FIG. 10, three display methods to be selected in response to specification of a user are prepared for the preview portion 1102. The first display method is a mode called "document view" in which a document page is displayed as it is. In this document view mode, the content of document pages belonging to a target book is displayed in a reduced condition. Layout is not reflected on the display in the preview portion 1102. The second display method is a print view mode. In this print view mode, document pages are displayed with the layout of the document pages reflected thereon. The third display method is a simplified print view mode. In this simplified print view mode, the content of each document page is not reflected on display in the preview portion, and only the layout thereof is reflected.

<Stapling Control>

Figure 13:
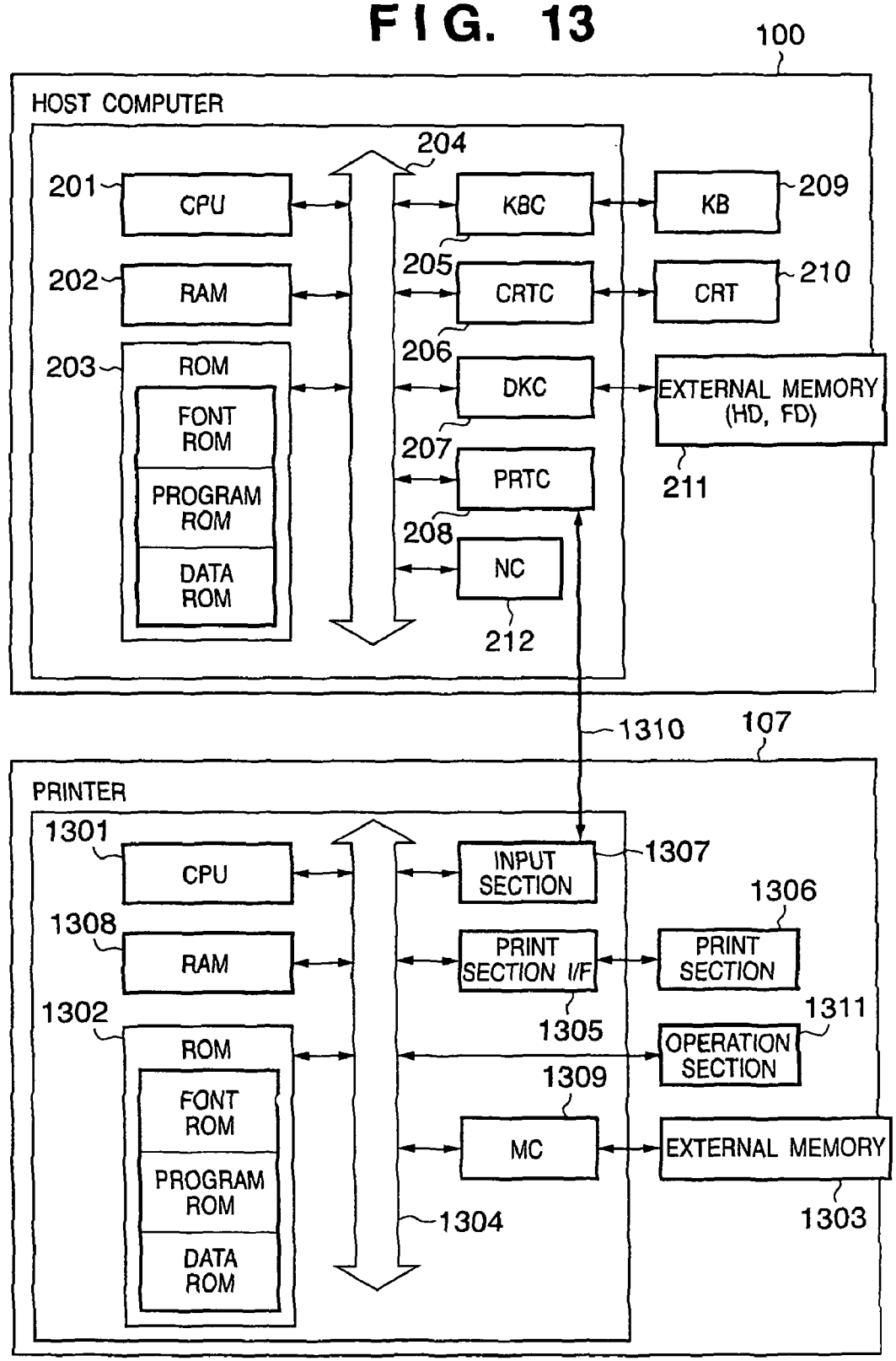
FIG. 13 is a block diagram showing the configuration of a document processing system which is provided with a computer 100 and a printer 107 and which performs stapling control according to the embodiment of the present invention.

Next, description will be made on stapling control to be performed by the bookbinding application 104 of the computer 100 which is connected to a printer having a stapling function. FIG. 13 is a block diagram showing the configuration of a document processing system which is provided with the computer 100 and the printer 107 and which performs stapling control according to the embodiment of the present invention. As shown in FIG. 13, the document processing system is configured by the host computer 100 shown in FIG. 2 and the printer 107 having stapling function.

The configuration of the printer 107 will be described below. The present invention can be applied to any of a single piece of equipment, a system configured by multiple pieces of equipment and a system connected via a network such as a LAN and a WAN to perform processing only if various functions according to this embodiment can be realized thereby.

As shown in FIG. 13, a CPU 1301 in the printer 107 outputs an image signal as output information to a print section (printer engine) 1306 via a print section I/F 1305 connected to a system bus 1304, based on a control program and the like stored in a ROM for programs within a ROM 1302 or a control program and the like stored in an external memory 1303.

In the ROM for programs within the ROM 1302, there are stored control programs of the CPU 1301 and the like. Furthermore, in the ROM for fonts within the ROM 1302, there are stored font data and the like to be used when output information is generated. Furthermore, in the ROM for data within the ROM 1302, there are stored information to be used on the computer 100 in the case of a printer without an external memory 1303 such as a hard disk, and the like.

The CPU 1301 is capable of performing communication processing with the host computer 100 via an input section 1307, and can notify information and the like within the printer 107 to the host computer 100. A RAM 1308 is a RAM which functions as a main memory or a work area of the CPU 1301 and is configured so that the memory capacity can be extended by an optional RAM to be connected to an expansion port not shown.

The RAM 1308 is used as an area for development of output information, an area for storage of environment data, an NVRAM and the like. Access control for the hard disk (HD) or the external memory 1303 such as an IC card described above is performed by a memory controller (MC)

1309. The external memory 1303 is connected as an optional extra, and font data, an emulation program, form data and the like are stored therein. An operation panel 1311 is constituted by switches and LED indicators to be operated by a user.

The number of the external memory 1303 described above is not limited to one, and multiple external memories may be provided. For example, such configuration is also possible that multiple optional cards and external memories in which a program for interpreting a printer control language of a different language system is stored can be connected in addition to internal fonts. Furthermore, an NVRAM not shown may be provided to store printer mode setting information from the operation panel 1311.

<Configuration of a Variable Printing System>

Figure 14:
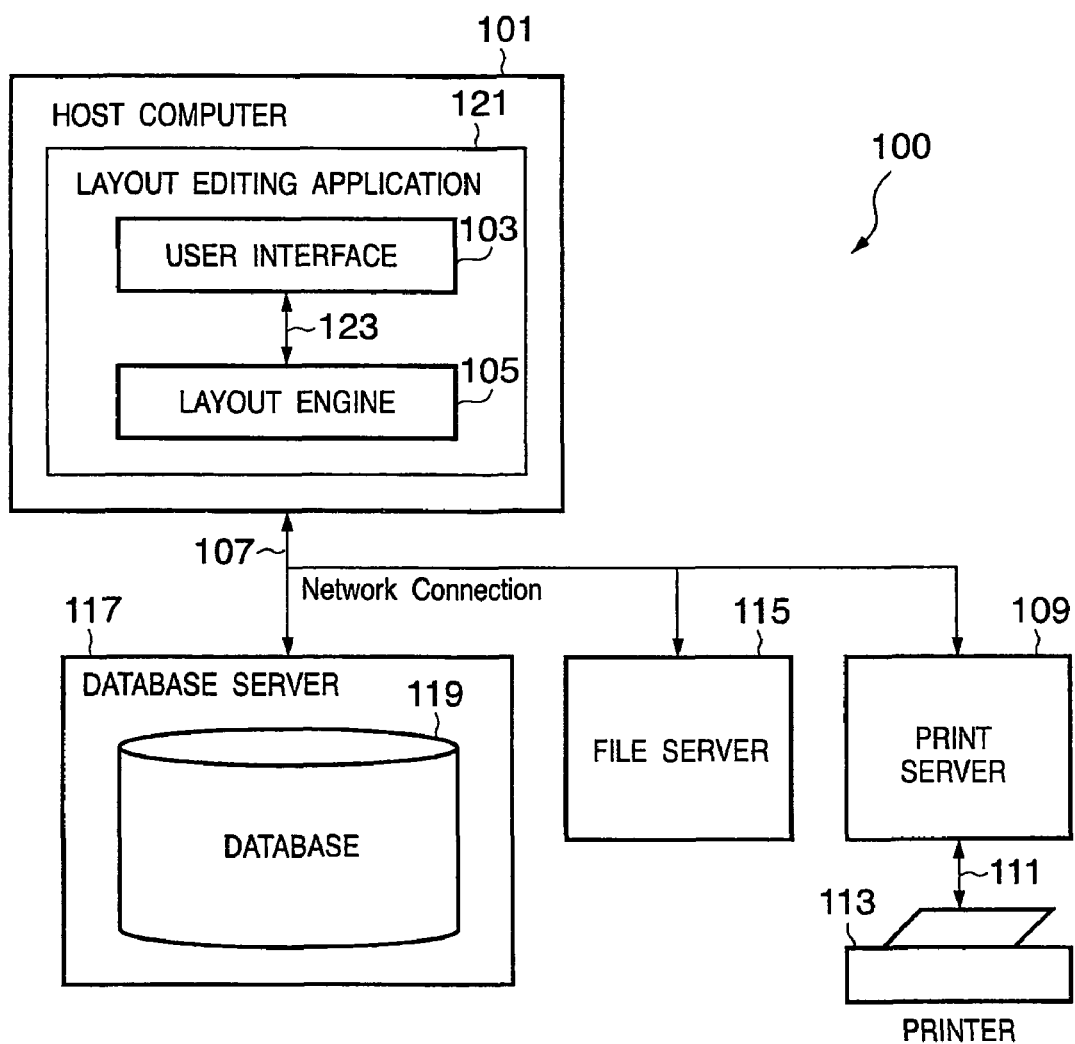
FIG. 14 is a block diagram showing the configuration of a variable printing system 100 which prints a variable data document.
Figure 15:
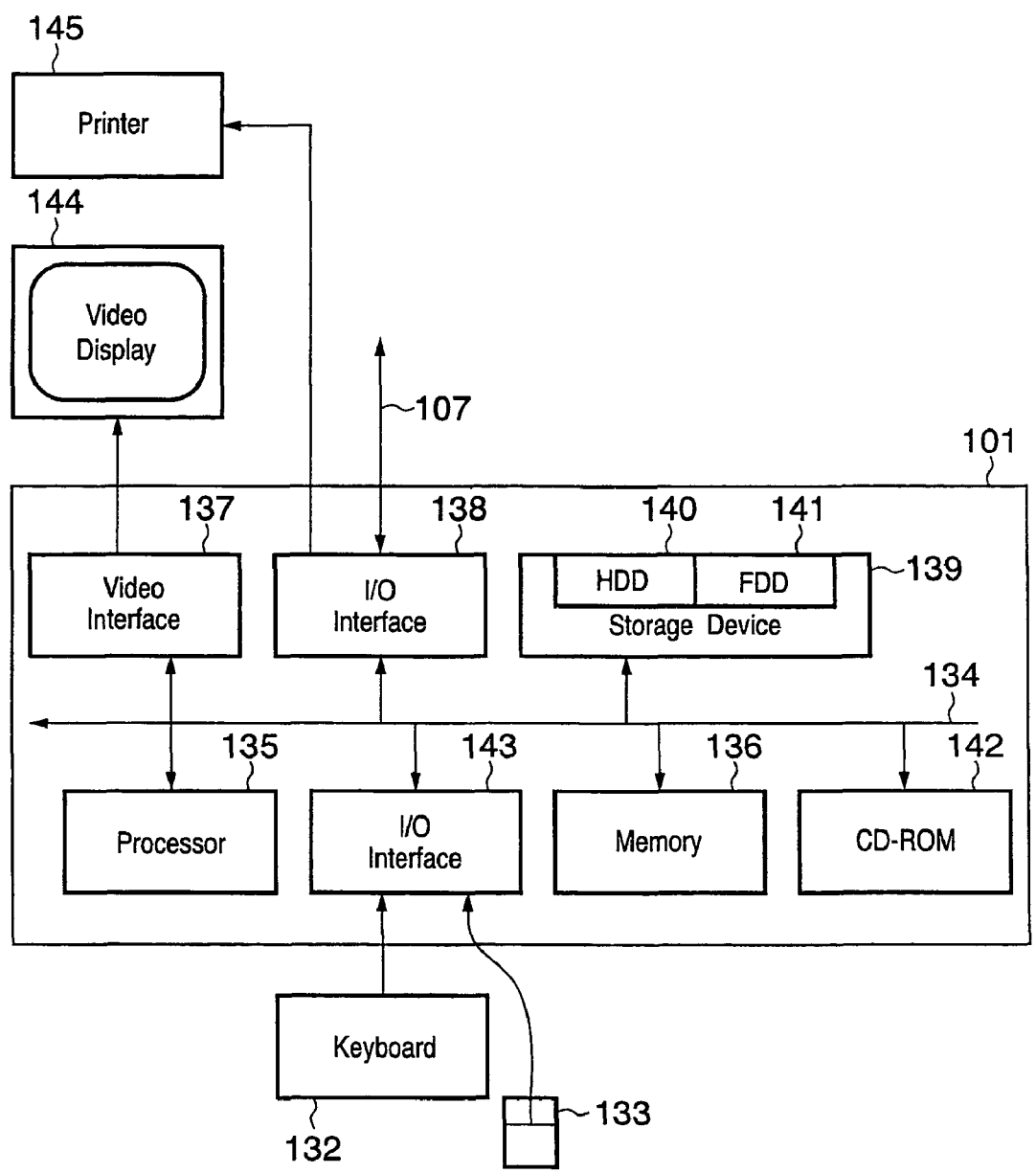
FIG. 15 is a hardware block diagram of the variable printing system 100 shown in FIG. 14.

The configuration of a system for realizing variable printing will be described below. FIG. 14 is a block diagram showing the configuration of a variable printing system 100 which prints a variable data document. FIG. 15 is a hardware block diagram of the variable printing system 100 shown in FIG. 14.

Processing of a variable data document to be described below in detail is performed by a general computer module 101 shown in FIG. 15. A process to be described with the use of FIG. 15 is performed within the computer module 101 and is executed by an entire or a part of software like a layout editing application program 121 to be executed on the system 100. Especially, layout and editing steps and a printing step inevitably caused are performed in response to instructions by software executed by the general computer module 101.

The software is stored, for example, in a computer-readable storage medium including a storage device described below. The software is loaded to the computer from the computer-readable storage medium and executed by the computer 101. A computer-readable storage medium having such software or computer programs is a computer program product. Use of the computer program product on the computer brings about an apparatus which is advantageous in performing layout/editing of a document or printing of variable data.

The computer module 101 is connected to an input device such as a pointing device like a keyboard 132 and a mouse 133 and to an output device including a display device 144 and a local printer 145 according to the situation. An input/output (I/O) interface 138 can connect the computer module 101 to another computer different from this variable printing system 100 via a network 107. For example, a local area network (LAN) and a wide area network (WAN) are given as typical examples of the network 107.

The computer module 101 typically includes at least one processor unit 135, a memory unit 136 configured, for example, by a semiconductor random access memory (RAM) or a read-only memory (ROM), an input/output (I/O) interface including a video interface 137, an I/O interface 143 for the keyboard 132 and the mouse 133. A storage device 139 typically includes a hard disk drive (HDD) 140 and a floppy® disk drive (FDD) 141. A magnetic tape drive may be used though it is not shown in FIG. 15.

Furthermore, in FIG. 15, a CD-ROM drive 142 is provided as a non-volatile data source. The computer module 101 utilizes each of the above-described components 135 to 143 which perform communication via a mutual connection bus 134, by means of an operation system such as GNU/Linux and Microsoft Windows, or by means of a method in a common operation mode of a computer system formed typically in accordance with an operation system or with a well-known related technique. As examples of a computer in the arrangement shown in FIG. 15, an IBM-compatible PC, Sparcstation by SUN Microsystems, Inc., and a computer system including those are conceivable.

The layout editing application program 121 shown in FIG. 14 typically resides in the hard disk drive 140 shown in FIG. 15, and is executed, read and controlled by the processor 135. For data fetched from an intermediary storage device for the layout editing application program 121 and a network, the semiconductor memory 136 is used in response to the hard disk drive 140. In some instances, the layout editing application program 121 is encoded on a CD-ROM or a floppy® disk, read through the corresponding CD-ROM drive 142 or floppy® disk drive 141, and provided for a user.

Alternatively, as another method, the layout editing application program 121 may be read by a user from the network 107. Furthermore, the software may be possibly loaded into the computer module 101 from other computer-readable storage media with a suitable size, including a magnetic tape, a ROM, an integrated circuit, a magneto-optical disk, wireless communication, infrared communication between the computer module 101 and another device, a computer-readable card such as a PCMCIA card, e-mail communication, and the Internet or an intranet having recorded information on WEB sites. These are only examples of related computer-readable media, and other computer-readable storage media may be used.

The layout editing application program 121 instructs variable data printing (VDP) to be performed, and it includes two software components. One of these components is a layout engine 105. The layout engine 105 is a software component for calculating, based on restrictions and a size given within the range of a rectangle area, the rectangle and positions of lines. A user interface 103, which is the second component, provides a user with a mechanism for enabling the user to create a document template and make association with a data source within the document template.

The user interface 103 and the layout engine 105 perform communication via a communication channel 123. The data source for generating a document is generally a typical database 119 existing on a database server 117 configured by another computer which runs a database application. The host computer 101 communicates with the database server 117 via the network 107.

The layout editing application program 121, which is a variable data printing application, generates a document template to be stored in a file server 115 configured by the host computer 101 or another general computer. The layout editing application program 121 also generates a document configured by a document template merged with data. These documents are stored in a local file system of the host computer 101 or the file server 115, or it is immediately printed with a printer 113.

A print server 109 is a computer for providing a network function to a printer which is not directly connected to the network. The print server 109 and the printer 113 are connected to each other via a typical communication channel 111.

Figure 16:
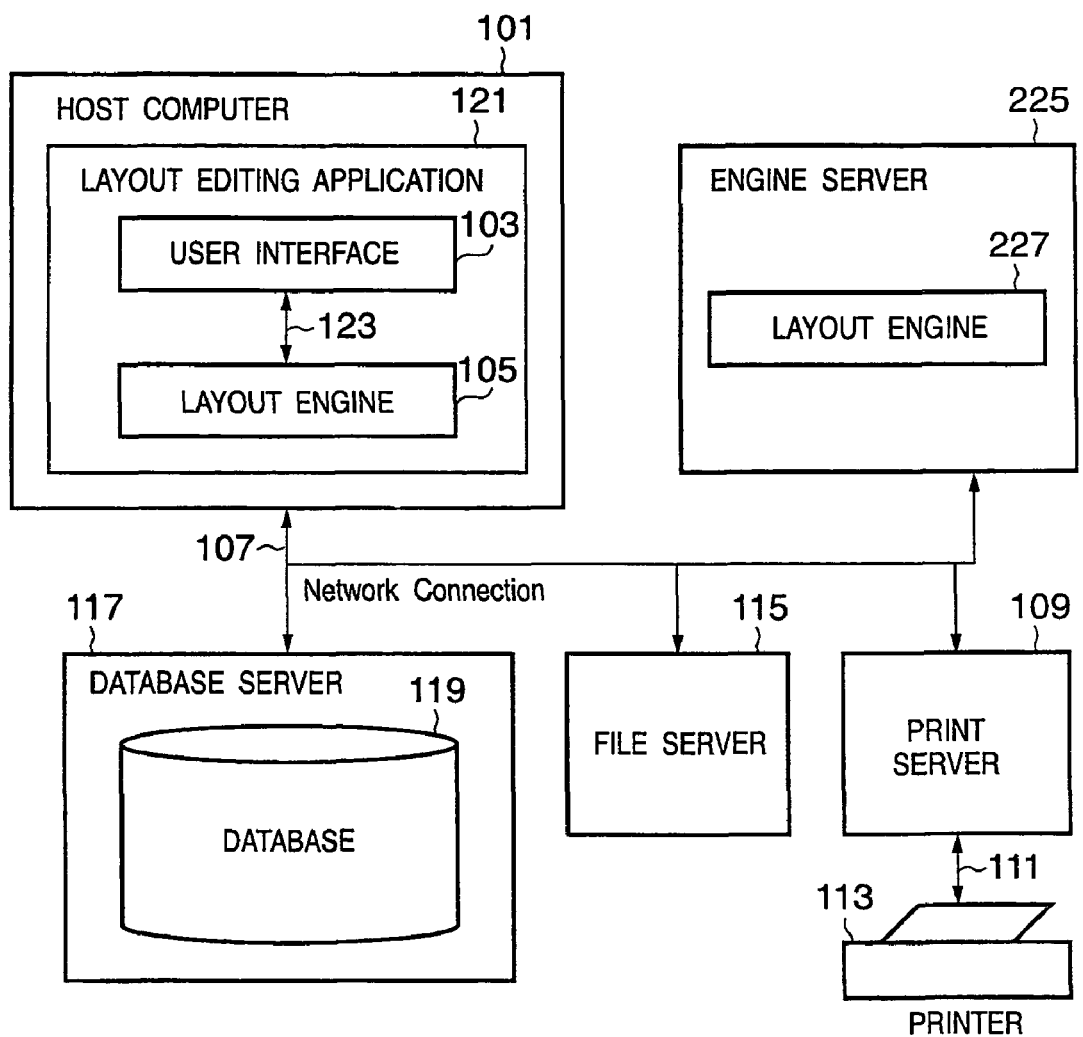
FIG. 16 is a block diagram showing the configuration of another variable printing system 100 which prints a variable data document.

FIG. 16 is a block diagram showing the configuration of another variable printing system 100 which prints a variable data document. The system shown in FIG. 16 is a system similar to the systems shown in FIGS. 14 and 15, which includes a separated version 225 of the layout engine 105, and it is only different in that an engine server 227 is added thereto.

The engine server 227 is a typical computer. A document template stored in the file server 115 can be combined with data stored in the database 119 to generate a document by means of the layout engine 225 for the purpose of printing or other purposes. Such an operation is performed as a print request or a preview request for any record, in response to an instruction via the user interface 103.

<Block Diagram of an Application>

FIG. 17 shows a typical application main window which includes a menu bar, a tool bar, a work area and a floating pallet, in the variable printing system. As shown in FIG. 17, the user interface 103 includes a user interface formed by an application window 1701 to be displayed on a video display 144 shown in FIG. 15 when operation is performed. The window 1701 is characterized by a menu bar 1702 for hiding the window 1701 or moving the window 1701 to any other place on the screen, a tool bar 1703, a work area 1706 which can be moved based on to the position and operation of the mouse 133, a pallet 1711 which is optional, and a cursor/pointer device 1713.

As known as a well-known technique, the menu bar 1702 has a lot of menu items 1704 extended below the menu option hierarchy. The tool bar 1703 has a lot of tool buttons and widget 1705 which can be hidden or displayed by special modes of the application. Furthermore, optional rulers 1708 are used to indicate the position of a pointer, a page, a line, a margin guide, a container or an object within the work area.

In FIG. 17, the pallet 1711 is used to access an additional function such as a variable data library. The pallet 1711 has a window control 1712 for moving, resizing and closing the pallet 1711 on the window. The pallet 1711 can be displayed on the front of the work area or hidden behind an object, as an optional extra. The pallet 1711 is restricted to be displayed within the range of the window 1701. Alternatively, it is permitted to display a part or the whole thereof outside the window 1701.

Figure 18:
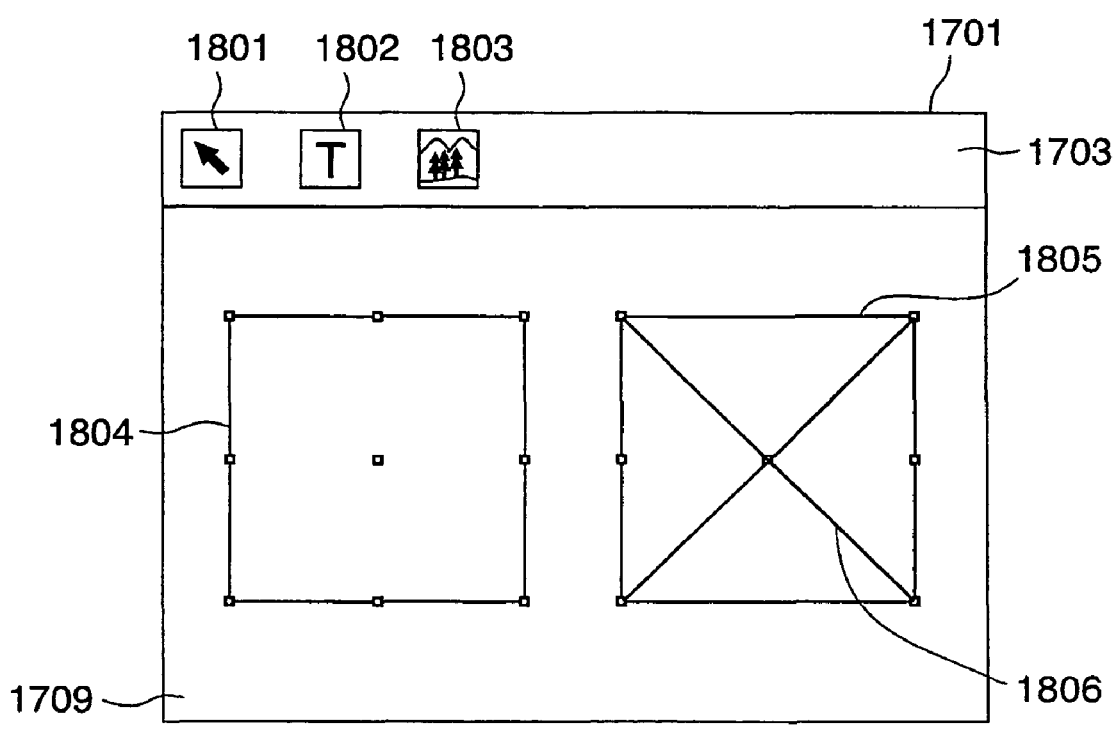
FIG. 18 shows one face of a typical container in the variable printing system with a screen, tools and icons.

FIG. 18 shows one face of a typical container in the variable printing system with a screen, tools and icons. As shown in FIG. 18, the tool bar area 1703 is provided with at least "buttons" shown below, which can be selected by a user.

A selection tool button 1801 is used for selection, shift, size change and resizing of an edge of a container. It is possible to select multiple containers by dragging a selection box around the (multiple) containers or by continuously pressing a CTRL key while selecting the multiple containers. An image container tool button 1802 is used for creation of a container having a static or variable image. Furthermore, a text container tool button 1803 is used for creation of a container having static or variable text.

In FIG. 18, reference numeral 1084 denotes a text container for laying out text, and reference numeral 1805 denotes an image container for laying out an image. Furthermore, reference numeral 1806 denotes a line to be shown to distinguish a text container and an image container. However, the distinction may be indicated not by the line but by any other means.

Detailed description will be made below on an embodiment using a document processing system having the above-described configuration. The document processing system according to an embodiment of the present invention is assumed to include the software module configuration shown in FIG. 1 (the electronic document writer 102, the bookbinding application 104, the electronic document despooler 105 and the printer driver 106) and the module configuration for variable printing shown in FIG. 16 (a database 199 may be also included in addition to the layout editing application program 121).

Embodiment

<Summary of an Entire Process>

Figure 19:
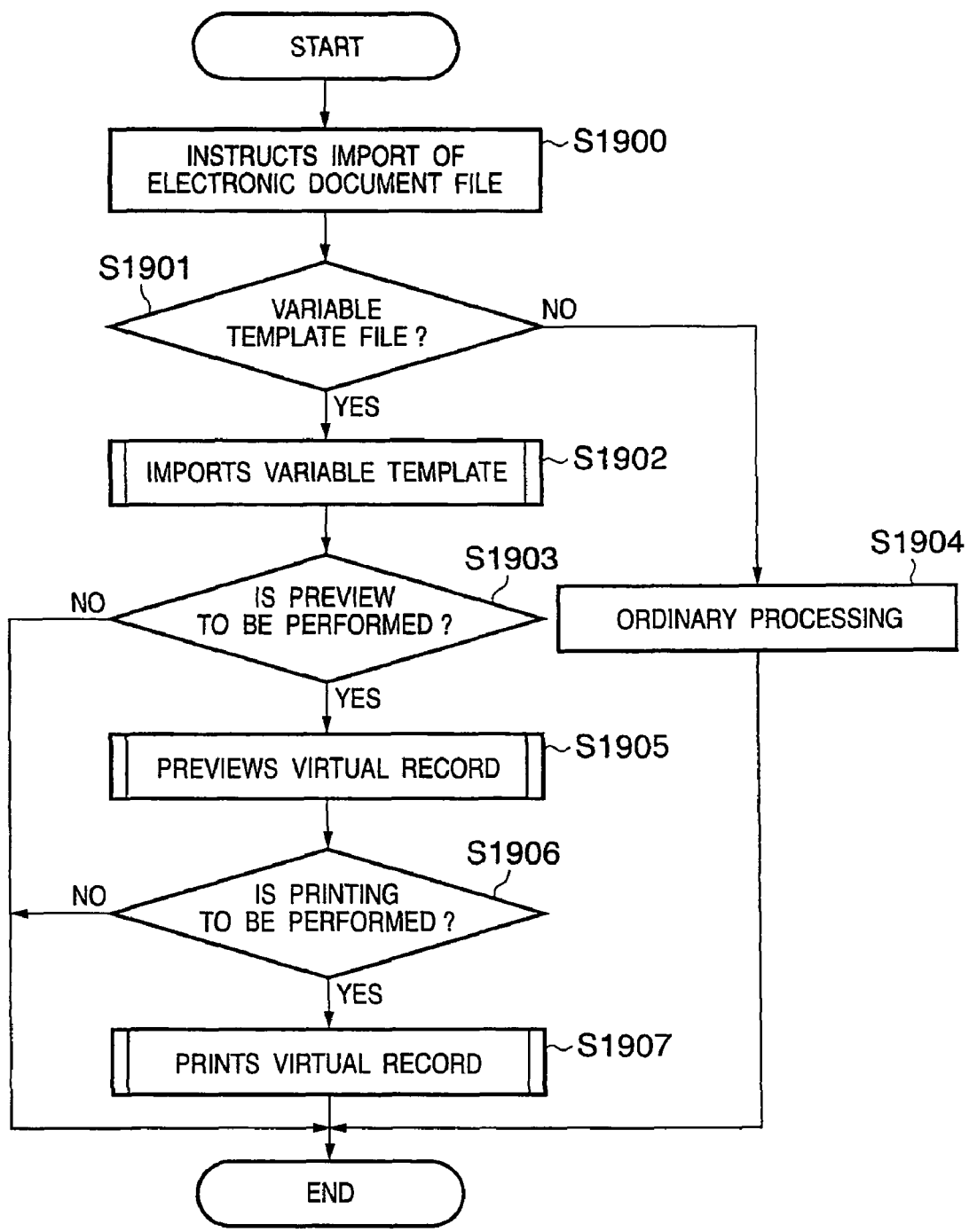
FIG. 19 is a flowchart for illustrating an entire procedure to be performed with the document processing system according to the embodiment of the present invention.

FIG. 19 is a flowchart for illustrating an entire procedure to be performed with the document processing system according to the embodiment of the present invention.

First, in the above-described document processing system, an instruction to import an electronic document file is accepted (step S1900). Here, the electronic document file to be imported may be an electronic file created by a general application or an electronic file digitized by a reading apparatus. The electronic document file may be a template file created by a variable printing system. In the document processing system, the electronic document writer 102 accepts the import instruction by a user performing a drag & drop operation of an electronic document file onto a screen provided by the bookbinding application 104 or the user opening the electronic document file with a general application and selecting the electronic document writer 102 as an output destination from the menu to issue an output instruction.

Next, at step S1900, the electronic document writer 102 determines, as determination means, whether the electronic document file instructed to be imported is a variable template file (step S1901). As a result, if it is determined that the file instructed to be imported is not a variable template (No), then the process does not proceed to a process flow according to the invention but proceeds to an ordinary process flow (step S1904). The ordinary process flow is a process specific to the document processing system shown in FIGS. 8 and 9, and therefore, description thereof will be omitted.

On the other hand, if it is determined that the imported electronic document file is a variable template file (Yes), then import processing, in which virtual records according to the present invention are applied, is performed (step S1902). Details of the import processing of step S1902 will be described later. When the import processing of the variable template file ends at step S1902, processing by the bookbinding application 104 starts, and the bookbinding application 104 proceeds to processing of the imported electronic document file.

First, the bookbinding application 104 determines whether to perform preview processing of the imported file (step S1903). As a result, if it is determined that the processing is to be performed (Yes), then the bookbinding application 104 performs the preview processing with virtual records applied (step S1905). Next, the bookbinding application 104 determines whether to perform print processing (step S1906). If the print processing is to be performed (Yes), then the print processing with virtual records applied is performed (step S1907). Here, the preview processing of step S1905 or the print processing of step S1907 may be arbitrarily performed, and the execution order may also be arbitrarily determined. Detailed description of the preview processing (step S1905) and the print processing (step S1907) will be made later.

On the other hand, if the preview processing is not to be performed at step S1903 (No), if the print processing is not to be performed at step S1906 (No), or if the print processing of the virtual records is performed at S1907, then this process ends.

<Processing for Determination of Variable Data>

Figure 33:
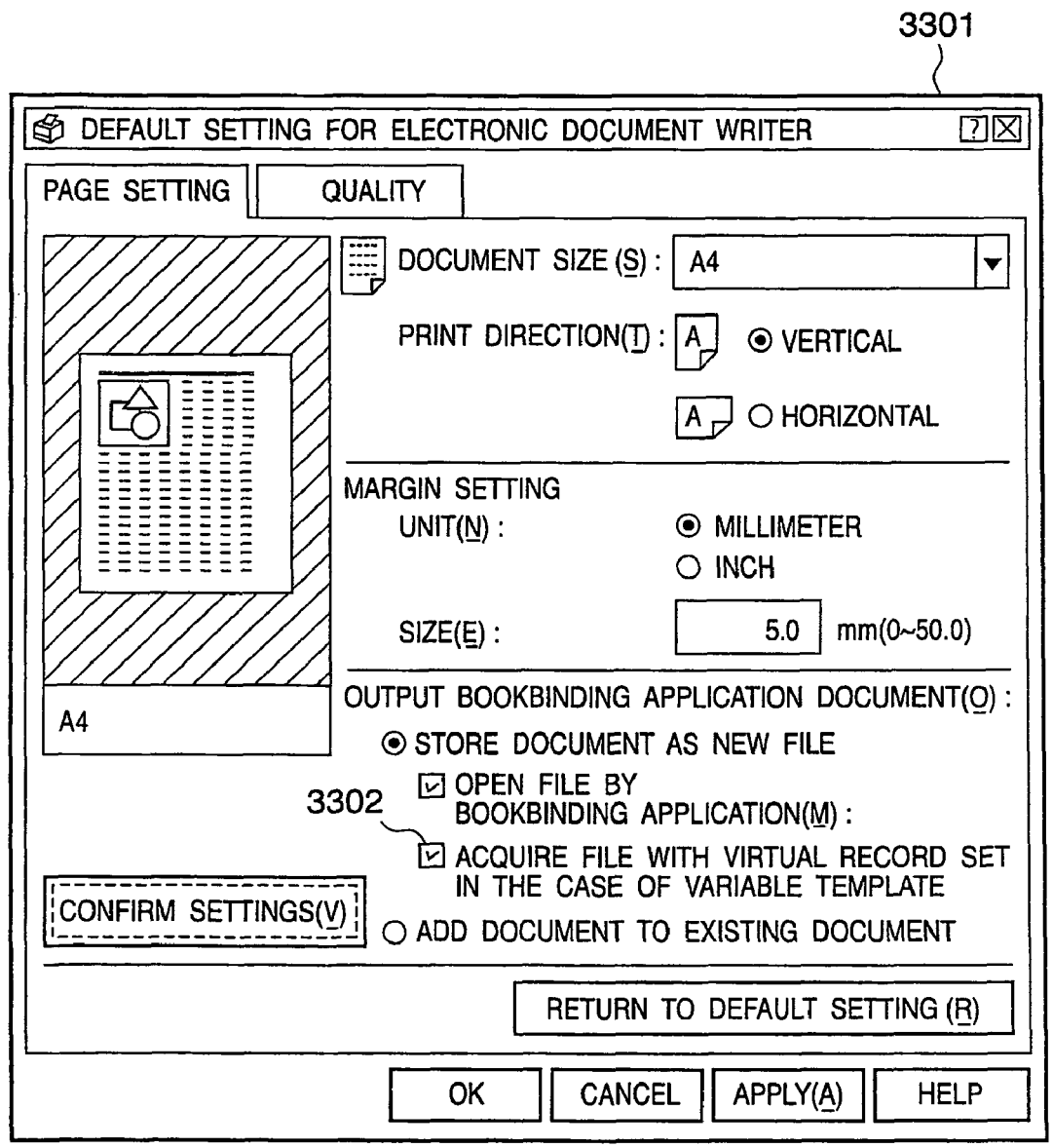
FIG. 33 shows an example of a UI screen of a default window of the electronic document writer 102 of the present invention.

FIG. 33 shows an example of a UI screen of a default window of the electronic document writer 102 of the present invention. This screen is provided by the electronic document writer 102 by opening a print menu from any of the general applications 101, selecting the electronic document writer 102 as the printer driver for an output destination and instructing display of a property screen. It is also possible to open this screen by selecting a printer icon of the electronic document writer 102 from a printer folder and selecting "property".

In the default window 3301 of the electronic document writer 102, it is possible to set what electronic document file a document outputted from a general application should be acquired as when it is acquired (imported) into the bookbinding application 104. A checkbox 3302 is for an item for specifying that a document outputted from the general application is variable data and instructing that the document should be acquired with virtual records set. By a user checking this item, storing the setting, and performing print output from a form creation application (also referred to as a variable output application), which is a general application, the electronic document writer can determine that the electronic document file instructed to be imported is a variable template file. When outputting the document, the variable output application acquires output settings from the electronic document writer 102, which is the printer driver for an output destination. If variable acquisition setting is made (the checkbox 3302 is checked), then, after outputting job start, the variable output application outputs an API (its own API or its own command which is transferred without being processed by the OS may be possible), which is a variable output, and a record end API (or command) for each record.

Thereby, the electronic document writer 102 can easily recognize that the output is variable output and where each record ends. Then, the electronic document writer 102 spools the document outputted from the variable output application for each record as a tentative file, calculates the number of records spooled until the job end is received, and sets the calculated number of print records for the document spooled as tentative files. It is also possible that the electronic document writer 102 does not calculate the number of records but receives the total number of records from the variable output application when the document is outputted. In this case, the electronic document writer 102 does not have to spool the document as tentative files, and thereby the import processing can be speeded up.

When the variable template itself is to be imported, calculation is performed by the electronic document writer 102 with the number of record set as 0, or the number of print records is set as 0 by the variable output application.

<Import Processing>

Figure 20:
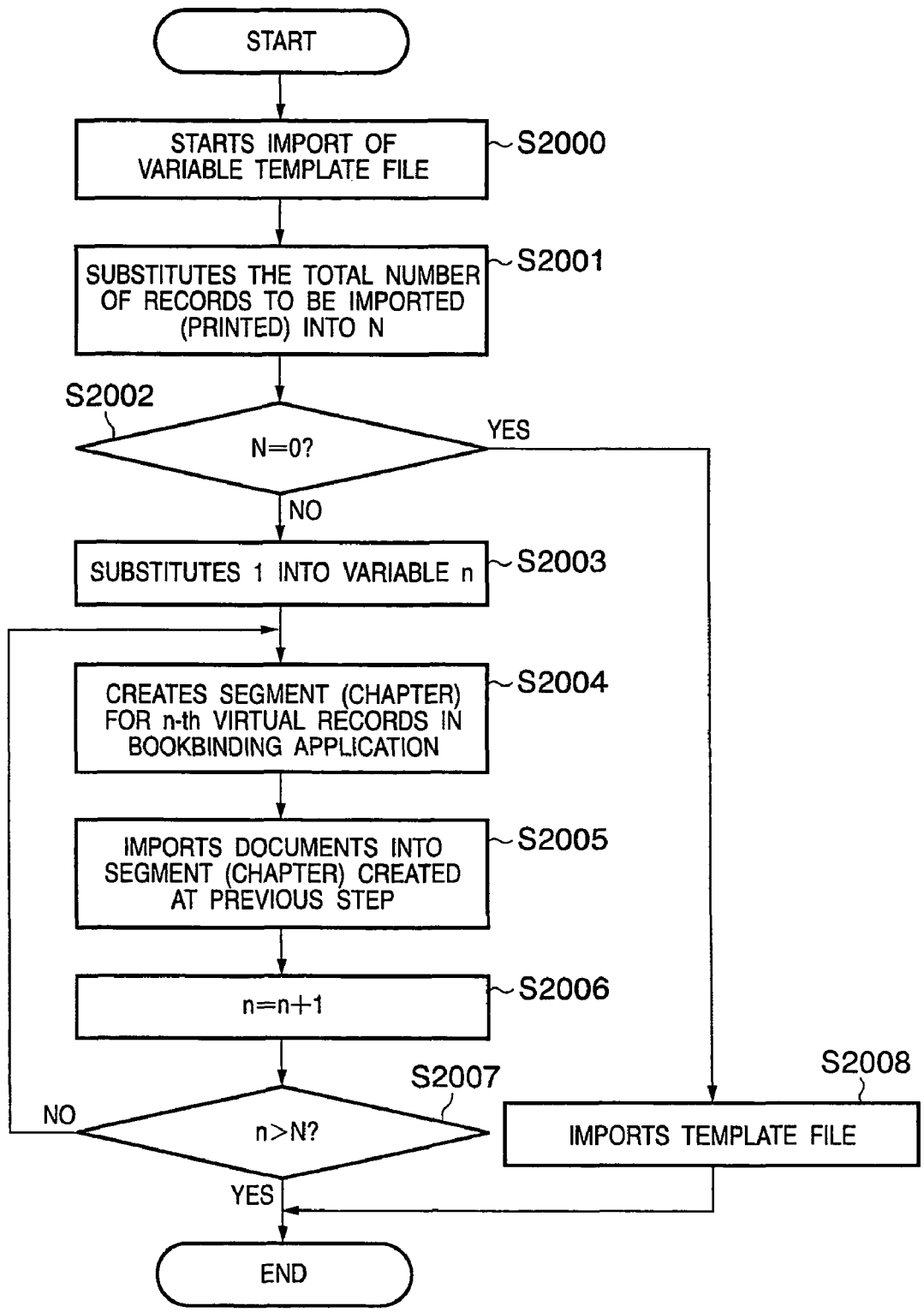
FIG. 20 is a flowchart for illustrating details of processing for importing a variable template file (step S1902) in the document processing system according to the embodiment of the present invention.

FIG. 20 is a flowchart for illustrating details of the processing for importing a variable template (step S1902) in the document processing system according to the embodiment of the present invention.

First, import of a variable template file is started (step S2000). Actually, the import processing starts at step S2000 and completely ends when the sequence of the process flow shown in FIG. 20 ends. Next, the electronic document writer 102 substitutes the total number of print records set for a document based on the variable template file to be imported into a constant N (step S2001). The total number of print records is calculated by the electronic document writer 102 or specified by the variable output application as described before. Then, it is determined whether the constant N is 0 (step S2002).

As a result, if it is determined that the constant N is 0 (Yes), that is, if the number of database records to be printed is 0, then the electronic document writer 102 imports only the variable template file (step S2008), and the processing of the step S1902 ends. In this case records are not merged.

When the variable template file is imported, the electronic document writer 102 converts fixed rendering information (information which does not change for each record) in the variable template to its own format as done in ordinary import processing, and writes, when it is assumed that a field area where variable data is to be merged is a variable area, the size and location of the variable area and information about a link to data field data in a database, for the variable attribute of an electric document file (variable item 7 in FIG. 6). Then, the processing is terminated. The information about the link to the field data in the database is assumed to be described in the document outputted from the variable output application.

On the other hand, if it is determined that the constant N is not 0 (No), then the initial value 1 is substituted into a variable n for managing print records (step S2003). Then, the processing is performed for each record.

First, the electronic document writer 102, as tentative setting means, creates a "Virtual n record" segment for the n-th virtual records for the n-th record (step S2004). The "segment" means something like a chapter in a document, which can separate the document configuration in this document processing system. Hereinafter, a unit separated as a database record unit by the separation processing of step S2004 is referred to as a "virtual record unit".

Next, the electronic document writer 102, as acquisition means, acquires data in the data field associated with link information for the n-th record from the database, based on link information described in the document outputted from the variable output application, converts it to rendering data in its own format (for example, rendering data in the PDF format or the SVG format), and imports it into the bookbinding application 104 in a manner that it is inserted into the segment of the n-th virtual record created at step S2004 (step S2005). Thereby, the result of merging the data and the variable template file is imported in the bookbinding application 104 of the document processing system.

The merging with the variable template file may be performed at this stage (by the electronic document writer 102) or may be performed by the bookbinding application 104 after the import ends. After the import, the database data and the template file are not distinguished from each other because of conversion to the file format of the document processing system. If the variable output application outputs a document of the variable template file and the variable data (data corresponding to the data fields of each record in the database) as data after merging, the merging processing is unnecessary, and the electronic document writer 102 imports the merged electronic document file into the bookbinding application 104 on a record basis determined by the electronic document writer 102.

After import of the n-th record ends at step S2005, the variable n is incremented (step S2006). Then, the electronic document writer 102 compares the constant N, which indicates the total number of print records, and the variable n to determine whether import has ended in a condition that all the records are separated from one another (step S2007). As a result, if import of all the records has not ended yet (No), then the process returns to step S2004 and repeats the above-described process. On the other hand, if it is determined that the import processing of all the records has ended (Yes), then the processing of S1902 described with this flowchart ends.

Figure 21:
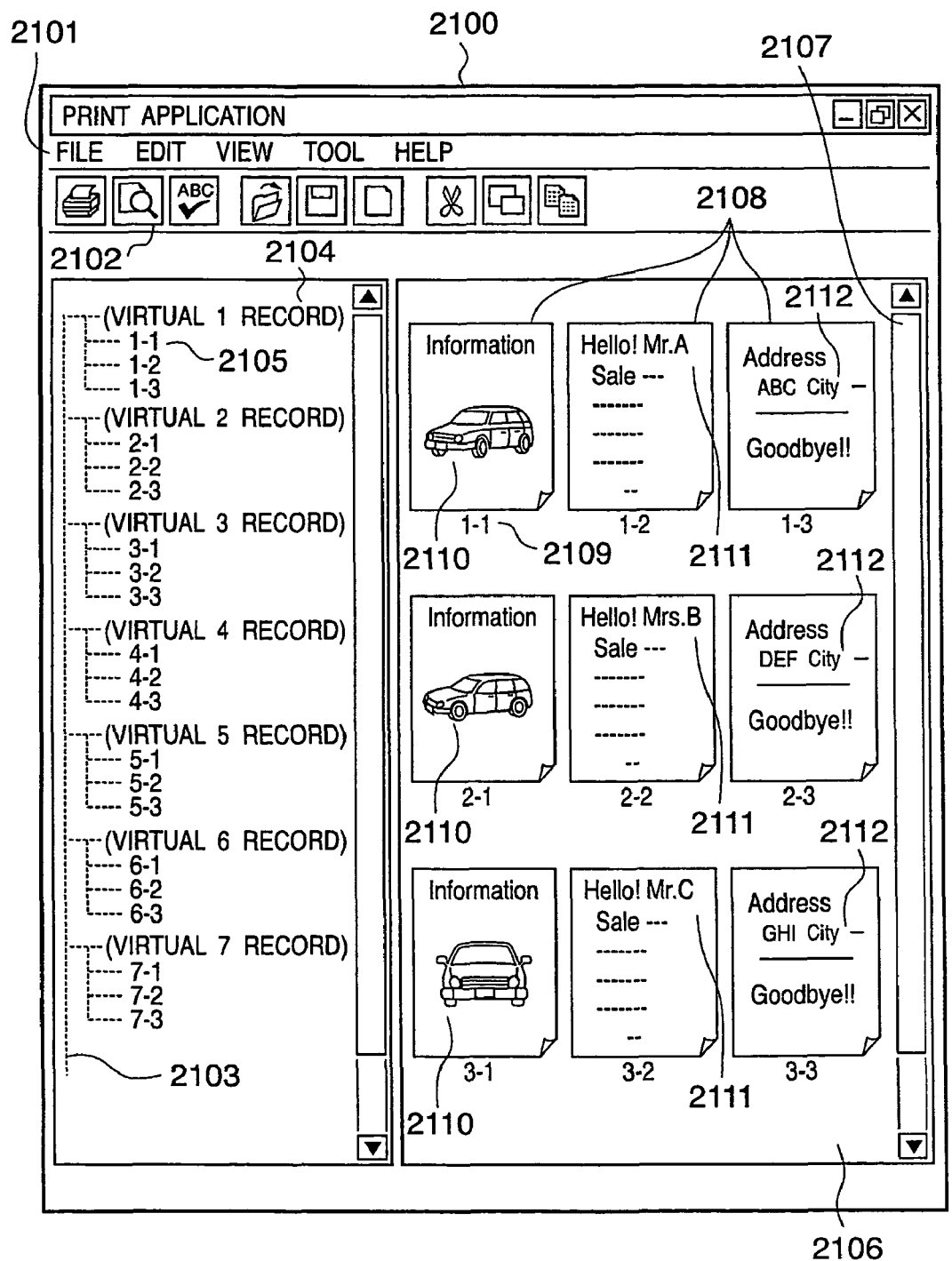
FIG. 21 is an example of a UI screen of the document processing system obtained as a result of performing the variable template import processing (step S1902) in the flowchart shown in FIG. 19.

FIG. 21 is an example of a UI screen of the document processing system (the bookbinding application 104 which also functions as operation means) obtained as a result of performing the variable template import processing (step S1902; details are shown in FIG. 20) in the flowchart shown in FIG. 19. In FIG. 21, a screen 2100 shows the main window of the document processing system. In FIG. 21, reference numeral 2101 denotes a menu bar and reference numeral 2102 denotes tool buttons. The menu bar 2101 and the tool buttons 2102 are those prepared in a general application or those for operating conventional functions specific to a document processing system, and therefore, detailed description thereof will be omitted here.

In FIG. 21, reference numeral 2103 denotes a list (tree view) showing the document configuration of document pages to be processed by the document processing system. Reference numeral 2104 denotes an identifier indicating a segment of document pages, which corresponds to a virtual record separated by the electronic document writer 102. Reference numeral 2105 denotes a page number of a document page. In the example shown in FIG. 21, pages 1-1, 1-2 and 1-3 are arranged under the segment name of "Virtual 1 record". Furthermore, reference numeral 2106 denotes a page preview screen showing a window in which document pages are displayed. Reference numeral 2107 denotes a scroll bar for displaying all the document pages when all the document pages are not displayed within the window.

Furthermore, in FIG. 21, reference numeral 2108 denotes rendering content of document pages. Reference numeral 2109 denotes the page number of a document page. Reference numeral 2110 denotes variable image data the content of which changes according to respective records. Reference numerals 2111 and 2112 denote variable text data the content of which changes according to respective records. In FIG. 21, as shown by the identifier 2104 and the page numbers 2105, the "Virtual 1 record" is configured by three pages 1-1 to 1-3, and the result of merging the first record of the database with the import-source variable template file has been imported thereto.

Furthermore, in FIG. 21, pages 2-1 to 2-3 of "Virtual 2 record" are the result of merging the second record of the database. Therefore, the variable data 2110 to 2112 in FIG. 21 have been replaced in accordance with the content of the database records. Thus, the number of segments 2104 corresponding to the number of database records set for the variable template are created, and the result of merging the record data is configured within the segment. On the document processing system (the bookbinding application 104) which has performed the import, print settings such as paper size, print layout (N-up), enlargement/reduction and watermark can be changed for each chapter (for each virtual record, here) since attribute information (FIG. 5) is held for each chapter as described above, and therefore, it is possible to operate document pages on a database record basis by operating the segments 2104.

<Preview Processing>

Figure 22:
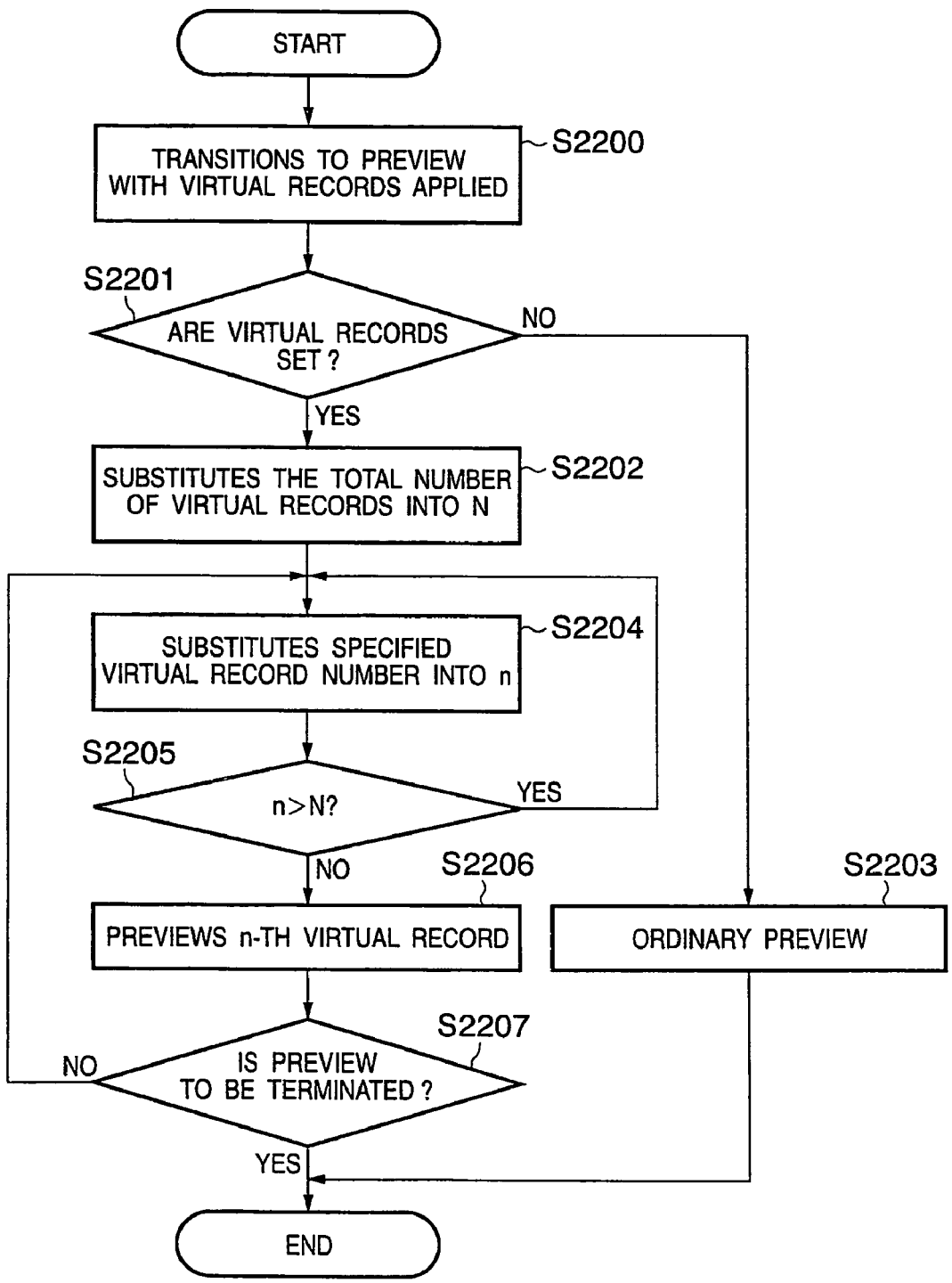
FIG. 22 is a flowchart for illustrating details of virtual record preview processing (step S1905) in the bookbinding application 104 of the document processing system according to the embodiment of the present invention.

FIG. 22 is a flowchart for illustrating details of the virtual record preview processing (step S1905) in the bookbinding application 104 of the document processing system according to the embodiment of the present invention.

If determining at step S1903 that the preview processing is to be performed, the bookbinding application 104 of the document processing system first transitions to a preview mode with the virtual records applied (step S2200). Here, the transition to the preview mode may be performed from a menu or a tool button and is assumed to be specified by a user on the UI screen. Next, the bookbinding application 104 determines whether virtual records are set for the electronic document file instructed to be previewed (step S2201).

As a result, if virtual records are not set, that is, if virtual records have not been set by the above-mentioned import processing of the variable template file (step S1902)(No), then the process proceeds to ordinary preview processing because virtual records are not set for the configuration of document pages. Then, preview images are generated based on the rendering data (document data 304) of respective pages, and display processing is performed (step S2203). On the other hand, if it is determined at step S2201 that virtual records are set (Yes), then the bookbinding application 104 substitutes the total number of virtual records created by the electronic document writer 102 into the constant N (step S2202). Then, the number of a virtual record to be previewed, which has been specified by the user, is substituted into the variable n (step S2204).

Here, it is determined whether the record number substituted at step S2204 is beyond the range of the set virtual records (step S2205). As a result, if it is determined that the record number is beyond the range (Yes), then the process returns to step S2204 and performs the processing for substituting the number of a record to be previewed. On the other hand, if it is determined that the record number is within the range (No), then the bookbinding application 104, as display control means, reads the document data 304, generates a preview screen of the n-th virtual record document page and performs display processing (step S2206). Then, it is determined whether the preview processing is to be terminated (step S2207). As a result, if the preview processing is not to be terminated (No), that is, the preview processing is to be repeated, then the process returns to step S2204 and performs the processing described above. On the other hand, if it is determined that the preview processing is to be terminated (Yes), that is, the preview processing is not to be repeated, then the process exits the preview mode, and the flowchart ends.

Figure 23A:
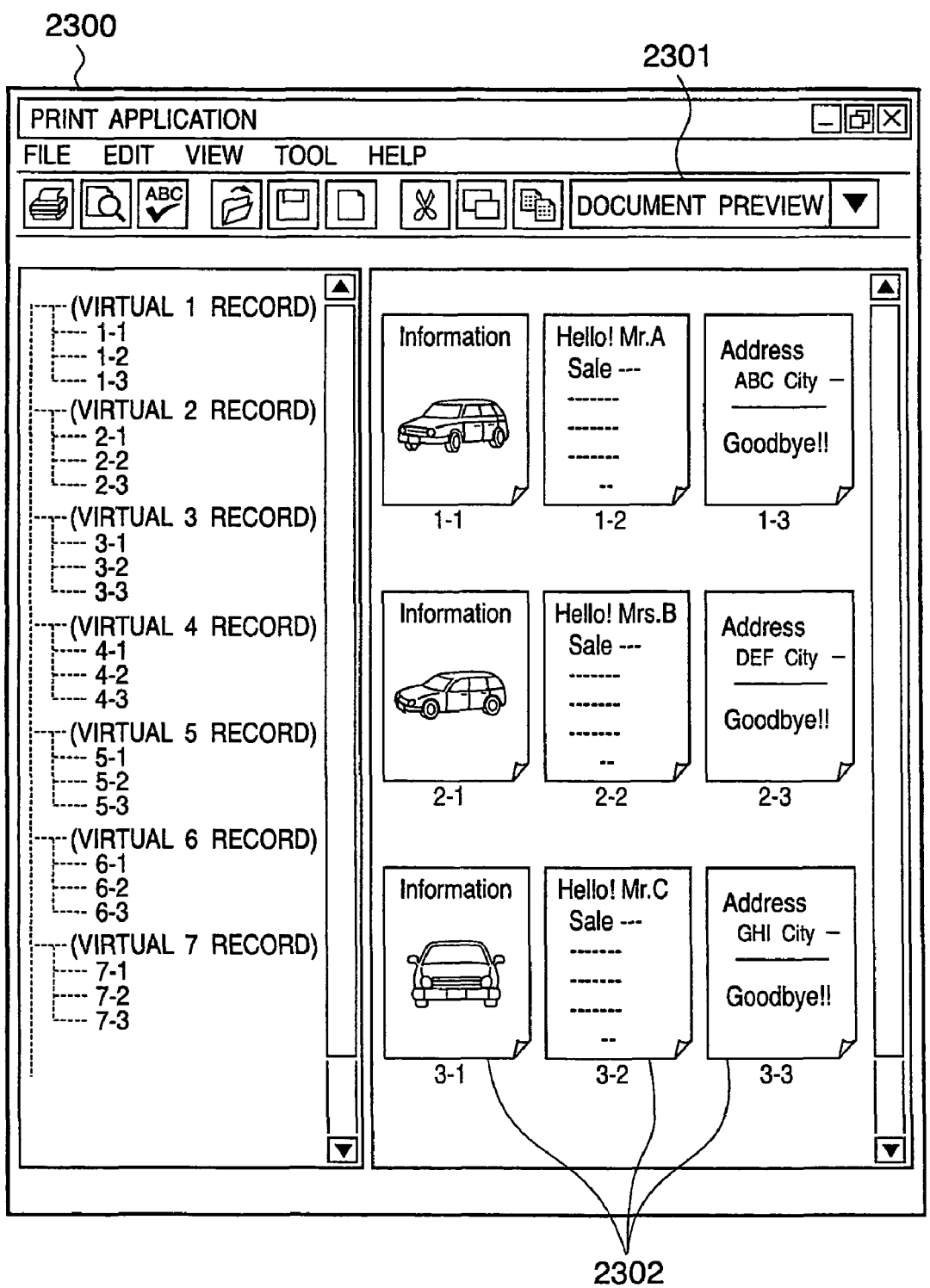
FIGS. 23A, 23B and 23C show an example of a UI screen of the document processing system to be displayed when the virtual record preview processing (step S1905) in the flowchart shown in FIG. 19 is performed.
Figure 23B:
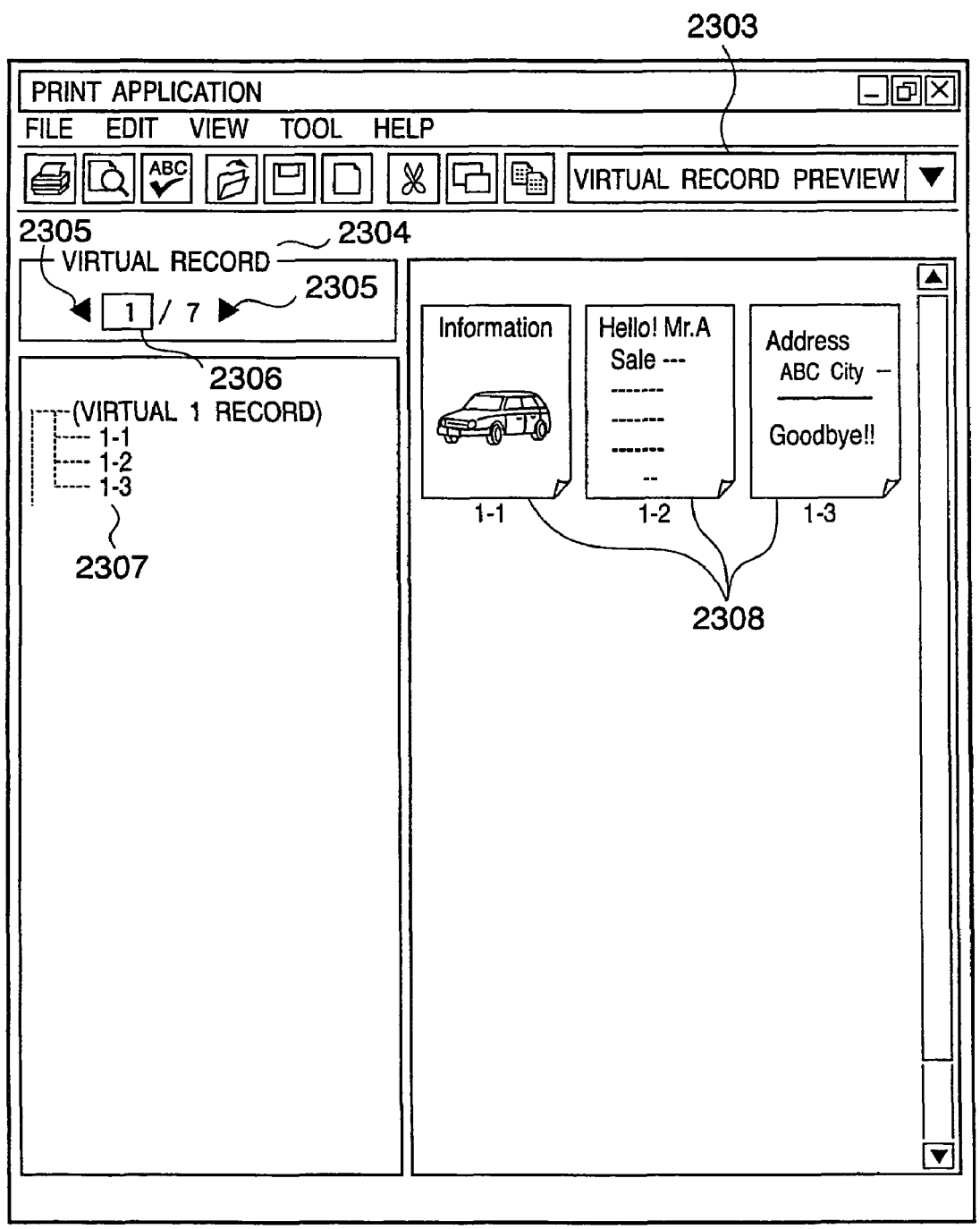
Figure 23C:
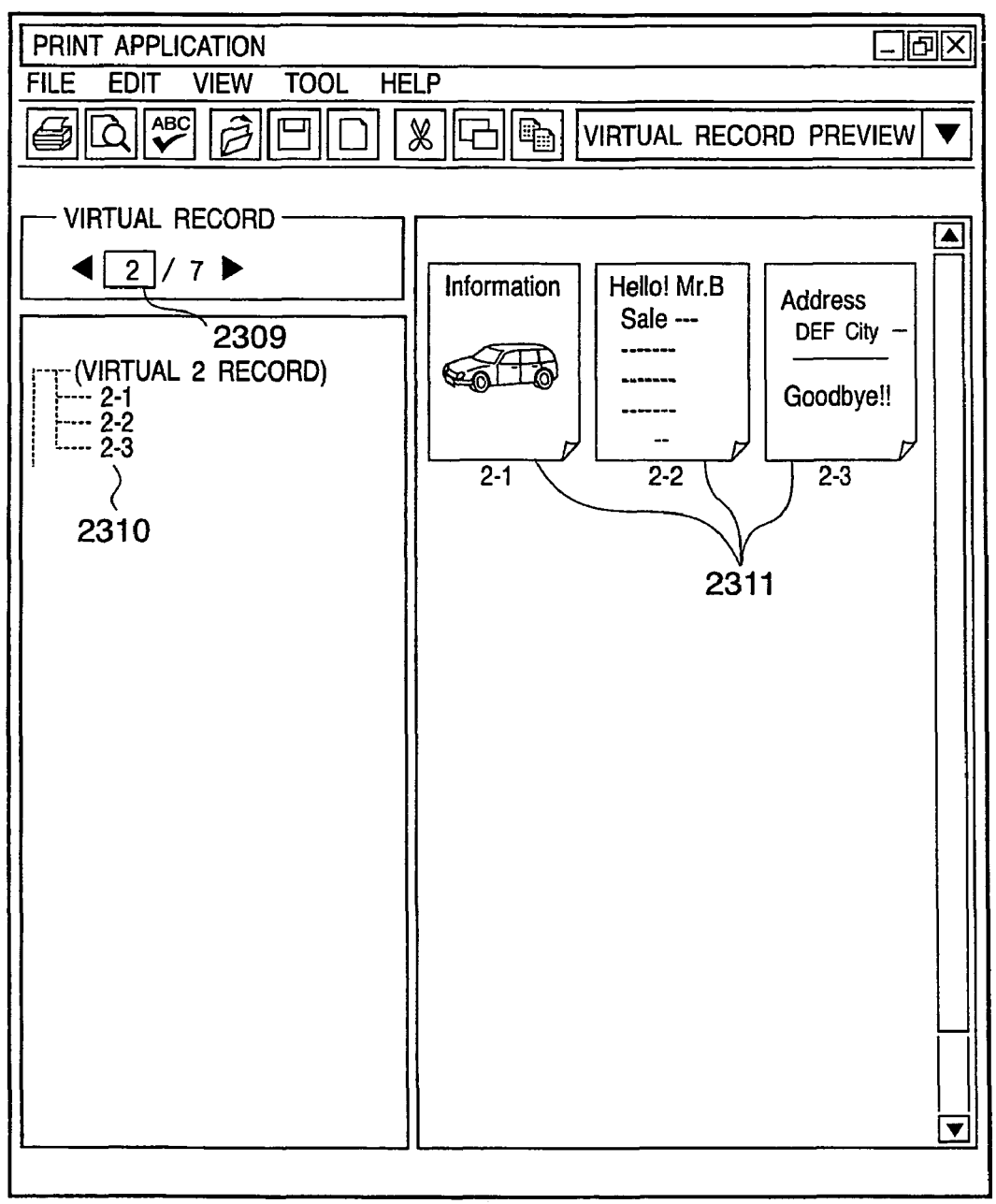

FIGS. 23A, 23B and 23C show an example of a UI screen of the document processing system to be displayed when the virtual record preview processing (step S1905) in the flowchart shown in FIG. 19 is performed.

In FIG. 23A, reference numeral 2300 shows the main window of the bookbinding application 104 of the document processing system. Reference numeral 2301 shows a combo box for specifying the preview processing.

The user can select the kind of preview with the combo box 2301. In the main window 2300, ordinary "document preview", "document form preview" and the like may be provided. By the user selecting "virtual record preview" with the combo box 2301, the preview processing described above starts. The preview processing may be selected from a menu or the like without using the combo box 2301.

In FIG. 23A, the result of performing document preview is shown. In a preview area, all document pages 2302 acquired in the document processing system are previewed. Therefore, if the user specifies "document preview" with the combo box 2301, all the records acquired in the electronic document file are preview-displayed as the document pages 2302.

FIG. 23B shows the result of performing the preview processing with virtual records applied, which has been performed at step S1905 in the flowchart in FIG. 19. On the screen shown in FIG. 23B, the user specifies "virtual record preview" with the combo box 2301. Here, a virtual record setting section 2304 provides a function of selecting which record should be previewed among the set virtual records. Reference numeral 2305 denotes arrow buttons for moving a virtual record to be previewed. Furthermore, reference numeral 2306 shows the record number of a virtual record being previewed. Reference numeral 2307 denotes a list showing pages arranged in the virtual record being previewed.

In FIG. 23B, the first record is selected as a virtual record, as shown by a record number 2306. Therefore, in the list 2307 in the tree configuration display area, pages of the first virtual record are displayed, and in the preview area, document pages of the first virtual record are read, and preview 2308 of document pages corresponding to the first virtual record is displayed.

FIG. 23C shows an example of a screen to be displayed when the record number in the virtual record setting section is changed from the screen condition shown in FIG. 23B. In FIG. 23C, the record is changed to the second record as shown by a record number 2309. Thereby, as shown by a list 2310, the page configuration of the second virtual record is displayed as a list, and preview 2311 of pages of the second virtual record is displayed in the preview area.

<Print Processing>

Figure 24:
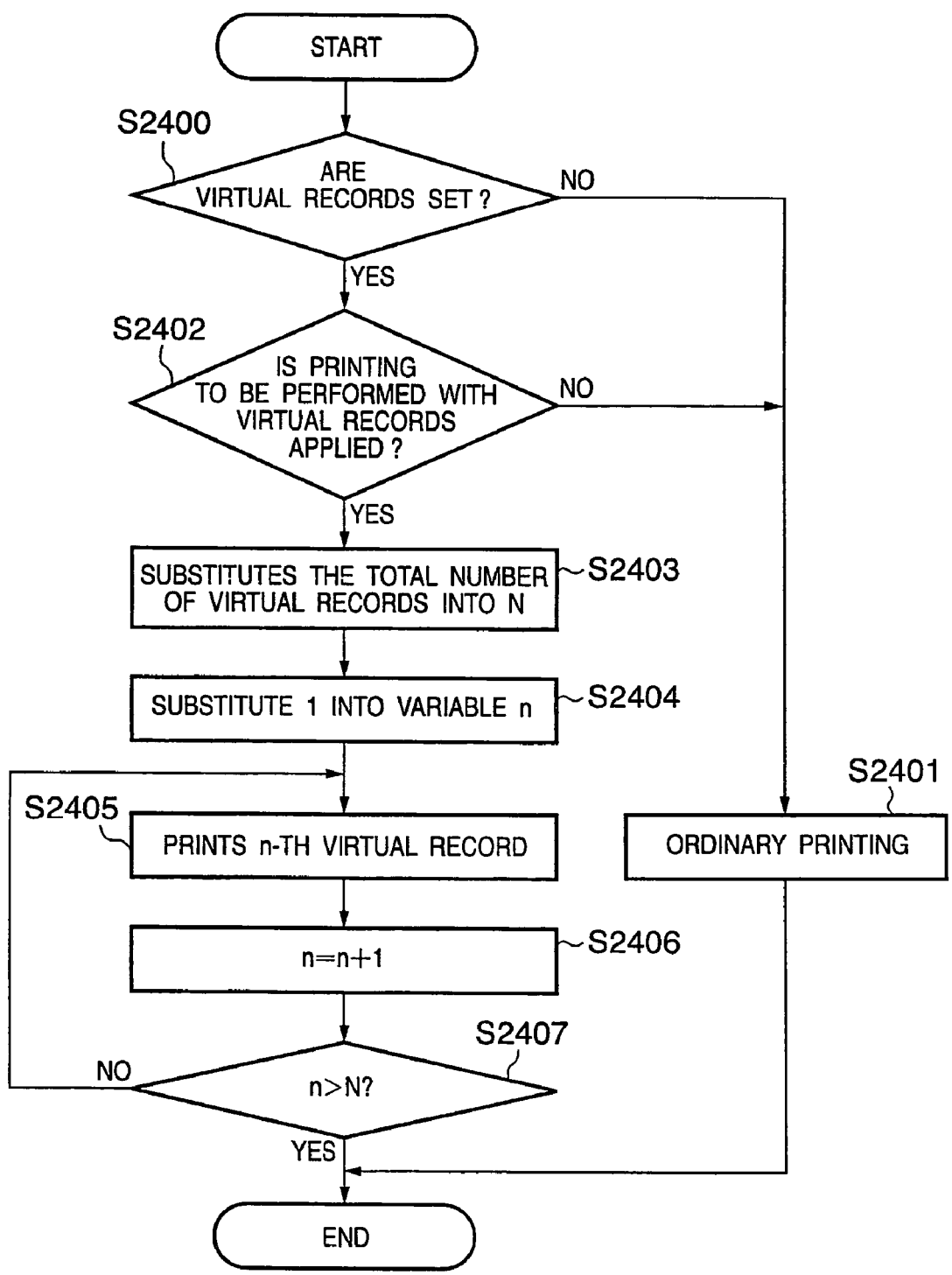
FIG. 24 is a flowchart for illustrating details of print processing (step S1907) with virtual records applied, in the document processing system of the embodiment of the present invention.

FIG. 24 is a flowchart for illustrating details of the print processing (step S1907) with virtual records applied, in the document processing system of the embodiment of the present invention.

First, the bookbinding application 104 of the document processing system determines whether virtual records are set for an electronic document file for which print processing should be performed (step S2400). As a result, if it is determined that virtual records are not set (No), then the process proceeds to ordinary print processing (step S2401), and the processing of step 1907 is terminated. On the other hand, if it is determined that virtual records are set (Yes), then the bookbinding application 104, as print setting means, determines whether printing is to be performed with the set virtual records applied (step S2402). Whether or not to apply virtual records is determined by the user giving an instruction when performing printing. The processing for applying virtual records to be performed at print output will be described later with reference to FIGS. 27 and 28.

As a result, if virtual records are not to be applied (No), then the process transitions to the ordinary print processing (step S2401), and the bookbinding application 104 reads document pages of the electronic document file corresponding to the range to be printed (the entire document, a specified range of chapters or a specified range of pages), generates rendering data similarly to a general application, using the electronic document despooler 105, and outputs it to the printer driver 106 via the OS (operation system not shown).

On the other hand, if virtual records are to be applied (Yes), then the total number of virtual records to be printed is substituted into the constant N first (step S2403). The total number of virtual records to be printed may be changed as appropriate according to the range to be printed shown in FIGS. 27 and 28. It does not exceed the number of virtual records set for the electronic document file.

Next, 1 is substituted into the variable n (step S2404). Then, the bookbinding application 104 reads document pages of the n-th virtual record, generates rendering data using the electronic document despooler 105 and outputs it to the printer driver 106 via the OS to perform the print processing (step S2405). The print processing here means to generate a print job by applying print form settings made to document pages to be printed. Therefore, it is possible to generate a print job for each virtual record. The generated print job for each virtual record may be sent to a printer as a separate print job. However, in the case of multiple records, multiple print jobs are generated. Therefore, a large one print job may be generated by enclosing the top job and the final job by JL (Job Language). By generating such a large one print job, it is easy to identify a job when printing is cancelled. Furthermore, it does not occur that a different print job intervenes in the current print job, and an effect is also obtained that sorting of printed matters is easier.

Conventionally, an output result can be obtained for each database record by a variable printing application. However, when the output data is imported into a conventional document processing system, the document (electronic document file) of the imported output data is not provided with the concept of a database record, and therefore, the conventional document processing system cannot output an imported variable template file (conventionally, the concept of a variable template also does not exist in the imported electronic document file) for each database record. However, as described above, in the document processing system (document processing apparatus) of the present invention, it is possible to realize operation (editing or output) for each record by setting virtual records and performing print processing of each of the virtual records. Furthermore, in the document processing system of this embodiment, print form settings can be changed for each separated unit, and therefore, it is also possible to perform print processing while changing the printing form for each virtual record.

At step S2405, the variable n is incremented when print processing of the n-th record ends (step S2406). The process returns to step S2405 and repeats the print processing described above as far as the variable n is below the constant N (in the case of No at step S2407). If, at step S2407, the variable n is above N, and it is determined that printing of all the virtual records has ended (Yes), then the flowchart ends.

In the flowchart shown in FIG. 24, the process for printing all the virtual records set in the document processing system is shown. However, it is also possible to have the user select any virtual record to print only the selected record. The printing processing of the selected record does not require any new processing other than processings shown in the flowchart, and therefore, description thereof will be omitted.

<Another Import Processing>

Figure 25B:
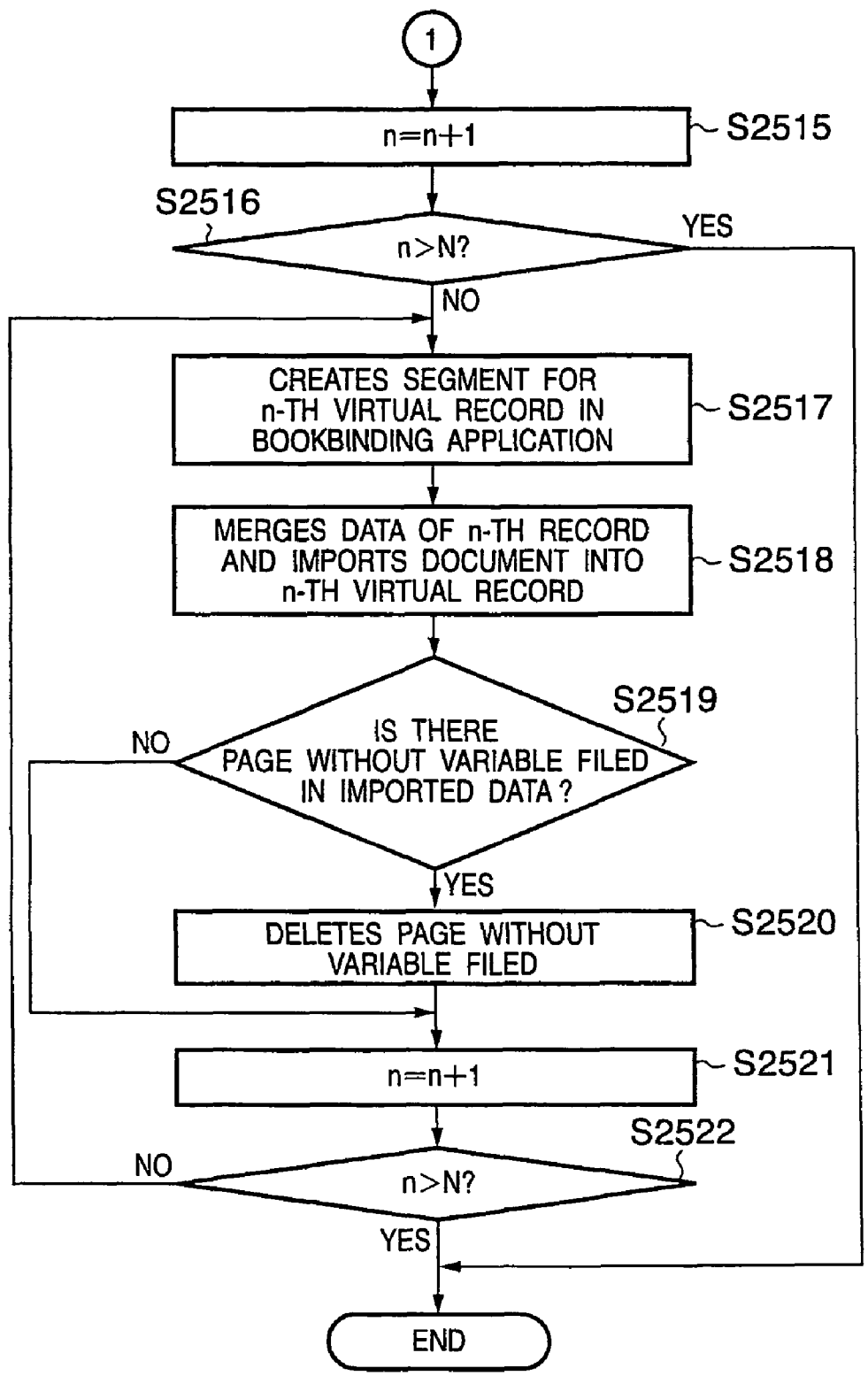

FIGS. 25A and 25B are a flowchart for illustrating details of another example of the variable template file import processing (step S1902) in the document processing system according to the embodiment of the present invention. The import processing shown in FIG. 25 is different from the import processing described above with the use of the FIG. 20 in that it has a section for performing control so that a fixed page within a template file is not redundantly imported. That is, a template file is imported only once, and variable data to be merged with the template file is acquired for each record. In the actual processing, the user selects either the import processing shown in FIG. 20 or the import processing shown in FIGS. 25A and 25B to cause the document processing system to perform the processing. This other example of the import processing will be described below with the use of the flowchart in FIGS. 25A and 25B.

First, a variable template file is imported (step S2500). Next, the electronic document writer 102 substitutes the total number of print records set for a document based on the variable template file to be imported into a constant N (step S2501). The total number of print records is calculated by the electronic document writer 102 or specified from the variable output application as described before. Then, it is determined whether the constant N is 0 (step S2502).

As a result, if 0 is substituted in the constant N, that is, if the number of database records to be printed is 0 (Yes), then the electronic document writer 102 imports only the variable template file (step S2503) and terminates the import processing. In this case, records are not merged. When the variable template file is imported, the electronic document writer 102 converts fixed rendering information (information which does not change for each record) in the variable template file to its own format as done in ordinary import processing, and writes, when a field area where the variable data is to be merged is assumed to be a variable area, the size and location of the variable area and information about a link to data field data in a database, for the variable attribute of an electronic document file (variable item 7 in FIG. 6). Then, the processing is terminated. The information about the link to the field data in the database is assumed to be described in the document outputted from the variable output application.

On the other hand, if it is determined at step S2502 that the constant N is not 0 (No), then the electronic document writer 102 substitutes the initial value 1 into a variable n for managing print records (step S2504). Then, processing is performed for each record.

First, import processing of the n-th record, that is, the first record is performed (step S2505). Then, the number of pages of the document is substituted into a constant M (step S2506). Furthermore, 1 is substituted into a variable m (step S2507). Then, a "Virtual n record" segment is created for the n-th record in the bookbinding application (step S2508).

Here, it is determined whether a variable field exists in the document of the m-th page (step S2509). The variable field is a generic name of a text container and an image container. The fact that a variable field does not exist means that the content of database records is not laid out on the page, and it is a page with a layout common to all records.

Therefore, if it is determined at step S2509 that a variable field does not exist (Yes), then the electronic document writer 102 creates a fixed page segment indicating that the page is fixed, in the bookbinding application (step S2510), and imports a page (the m-th page) into the segment (step S2511). On the other hand, if it is determined at step S2509 that a variable field exists (No), then the electronic document writer 102 merges database records and imports a page into "Virtual n record" created at step S2508 (step S2512). In this way, the electronic document writer 102 also has a function as duplication prevention means.

Then, after import processing of the m-th page ends through steps S2511 and 2512, the variable m is incremented (step S2513). Then, it is determined whether the processing has ended for all the pages of the n-th record (step S2514). As a result, if the processing has not ended for all the pages (No), then the process returns to step S2509 and repeats the processing described above. On the other hand, if the processing has ended for all the pages (Yes), then the variable n is incremented (S2515), and it is further determined whether the processing has ended for all the records (step S2516).

If it is determined at step S2516 that the processing has ended for all the records (Yes), then the process of this flowchart ends. If it is determined at step S2516 that the processing has not ended for all the records (No), then the processing is continued for the n-th record. First, a "Virtual n record" segment is created for the n-th record in the bookbinding application (step S2517). The database record of the n-th record is merged, and the document is imported into "Virtual n record" created at step S2517 (step S2518).

Next, it is checked whether there is a page without a variable field in the document imported at step S2518 (step S2519). As a result, if a page without a variable filed is found at step S2519 (Yes), then the page is deleted (step S2520). Then, the variable n is incremented (step S2521), and it is determined whether the processing has ended for all the records (step S2522). If there is not a page without a variable field in the document imported at step S2518 (No), then the process proceeds to step S2521. If it is determined at step S2522 that the processing has not ended for all the records (No), then the process returns to step S2517 and repeats the processing described above. If it is determined that the processing has ended for all the records (Yes), then this flowchart ends.

Figure 26A:
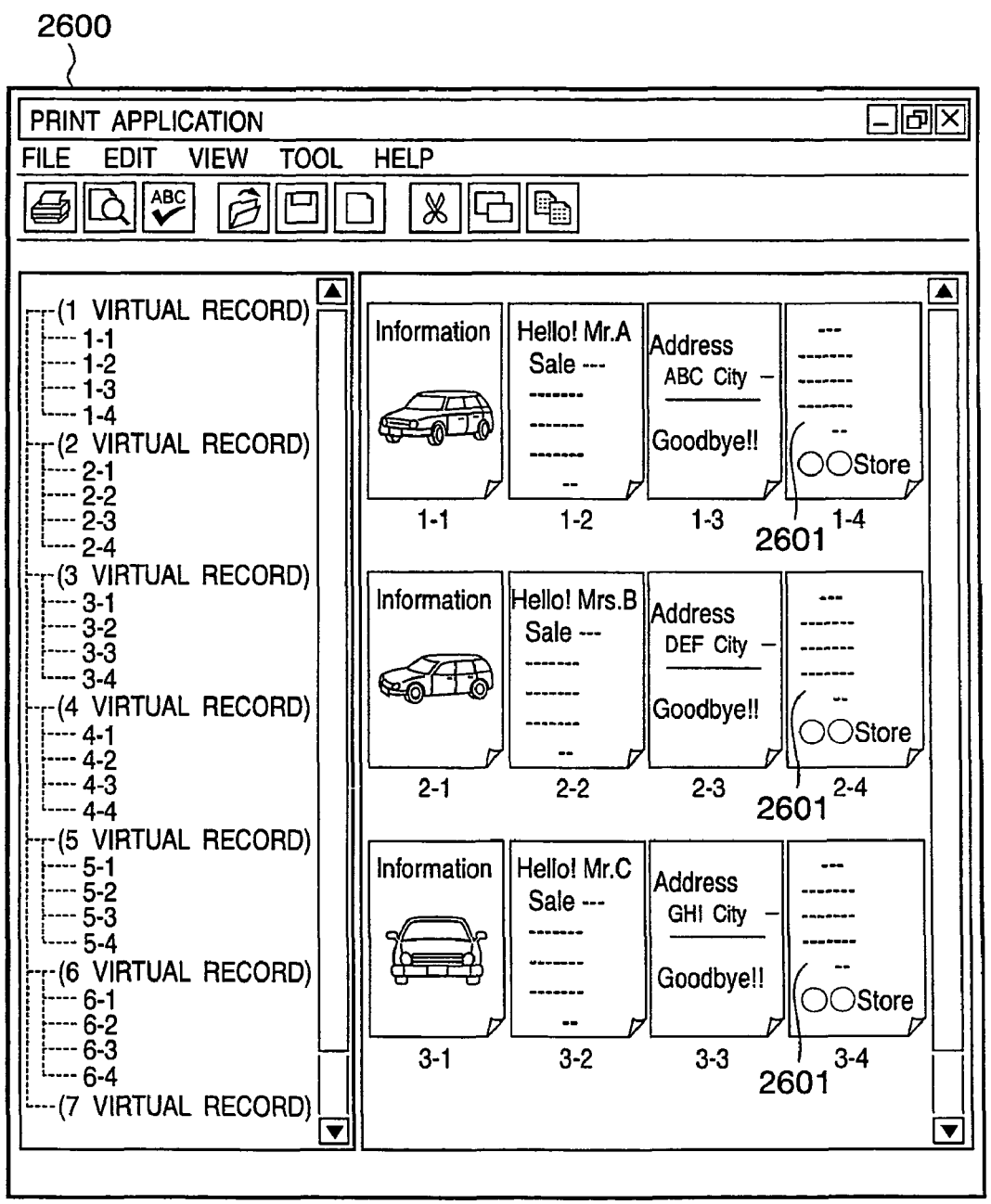
FIGS. 26A and 26B show an example of a UI screen of the document processing system to be obtained as a result of performing the variable template import processing.
Figure 26B:
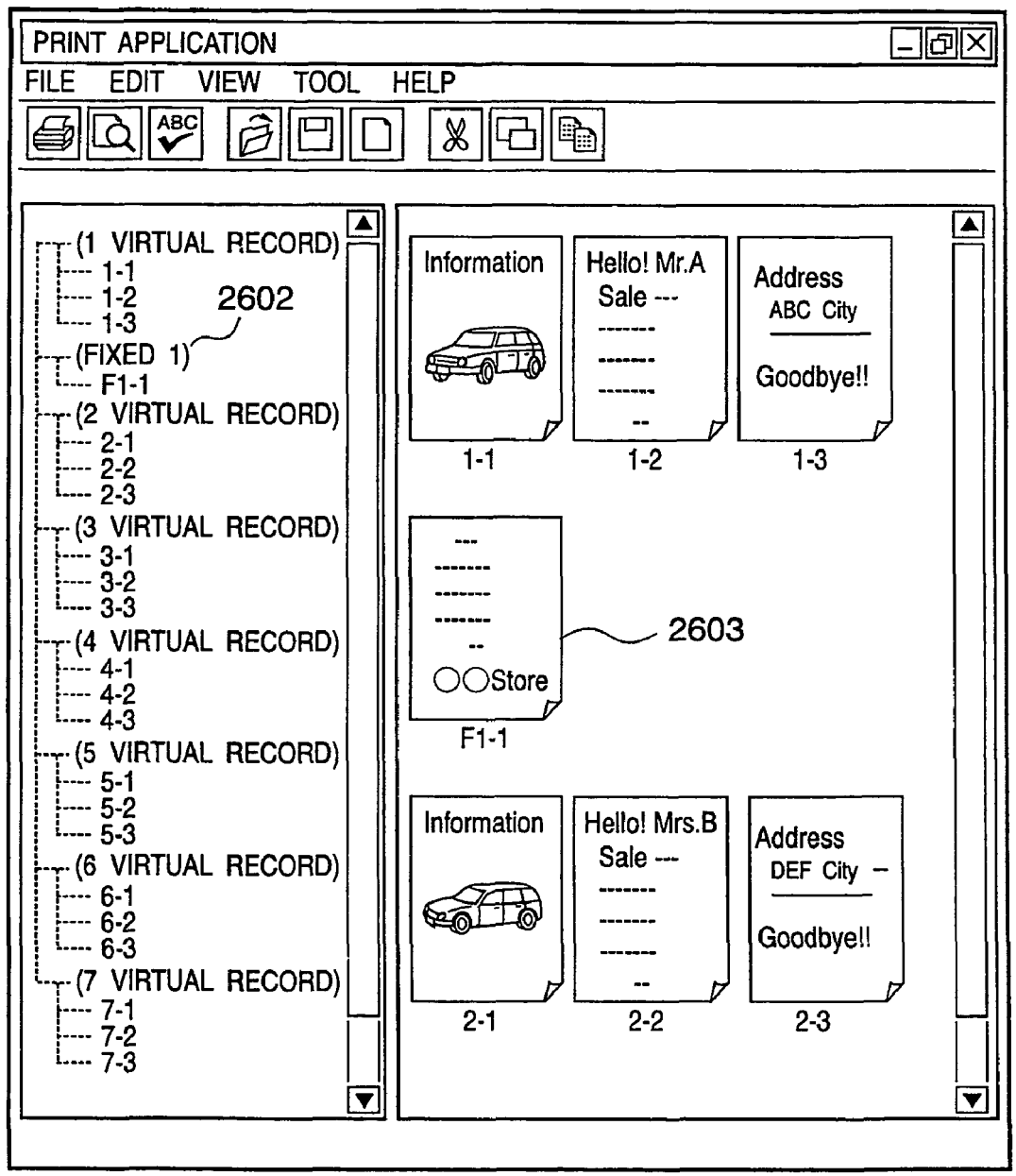

FIGS. 26A and 26B show an example of a UI screen of the document processing system to be obtained as a result of performing the variable template import processing. These diagrams show a UI screen for illustrating the import processing which prevents duplication of a fixed page. Especially, FIG. 26A shows an example of a UI screen to be displayed when import is performed without applying the processing of the flowchart shown in FIG. 25, and FIG. 26B shows an example of a UI screen when it is applied.

In FIG. 26A, reference numeral 2600 denotes the main window of the document processing system. The configuration of the main window 2600 is as described before. As shown in FIG. 26A, the fourth page of each virtual record, which is denoted by reference numeral 2601, is a fixed page in which a variable field does not exist. When import processing to which ordinary virtual record settings are provided is applied, the fixed page is imported into each of the virtual records.

Meanwhile, in FIG. 26B, it is assumed that the same variable template file as FIG. 26A is imported. Here, reference numeral 2602 denotes a segment into which a fixed page without a variable field is to be imported. In FIG. 26B, a fixed page F1-1 is imported into a "Fixed 1" segment. Reference numeral 2603 denotes a fixed page. A fixed page denoted by 2601 is imported into "Fixed 1", and it is imported into the document processing system without duplication.

<Setting of Combination with Virtual Records>

Figure 27:
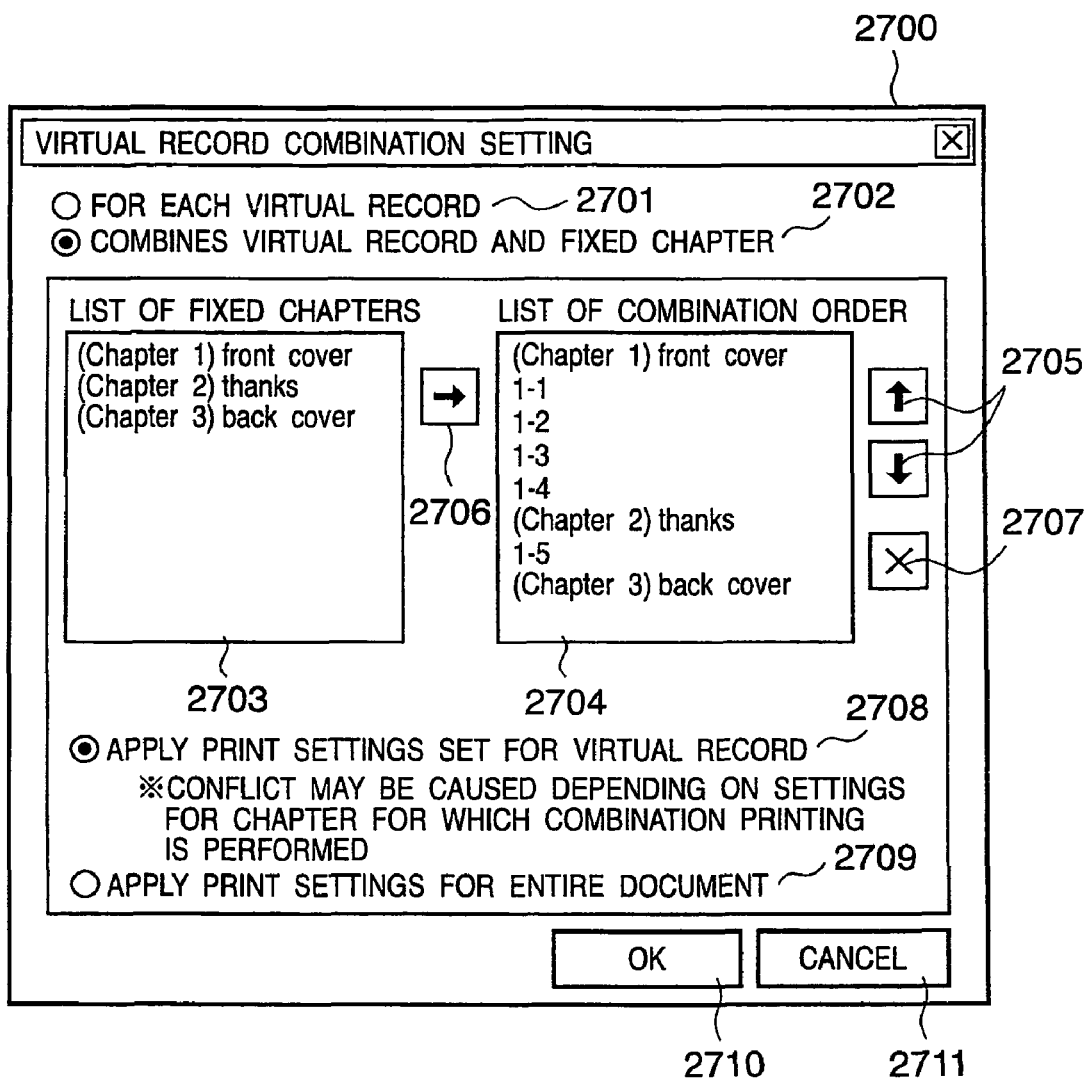
FIG. 27 shows an example of a UI screen of a setting dialog for specifying the combination order of virtual records and fixed chapters in the bookbinding application 104 of the document processing system according to the embodiment of the present invention.

FIG. 27 shows an example of a UI screen of a setting dialog for specifying the combination order of virtual records and fixed chapters in the bookbinding application 104 of the document processing system according to the embodiment of the present invention. That is, FIG. 27 shows an example of a UI screen for making settings for performing preview or printing by combining a document of a fixed segment (hereinafter referred to as a "fixed chapter") imported into a different segment or a document file created by a general application, which has been imported into the document processing system separately from a variable template file, with a document within virtual records, in order to avoid duplication among virtual records by means of that other import processing described before. This UI screen is displayed by specifying "print format (O)" from the menu on the UI screen (FIG. 10) of the bookbinding application 104.

In FIG. 27, reference numeral 2700 denotes a dialog frame of the virtual record combination setting dialog. Reference numeral 2701 denotes a checkbox for specifying that preview or printing should be performed for each virtual record without performing output of combination of virtual records and fixed chapters. In the document processing system, when the checkbox 2701 is checked, a default value is applied.

In FIG. 27, reference numeral 2702 denotes a checkbox for specifying that preview or printing should be performed with combination of virtual records and fixed chapters. If the checkbox 2702 is checked, boxes 2703 to 2708 to be described below are effective.

Reference numeral 2703 denotes a box for displaying fixed chapters set in the bookbinding application 104 of the document processing system as a list. Reference numeral 2704 denotes a box for displaying the output order of the combination of virtual records and fixed chapters as a list. The items displayed in the list in the box 2704 are page numbers of virtual records (1-1, 1-2 and the like in FIG. 27) and chapter names of fixed chapters ((Chapter 1), front cover, (Chapter 2), thanks and the like in FIG. 27). The items displayed in the list are those to be previewed or printed. Documents are arranged in the output order from the top of the list.

In FIG. 27, reference numeral 2705 denotes buttons for changing the order of the items in the list in the box 2704. The user can change the order by selecting an item and pressing any of the buttons 2705. Reference numeral 2706 denotes a button for adding a fixed chapter from the list of fixed chapters in the box 2703 to the combination order list in the box 2704. The user can select a fixed chapter from the list of fixed chapters and press the button to add the selected fixed chapter to the combination order list.

In FIG. 27, reference numeral 2707 denotes a button for deleting an item in the combination order list. It is only added fixed chapters that can be deleted with the button 2707. Therefore, it is not possible to delete a page of a virtual record. However, it is possible to delete a page of a virtual record by using a page deletion function provided on the preview screen of the bookbinding application 104 of the document processing system.

Reference numeral 2708 denotes a check button for specifying that print settings made for each virtual record should be used as print settings (for example, bookbinding setting) to be applied to printing. When the check button 2708 is checked, the print settings made for each virtual record is applied. However, the print settings may be such that cannot be applied, depending on combination with fixed chapters. In such a case, print settings for the entire document are applied. Since virtual records are considered as virtual chapters when their document configuration is managed, chapter attributes (FIG. 5) are provided for each virtual record.

Reference numeral 2709 is a check button for specifying that print settings for the entire document should be applied. When the check button 2709 is checked, print processing is performed with common print settings for all the virtual records. Reference numeral 2710 denotes an OK button for reflecting application, and reference numeral 2711 denotes a cancel button for canceling application. By pressing any of the buttons, application is reflected or cancelled, and the dialog is closed.

<Dialog for Specification of Printing of Virtual Records>

Figure 28:
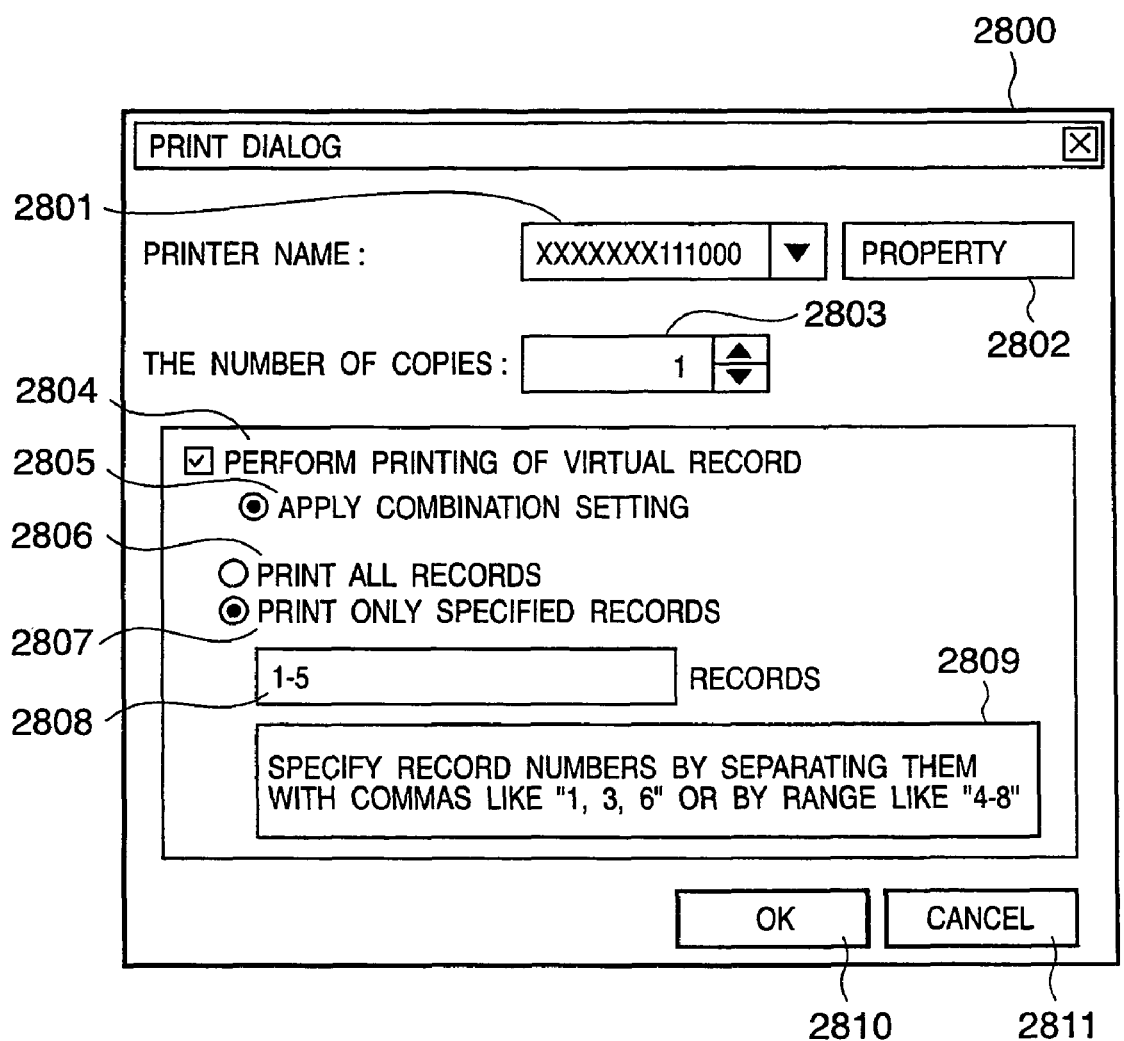
FIG. 28 shows an example of a UI screen of a print dialog for specifying virtual record print processing in the bookbinding application of the document processing system according to the embodiment of the present invention.

FIG. 28 shows an example of a UI screen of a print dialog for specifying virtual record print processing in the bookbinding application of the document processing system according to the embodiment of the present invention. This UI screen is displayed by specifying "file (F)" from the menu on the UI screen (FIG. 10) of the bookbinding application 104 and specifying "print" from the opened menu. In the print dialog shown in FIG. 28, it is also possible to specify whether or not to apply the setting of combination of virtual records and fixed chapters made in the above-described dialog shown in FIG. 27. In this embodiment, these functions are added to an ordinary print dialog. However, these may be individually provided.

In FIG. 28, reference numeral 2800 denotes a dialog frame of the print dialog. Reference numeral 2801 denotes a list box for specifying an output apparatus to perform printing. A list of printer drivers installed in the document processing system are displayed in the list box, similarly to the ordinary print dialog, and the user can select any printer driver therefrom. Reference numeral 2802 denotes a button for making detailed settings for the output apparatus specified in the list box 2801. Reference numeral 2803 denotes a combo box for specifying the number of copies of a document to be printed. The number of document copies corresponding to the number specified in the combo box 2803 are printed. The elements described above are the same as those for the ordinary print dialog, and therefore, detailed description thereof will be omitted.

In FIG. 28, reference numeral 2804 denotes a check box for specifying whether to perform the printing with virtual records applied, which has been described above with the use of FIG. 27. When this check box 2804 is checked, printing for each virtual record is performed. By checking the check box 2804, the bookbinding application 104 acquires necessary pages from an electronic document file using the electronic document despooler 105 in accordance with the combination order set in FIG. 27 and outputs rendering data to the printer driver 106 with the use of a known technique to perform print processing. Reference numeral 2806 denotes a check button for setting all virtual records as those to printed. By checking this check button 2806, it is possible to set all virtual records included in an electronic document file as those to be printed. In the document processing system according to this embodiment, the check button 2806 is checked as a default.

In FIG. 28, reference numeral 2807 denotes a check button for setting only specified virtual records as those to be printed. By checking this check button 2807, it is possible to set only specified virtual records as those to be printed. Specification of each record or of a range is possible. For example, in the example shown in FIG. 28, the range shown by "1-5" is specified, and this means that the first to fifth records (the first to fifth records among virtual records managed by the bookbinding application 104) are specified to be printed.

Furthermore, in FIG. 28, reference numeral 2809 denotes an area in which a method for inputting each setting item in the print dialog is to be displayed. Reference numeral 2810 denotes an OK button for staring printing with print settings which have been made. Reference numeral 2811 is a cancel button for canceling printing. By pressing any of the OK button 2810 and the cancel button 2811, each processing is performed, and then the dialog is closed.

<Preview Processing of Combination with Fixed Chapters>

Figure 29:
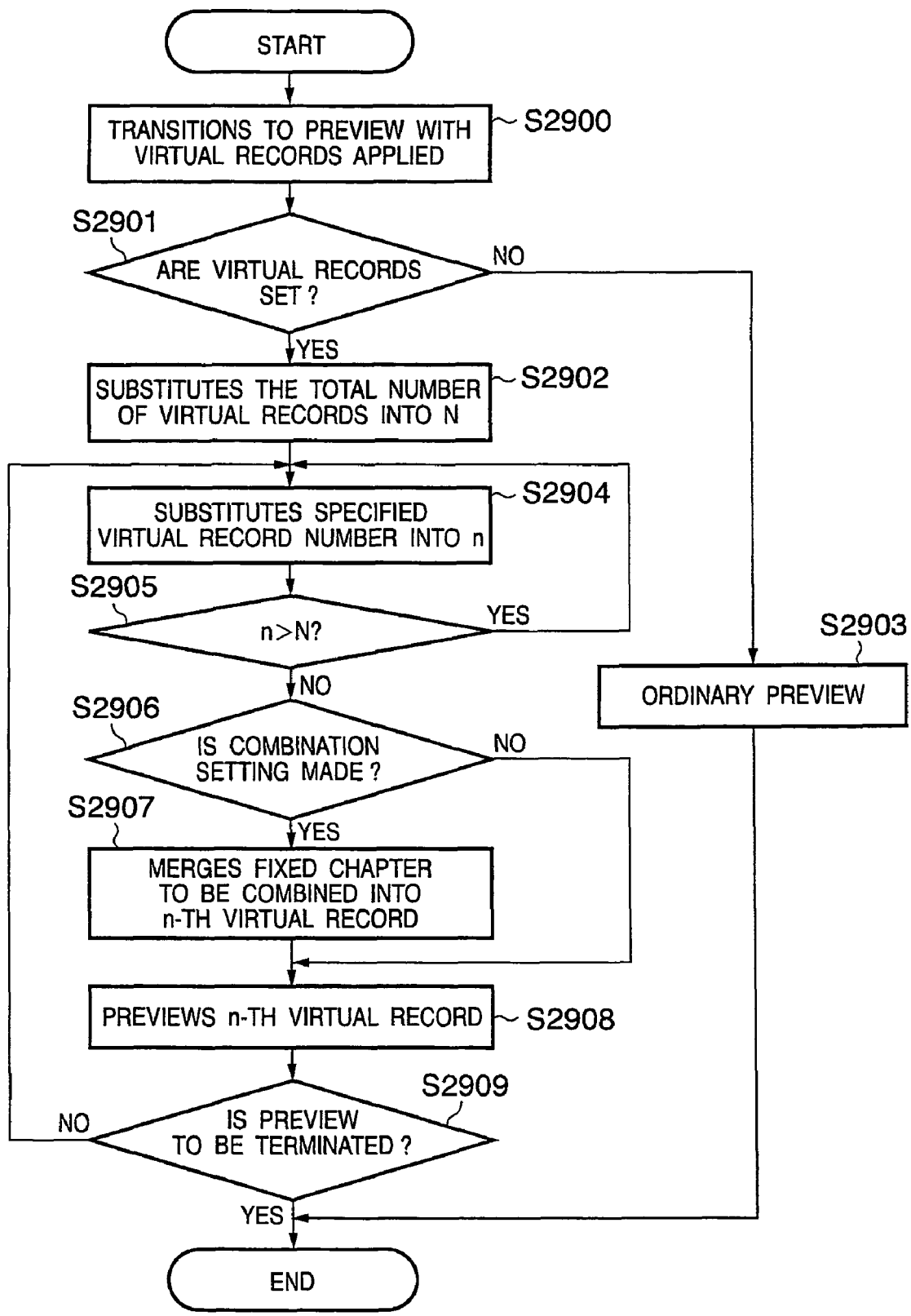
FIG. 29 is a flowchart for illustrating preview processing of combination of virtual records and fixed chapters in the bookbinding application 104 of the document processing system according to the embodiment of the present invention.

FIG. 29 is a flowchart for illustrating preview processing of combination of virtual records and fixed chapters in the bookbinding application 104 of the document processing system according to the embodiment of the present invention.

First, the bookbinding application 104 of the document processing system transitions to a preview mode with virtual records applied (step S2900). As the method for transition to the preview mode, transition from a menu or with a tool button is possible, and transition can be specified on the UI. Next, it is determined whether or not virtual records are set (step S2901). As a result, if virtual records are not set, that is, if virtual records have not been set by the above-described import processing of the variable template file (No), then the process proceeds to ordinary preview processing because virtual records are not set for configuration of document pages (step S2903), and the process ends.

On the other hand, if it is determined at step S2901 that virtual records are set (Yes), then the total number of created virtual records is substituted into a constant N (step S2902). Then, the number of a virtual record to be previewed, which has been specified by the user, is substituted into a variable n (step S2904). Then, it is determined whether the substituted record number is beyond the range of the set virtual records (step S2905). As a result, if it is determined that the record number is beyond the range (Yes), then the process returns to step S2904 and performs the processing for substituting the number of a record to be previewed.

On the other hand, if it is determined at step S2905 that the record number is within the range (No), then it is determined whether the checkbox 2702 of "Virtual records and fixed chapters are to be combined" on the UI screen shown in FIG. 27 is checked (step S2906). As a result, if it is determined that the checkbox 2702 is checked, that is, if it is determined that combination setting is made (Yes), then fixed chapters to be combined are merged into "Virtual n record" in accordance with the combination order (step S2907). Then, "Virtual n record" is previewed (step S2908). If it is determined at step S2906 that the checkbox 2702 is not checked (No), then the process proceeds to step S2908.

After the preview at step S2908, it is determined whether to terminate or continue preview (step S2909). As a result, if it is determined that preview is not to be terminated but performed again (No), then the process returns to step S2904 and continues the above-described processing. On the other hand, if it is determined that preview is to be terminated (Yes), the processing of this flowchart is terminated.

Figure 30:
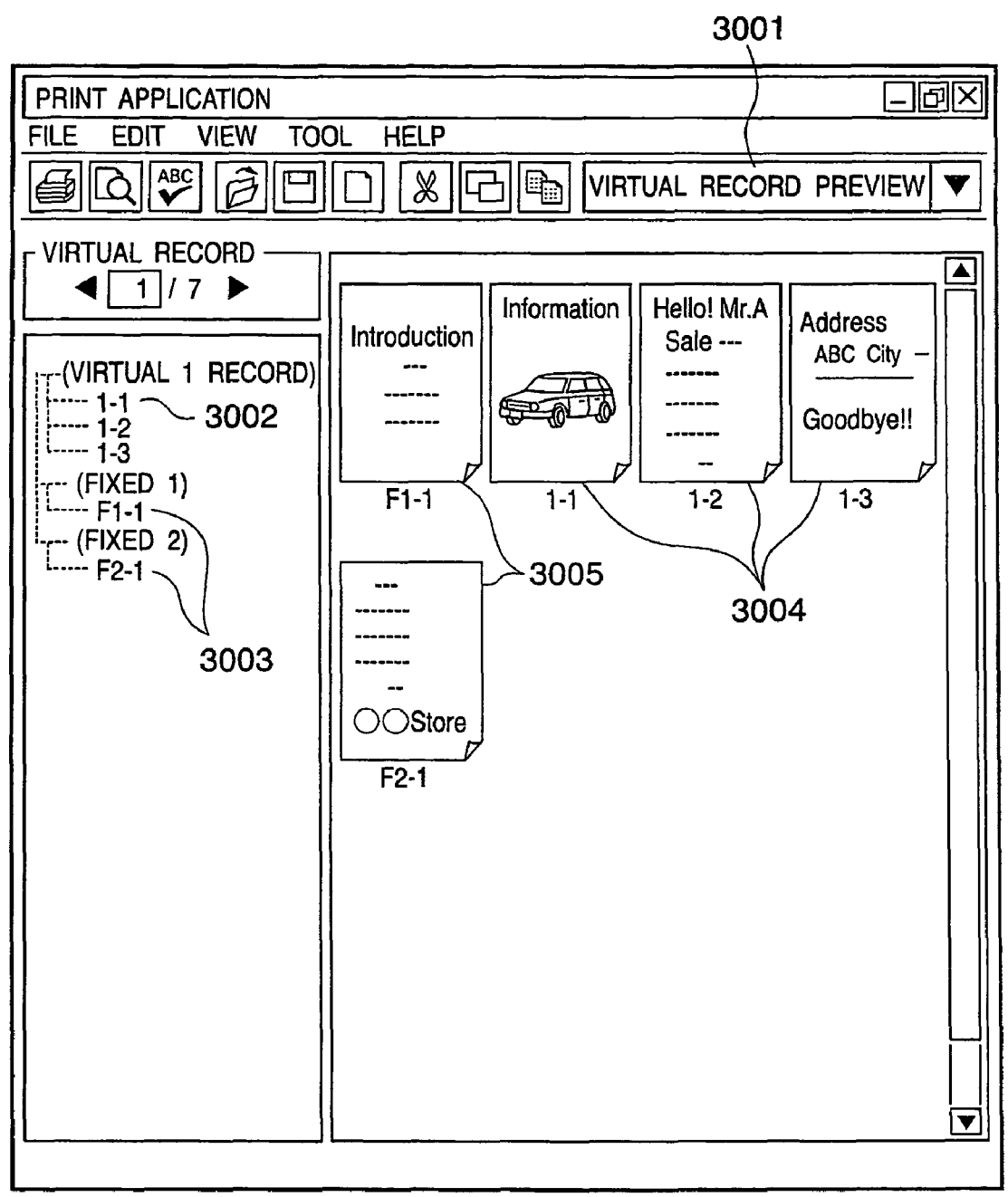
FIG. 30 shows an example of a UI screen for the preview of combination of virtual records and fixed chapters shown by the flowchart in FIG. 29.

FIG. 30 shows an example of a UI screen for the preview of combination of virtual records and fixed chapters shown by the flowchart in FIG. 29. On the UI screen shown in FIG. 30, reference numeral 3001 denotes a combo box for selecting virtual record preview. By selecting "virtual record preview" in the combo box 3001, preview in which virtual records are reflected is possible. The preview in which virtual records are reflected is as described before.

In FIG. 30, reference numeral 3002 denotes a list structure showing the configuration of pages in a virtual record. Reference numeral 3003 denotes list structures showing the configuration of pages in fixed chapters. Furthermore, reference numeral 3004 denotes preview display of pages in the virtual record. Reference numeral 3005 denotes preview display of pages in the fixed chapters. In FIG. 30, the combination order is assumed to be: (Fixed 1), 1-1, 1-2, 1-3 and (Fixed 2). Therefore, the order of document pages to be displayed in the preview area is changed to the set order.

<Print Processing of Combination with Fixed Chapters>

Figure 31:
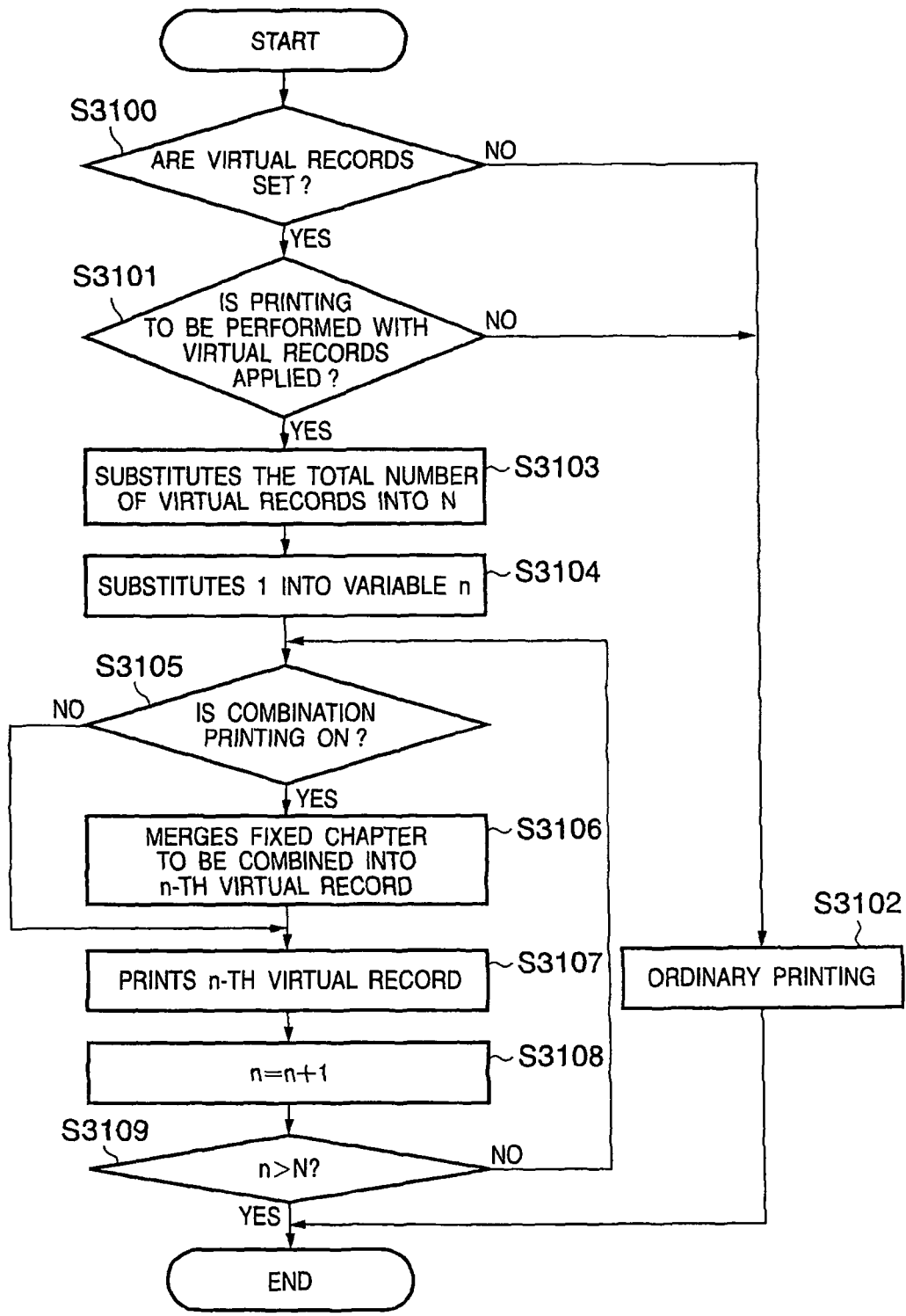
FIG. 31 is a flowchart for illustrating print processing of combination of virtual records and fixed chapters in the document processing system according to the embodiment of the present invention.

FIG. 31 is a flowchart for illustrating print processing of combination of virtual records and fixed chapters in the document processing system according to the embodiment of the present invention.

First, the document processing system determines whether virtual records are set (step S3100). As a result, if it is determined that virtual records are not set (No), then the process proceeds to ordinary print processing (step S3102), and the print processing ends. On the other hand, if it is determined that virtual records are set (Yes), then it is determined whether or not to perform printing with the set virtual records applied (step S3101). Whether or not to apply the virtual records is determined by the user giving an instruction when performing printing.

As a result, if the virtual records are not to be applied (No), then the process proceeds to the ordinary print processing (step S3102). On the other hand, if the virtual records are to be applied (Yes), then the total number of set virtual records is substituted into a constant N (step S3103). Next, 1 is substituted into a variable n (step S3104). Then, it is determined whether a check button 2805 of "Apply combination setting" is checked in the print dialog shown in FIG. 28 (step S3105).

As a result, if the check box 2805 is checked (Yes), then fixed chapters to be combined are merged into "Virtual n record" to generate a document (step S3106). Then, print processing is performed for the n-th virtual record created at step S3106 (step S3107). On the other hand, if it is determined that the check box 2805 is not checked (No), then the above-described virtual record print processing is performed. Therefore, the merging processing of step S3106 is skipped, and the process proceeds to step S3107 and performs the print processing of the n-th virtual record.

After the print processing of the n-th virtual record ends at step S3107, the variable n is incremented (step S3108), and it is determined whether the print processing has ended for all the records (step S3109). As a result, if the processing has not ended for all the records (No), then the process returns to step S3105 and repeats the processing described above. On the other hand, if the processing has ended for all the records (Yes), then the processing shown by the flowcharts ends.

<Manual Setting of Virtual Records>

Figure 32:
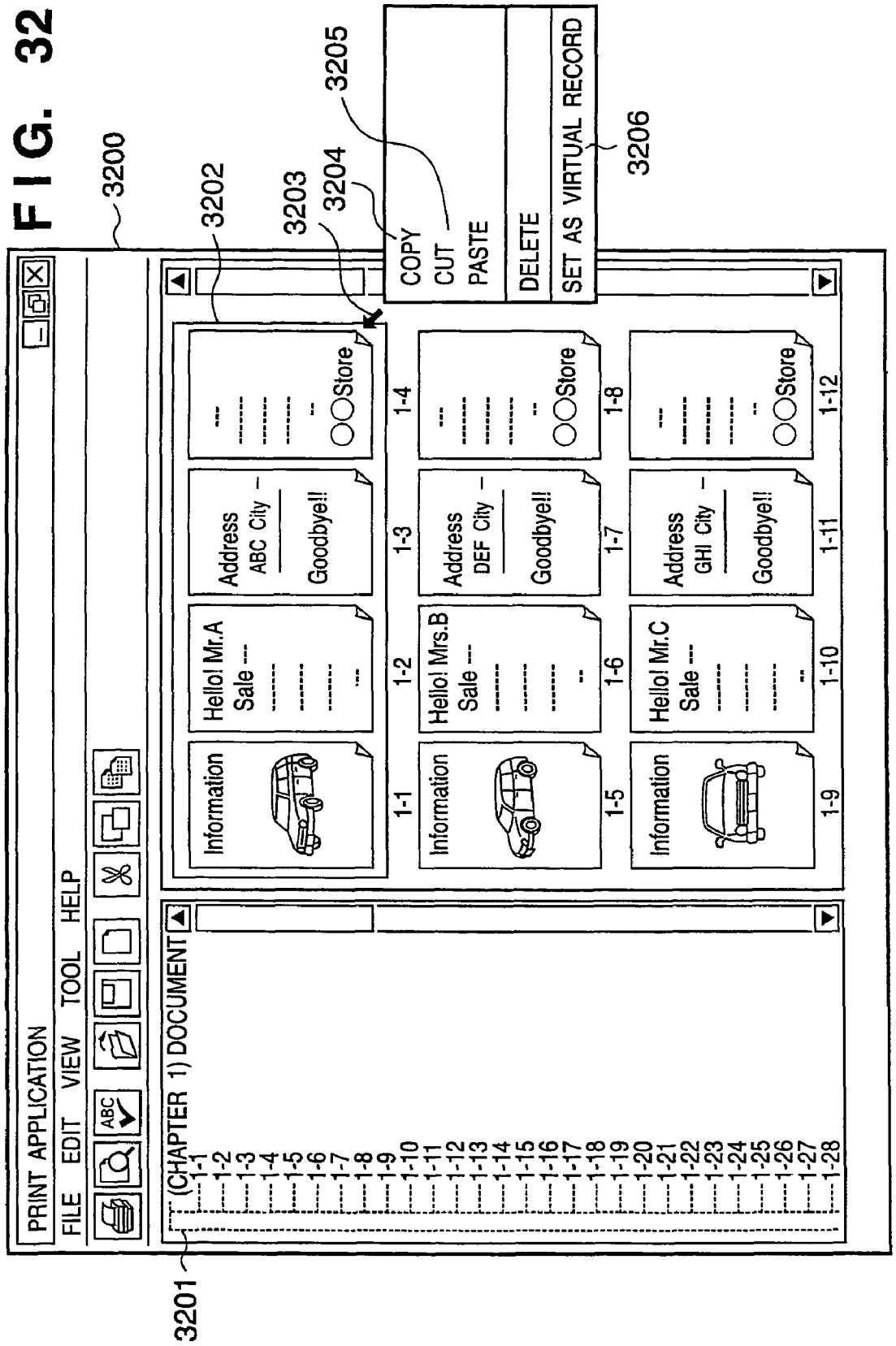
FIG. 32 shows an example of a UI screen for illustrating manual setting of virtual records in the document processing system according to the embodiment of the present invention.

FIG. 32 shows an example of a UI screen for illustrating manual setting of virtual records in the document processing system according to the embodiment of the present invention. That is, in addition to automatic setting of virtual records by the import processing described above, it is also possible that a user can arbitrarily set virtual records using the UI screen shown in FIG. 32.

In FIG. 32, reference numeral 3200 denotes the main window of the document processing system. Reference numeral 3201 denotes a list showing the document configuration of an imported electronic document file. Reference numeral 3202 denotes a rectangle frame indicating the range of document pages selected by the user. Reference numeral 3203 denotes a mouse pointer. Reference numeral 3204 denotes a pop-up menu to be displayed by a mouse right click or the like. Reference numeral 3205 denotes general items of the pop-up menu. Reference numeral 3206 denotes an item of "Set as virtual record" in the pop-up menu. Hereinafter, description will be made on a method for a user to manually set virtual records using these.

A user arbitrarily selects an imported document file to be set as a virtual record with the mouse pointer 3203. Here, the selection is performed by a mouse click. If multiple pages are to be selected, the selection is performed by surrounding document pages with a rectangle formed with the mouse or by clicking the mouse while pressing down a keyboard key. Then, by selecting "Set as virtual record" 3206 from the pop-up menu 3204 displayed by a mouse right click while the document pages are selected, the targeted pages can be set as virtual records.

As described above, this embodiment enables editing of a template file created by a variable printing system with a concept of a record introduced, in a document processing system specialized in making print settings. Furthermore, it is possible to prevent unnecessary page acquisition by automatically preventing acquisition of duplicated pages. Furthermore, by enabling preview/printing on a virtual record basis, print setting on a virtual record basis, and preview/printing of combination with fixed pages, it is possible to output a variable template with the printing function of the document processing system added.

Since virtual records set in the method described above and virtual records set thorough the import processing described before can be treated as the same, it is possible to apply them to preview and printing of combination with fixed page. Since the method for manually making settings can be performed for a document file of a general application which can be imported into the document processing system, it is possible to set virtual records for an electronic file or the like outputted in a general application format from the variable printing application.

Other Embodiments

An embodiment example has been described in detail. However, the present invention can be realized in embodiment aspects as a system, an apparatus, a method, a program, a storage medium (recording medium) and the like, for example. Specifically, the present invention can be applied to a system configured by multiple pieces of equipment or applied to an apparatus configured by a single piece of equipment.

There is also included a case where the present invention is achieved by directly or remotely supplying software programs for realizing the functions of the above-described embodiment (in the embodiment, programs corresponding to the flowcharts shown in figures) to a system or an apparatus, and by the computer of the system or the apparatus reading and executing the supplied program codes.

Accordingly, the program codes themselves, which are to be installed on a computer to realize the functions and processings of the present invention by the computer, also realize the present invention. That is, the present invention includes the computer programs themselves for realizing the functions and processings of the present invention.

In this case, the programs may be in the form of object codes, programs to be executed by an interpreter, script data to be supplied to an OS, and the like.

As a recording medium for supplying the programs, there are, for example, a floppy® disk, hard disk, optical disk, magneto-optical disk, MO, CD-ROM, CD-R, CD-RW, magnetic tape, non-volatile memory card, ROM, DVD (DVD-ROM and DVD-R) and the like.

In addition, as the method for supplying the programs, it is also possible to supply the programs by connecting to an Internet web page with the use of a browser of a client computer and downloading the computer programs of the present invention or a compressed file including an automatic installation function from the web page to a recording medium such as a hard disk. It is also possible to divide the program codes constituting the programs of the present invention into multiple files so that each file may be downloaded from a different web page. That is, a WWW server enabling multiple users to download a program file for realizing the functions and processings of the present invention using a computer is also included in the present invention.

Furthermore, it is also possible to encrypt the programs of the present invention, store them in a storage medium such as a CD-ROM and distribute the CD-ROM to users in order to enable a user who satisfies predetermined conditions to download key information for decryption from a web page via the Internet, use the key information to execute the encrypted programs, install them on a computer and realize them.

Furthermore, in addition to the case where the functions of the embodiment described above are realized by a computer executing the read programs, the functions of the embodiment described above can be also realized by an OS or the like, which is operating on the computer, performing a part or all of the actual processing based on instructions of the programs.

Furthermore, the functions of the embodiment described above can be also realized by the CPU, which is provided for a feature expansion board inserted in a computer or a feature expansion unit connected to the computer, performing a part or all of the actual processing based on instructions of the programs, which have been read from a recording medium and written in the memory provided for the feature expansion board or the feature expansion unit.

As described above, according to the present invention, it is possible, when acquiring a document based on a template file created by a variable printing system after converting it to a particular format, to construct the document in a format in which a concept of a record is introduced and preferably perform operations for the unit of the concept of the source record.

As many apparently widely different embodiments of the present invention can be made without departing from the spirit and scope thereof, it is to be understood that the invention is not limited to the specific embodiments thereof except as defined in the claims.

This application claims the benefit of Japanese Application No. 2005-028018, filed on Feb. 3, 2005 which is hereby incorporated by reference herein in its entirety.

What is claimed is:

1. A document processing apparatus which generates electronic document data in which variable output data is put into specified areas, the apparatus comprising:
   a determination unit that determines, when a document file is received, whether or not an application for variable printing has issued the document file;
   a dividing unit that divides the document file including a plurality of pages into segments in units of record when the determination unit determines that the application for variable printing has issued the document file;
   a selecting unit that selects a first displaying function or a second displaying function; and
   a displaying control unit that, when the first displaying function is selected, displays a preview image indicating that the document file including the plurality of pages is divided into the segments in units of record by said dividing unit and, when the second displaying function is selected, displays a preview image of a plurality of pages included in a selected segment, among the segments, selected in accordance with changing a target to be displayed to the selected segment.

2. The document processing apparatus according to claim 1, further comprising a print setting unit that makes individual print settings for the segments; and
   an issuing unit that issues a print job for which the individual print settings are made by the print setting unit for each of the segments.

3. The document processing apparatus according to claim 1, further comprising a duplication prevention unit that performs duplication prevention processing so that a template page common to all the segments is not redundantly acquired into the variable output data, for each segment.

4. A document processing method for generating electronic document data in which variable output data is put into specified areas, the method comprising:
   a determination step of determining, when a document file is received, whether or not an application for variable printing has issued the document file;
   a dividing step of dividing the document file including a plurality of pages into segments in units of record when it is determined in said determination step that the application for variable printing has issued the document file;
   a selecting step that selects a first displaying function or a second displaying function; and
   a display control step of displaying, when the first displaying function is selected, a preview image indicating that the document file including the plurality of pages is divided into the segments in units of record in said dividing step and displaying, when the second displaying function is selected, a preview image of a plurality of pages included in a selected segment, among the segments, selected in accordance with changing a target to be displayed to the selected segment.

5. The document processing method according to claim 4, further comprising a print setting step of making individual print settings for the segments; and
   an issuing step of issuing a print job for which the individual print settings are made by the print setting step for each of the segments.

6. The document processing method according to claim 4, further comprising a duplication prevention step of performing duplication prevention processing so that a template page common to all the segments is not redundantly acquired into the variable output data, for each segment.

7. A program stored in a non-transitory computer-readable storage medium for causing a computer, which generates electronic document data in which variable output data is put into specified areas, to perform:
   a determination procedure for determining, when a document file is received, whether or not an application for variable printing has issued the document file;
   a dividing procedure of dividing the document file including a plurality of pages into segments in units of record when it is determined in said determination procedure that the application for variable printing has issued the document file;
   a selecting procedure that selects a first displaying function or a second displaying function; and
   a displaying control procedure for displaying, when the first displaying function is selected, a preview image indicating that the document file including the plurality of pages is divided into the segments in units of record and displaying, when the second displaying function is selected, a preview image of a plurality of pages included in a selected segment, among the segments, selected in accordance with changing a target to be displayed to the selected segment.

8. The program stored on the non-transitory computer-readable storage medium according to claim 7, further causing the computer to perform:
   a print setting procedure for making individual print settings for the segments created; and
   an issuing procedure for issuing a print job for which the individual print settings are made by the print setting procedure for each of the segments.

9. The program stored on the non-transitory computer-readable storage medium according to claim 7, further causing the computer to perform a duplication prevention procedure for performing duplication prevention processing so that a template page common to all the segments is not redundantly acquired into the variable output data, for each segment.

* * * * *